(12) United States Patent
Futterer

(10) Patent No.: US 9,927,571 B2
(45) Date of Patent: Mar. 27, 2018

(54) ILLUMINATION DEVICE

(71) Applicant: SEEREAL TECHNOLOGIES S.A., Munsbach (LU)

(72) Inventor: Gerald Futterer, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 333 days.

(21) Appl. No.: 14/438,272

(22) PCT Filed: Oct. 24, 2013

(86) PCT No.: PCT/EP2013/072339
§ 371 (c)(1),
(2) Date: Apr. 24, 2015

(87) PCT Pub. No.: WO2014/064228
PCT Pub. Date: May 1, 2014

(65) Prior Publication Data
US 2015/0268399 A1  Sep. 24, 2015

(30) Foreign Application Priority Data

Oct. 24, 2012 (EP) .................................... 12189852
Mar. 28, 2013 (EP) .................................... 13161823

(51) Int. Cl.
*F21V 7/04* (2006.01)
*F21V 8/00* (2006.01)
(Continued)

(52) U.S. Cl.
CPC ........... *G02B 6/005* (2013.01); *G02B 6/0023* (2013.01); *G02B 6/0031* (2013.01);
(Continued)

(58) Field of Classification Search
CPC .... G02B 6/005; G02B 6/02057; G02B 27/22; G02B 6/0068; G02B 6/0076; H05B 37/0218
(Continued)

(56) References Cited

U.S. PATENT DOCUMENTS

2005/0185915 A1* 8/2005 Yu ........................ G02B 6/0016
385/146
2010/0220261 A1* 9/2010 Mizushima .......... G02B 6/0035
349/64
(Continued)

FOREIGN PATENT DOCUMENTS

GB           2 260 203 A      4/1993
WO   WO 2010149583 A1 * 12/2010 ........... G02B 6/0046

OTHER PUBLICATIONS

International Search Report, dated Apr. 15, 2014, and Written Opinion issued in International Application No. PCT/EP2013/072339.

*Primary Examiner* — Elmito Breval
*Assistant Examiner* — Glenn Zimmerman
(74) *Attorney, Agent, or Firm* — Saul Ewing Arnstein & Lehr LLP

(57) ABSTRACT

An illumination device for illuminating at least one spatial light modulator device. At least one light source device with at least one light source illuminates the at least one spatial light modulator device; a light guiding element through which light emanating from the light source propagates; and at least one light decoupling element arranged on top or inside of the light guiding element. The at least one light decoupling element decouples of a wave field of the light which propagating in the light guiding element into the direction of the spatial light modulator device. The light guiding element has a refractive index which is lower than or at least equal to the refractive index of the at least one
(Continued)

light decoupling element. The entrance angle of the wave field entering the light decoupling element is determined by the difference between the refractive indices according to a particular equation.

38 Claims, 20 Drawing Sheets

(51) Int. Cl.
*G02B 6/02* (2006.01)
*G02B 27/22* (2018.01)
*H05B 37/02* (2006.01)

(52) U.S. Cl.
CPC ......... *G02B 6/0068* (2013.01); *G02B 6/0076* (2013.01); *G02B 6/02057* (2013.01); *G02B 27/22* (2013.01); *H05B 37/0218* (2013.01); *G02B 6/0025* (2013.01)

(58) Field of Classification Search
USPC .................. 362/606, 97.2, 602, 600, 97.3
See application file for complete search history.

(56) References Cited

U.S. PATENT DOCUMENTS

| | | | |
|---|---|---|---|
| 2011/0255303 A1* | 10/2011 | Nichol | G02B 6/006 362/606 |
| 2012/0092750 A1* | 4/2012 | Kroll | G02B 6/0046 359/291 |
| 2012/0224149 A1 | 9/2012 | Tominaga et al. | |

\* cited by examiner

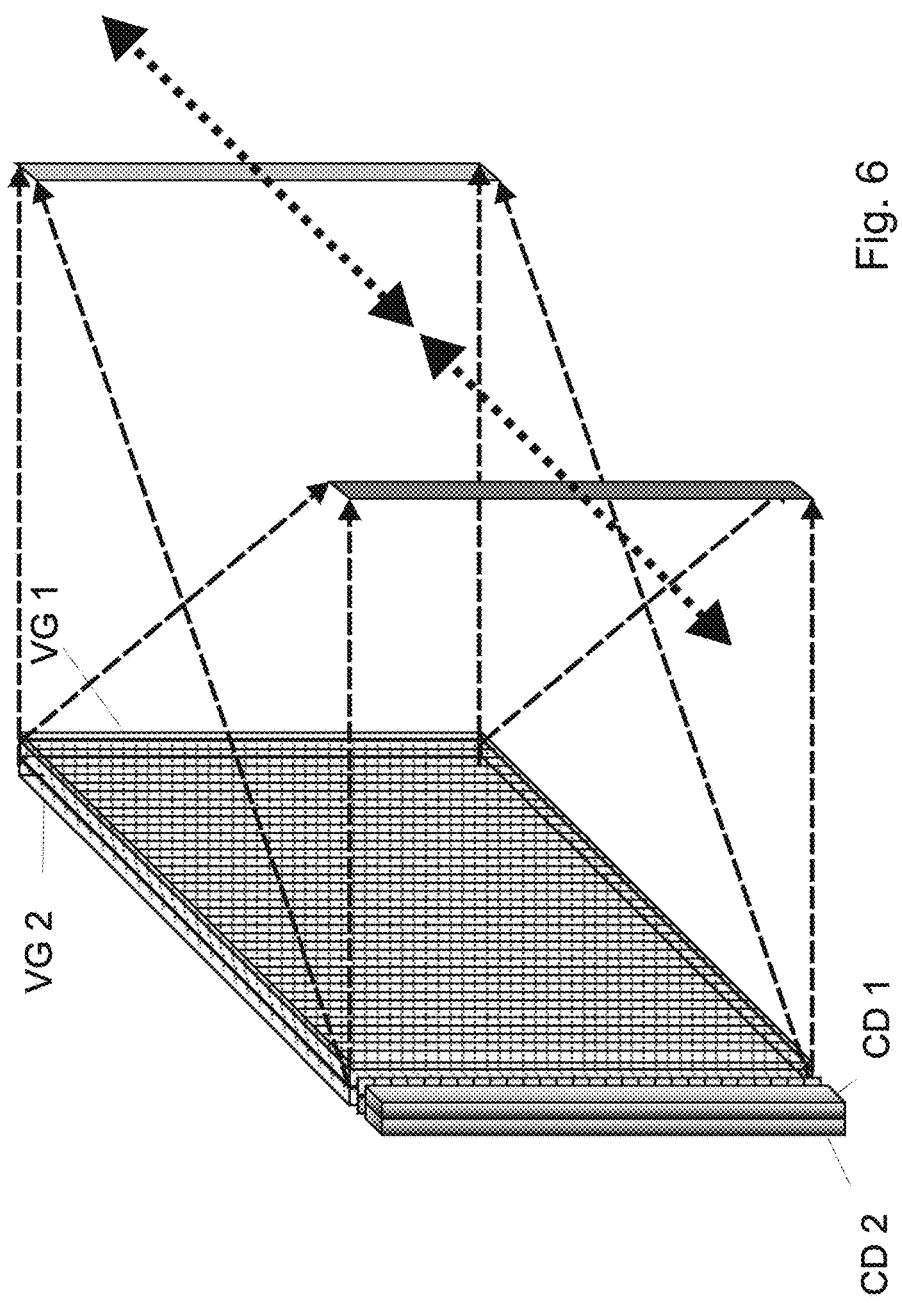

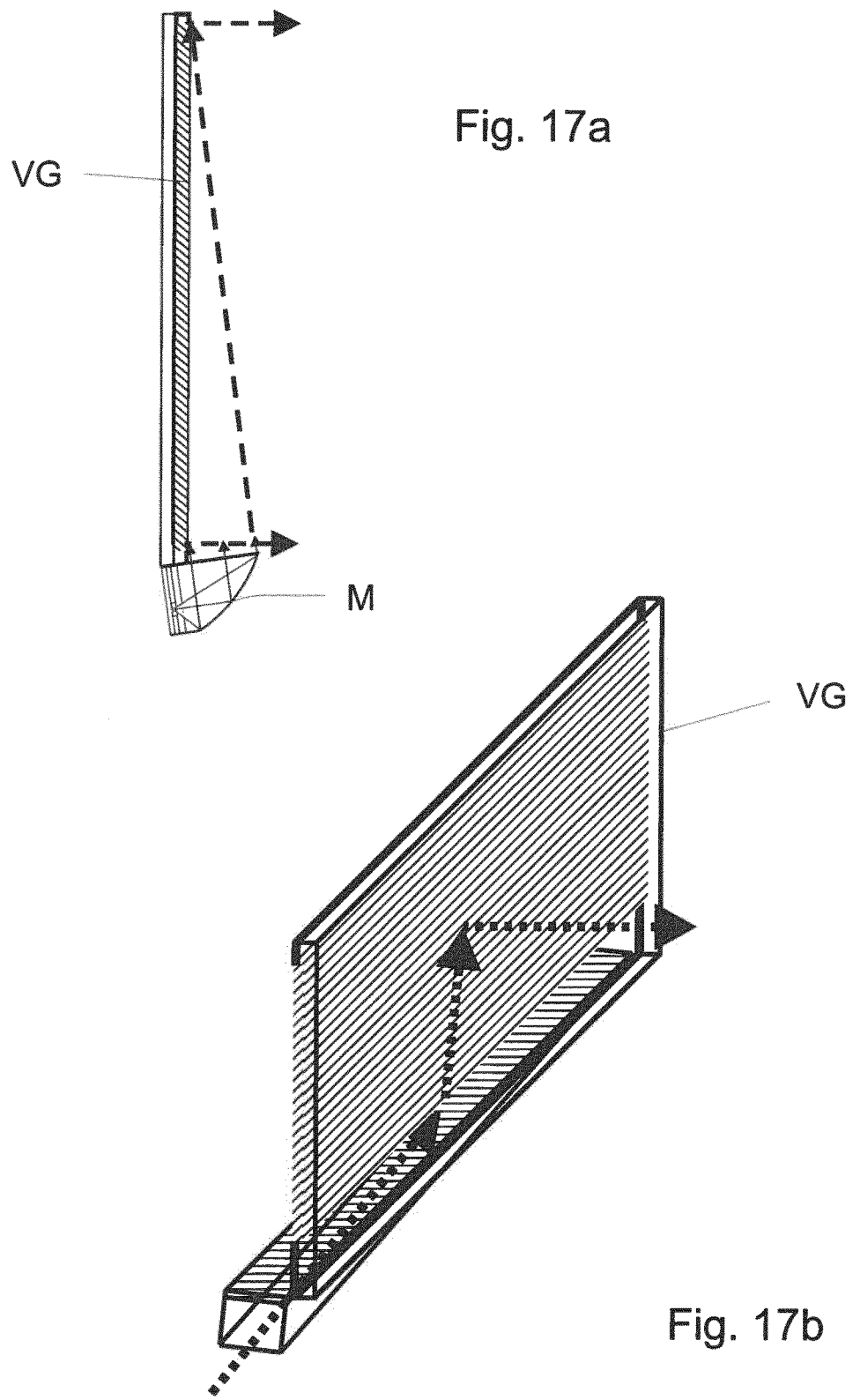

ILLUMINATION DEVICE

CROSS REFERENCE TO RELATED APPLICATIONS

This application claims the priority of PCT/EP2013/072339, filed on Oct. 24, 2013, which claims priority to EP Application No. 12189852.2, filed on Oct. 24, 2012, and EP Application No, 13161823.3, filed on Mar. 28, 2013, the entire contents of each of which are incorporated fully herein by reference.

BACKGROUND OF THE INVENTION

The present invention relates to an illumination device for illuminating at least one spatial light modulator device being used preferably for displaying two-dimensional and/or three-dimensional images comprising at least one light source device with at least one light source for illuminating the at least one spatial light modulator device, a preferably substantially planar light guiding element comprising a light conducting core, where the at least one light source device is arranged on a side of the light guiding element and where the light emanating from at least one light source of the at least one light source device propagates areal through the light guiding element, and at least one light decoupling element arranged on top or inside of the light guiding element, the at least one light decoupling elements being provided for decoupling of a wave field of the light which propagates in the light guiding element into the direction of the at least one spatial light modulator device. The invention relates further to a method for measuring the intensity distribution of light existing at an entrance plane of a spatial light modulator device.

Particularly, the present invention relates to an illumination device which is used to illuminate at least one spatial light modulator device being preferably applied in a display for displaying two-dimensional (2D) and/or three-dimensional (3D) images. It shall be understood that two-dimensional images and three-dimensional images also include two-dimensional or three-dimensional contents or movies.

The thin illumination device according to the invention can be used, for example, in a stereoscopic display device, an autostereoscopic display device (ASD) or a holographic display device, in particular for a mobile holographic three-dimensional display device or a larger holographic or autostereoscopic display device.

Illumination devices can be provided as backlights or frontlights (also referred to as transmitted-light and reflected-light illumination devices, respectively) and generally serve to illuminate a light-transmissive or reflective controllable spatial light modulator device (SLM) of preferably a direct-view display device. The light can be coherent or incoherent. Display devices which are operated with incoherent light are preferably used as two-dimensional displays for autostereoscopic three-dimensional presentations. Coherent light is required, for example, in holographic display devices.

The field of application of the present invention includes preferably direct-view display devices for the three-dimensional presentation of autostereoscopic and/or holographic images.

In a commercially available flat TV display for the presentation of two-dimensional images or movies/videos, it is necessary to realize a bright and homogeneous illumination of the entire surface at high resolution. The spatial light modulator device which serves as display panel is required to emit the light in a large angular range. Many physical forms of such display devices are known in the prior art.

Most of them have a planar optical light guiding element/waveguide. The planar optical light guiding element generally comprises at least one light conducting core and a cladding layer. The injected light propagates through the planar optical light guiding element in the form of light beams or wave fields under the conditions of total internal reflection (TIR) and is coupled out to illuminate the spatial light modulator device. Alternatively, the light is conducted without being reflected and coupled out through the cladding layer as evanescent wave fields of different modes m.

A number of issues need to be considered in a display device with backlight or frontlight and preferably planar optical light guiding element to be able to realize an optimally designed illumination device. First, this relates to the physical form of a preferably planar optical light guiding element itself, including the mechanisms for injecting and coupling out the light. Secondly, this relates to the physical form of the light source device including the light sources which supply the light.

In contrast to a flat TV display, an illumination device in an autostereoscopic or holographic display device for the three-dimensional presentation of information has to satisfy a number or further or different requirements. The information to be presented is written into the spatial light modulator device of the display device. The light which is emitted by the light source is modulated with the information that is written into the spatial light modulator device, where the spatial light modulator device often at the same time serves as screen or display panel. It is therefore necessary to strictly ensure parallel incidence of the light beams onto the spatial light modulator device and to achieve a high refresh rate of the spatial light modulator device.

In addition to the necessary high refresh rate, great demands are made on the collimated emission of the light by the optical light guiding element. To achieve a high quality of the three-dimensional presentation of the information written into the light modulator device, a defined collimation of the wave fronts that are coupled out is necessary in addition to a homogeneous illumination of the entire surface of the spatial light modulator device. This is of particular importance for holographic presentations in the form of a reconstruction that is to be generated. The holographic information, which can for example be an object that is composed of object points of a three-dimensional scene, is encoded in the form of amplitude and phase values in the pixels of the spatial light modulator device. Each encoded object point contributes to a wave front that is emitted by the spatial light modulator device.

The angular range of a wave front that is emitted by the illumination device is referred to as the 'angular spectrum of plane waves' (ASPW). It has been found in practice that an angular spectrum of plane waves where the plane wave fronts comprise mutual deviations in the emission angle of more than $1/60°$ deg in the direction of coherent reconstruction will result in a blurred reconstructed object point. This blur can be perceived by the human eye under optimum conditions. The emission angle of the angular spectrum of plane waves of a holographic display device should therefore lie at least in the range of between $1/70°$ deg and $1/40°$ deg in the coherent direction. In the incoherent direction, it should be wide enough to illuminate at least the eye pupil of the human eye.

Consequently, the collimated wave fronts which illuminate the spatial light modulator device have to a priori have a defined emission angle in relation to each other in order to circumvent the negative illumination-induced effects on the reconstruction to be generated. In autostereoscopic three-dimensional presentations, the collimation of the light beams enhances the image quality of the display device. The angular spectrum of plane waves should here be chosen such that the eye pupil of the other human eye is not illuminated if one eye pupil is illuminated.

Collimated emission of coherent light can for example be achieved by using volume gratings which are arranged on or in the preferably planar optical light guiding element. They represent a stack of transparent layers and can be described as modulated distributions of refractive indices in the X and Y direction. A three-dimensional volume grating is generated by interference of two or more coherent or at least partly coherent waves. The structure of the volume grating is determined by parameters such as the wavelength in the material and the local angles between interfering wave fronts of the light used for recording. A volume grating is generally made such that a defined portion of energy can be coupled out in a specified angular range. Bragg's diffraction conditions apply to those gratings during reconstruction.

An adaptation to the light that is actually to be coupled out can be achieved by choosing the parameters of the volume gratings accordingly.

Further, the resolving power limit of the human eye, which is about $1/60°$ deg, has to be taken into account when producing the volume grating. If this limit is taken into account, the illumination device e.g. in a holographic display device has to realize an angular spectrum of plane waves that ranges between $1/20°$ deg and $1/60°$ deg in order to illuminate the spatial light modulator device with well collimated light.

Furthermore, the problem is to realize a flat illumination device which is as thin as possible. This means the illumination device should have a thickness which is suited preferably for a holographic display device. As mentioned briefly above, the angular resolution of the human eye under optimal conditions is $1/60°$ deg. The illumination device of a holographic display device therefore has to have a limited angular spectrum of plane waves, e.g. from $<1/20°$ deg to minimally $1/60°$ deg, that is it must be well collimated light. Therefore, the basic boundary condition is that the flat illumination device according to the invention shall provide $1/60°$ deg angular spectrum of plane waves (ASPW) only, which is present in the direction of holographic encoding. In detail, for a holographic encoding, a one-dimensional (1D) encoding requires $1/60°$ deg along the coherent direction and e.g. 1° deg along the incoherent direction. According to this a two-dimensional encoding requires $1/60°$ deg in horizontal and vertical direction. This wave field propagates then to at least one observer of a two-dimensional and/or three-dimensional image. Moreover, at present reasonable thin time being illumination devices realize an angular spectrum of plane waves of plus/minus 30° deg, which is far away from being practical.

There are well-known different approaches which try to resolve this problem. One prior art solution is a wedge type illumination device. This illumination device comprises a wedge-shaped light guiding element, i.e. one which is not coplanar, in which the light propagates by way of multiple reflections and which is used for homogeneous illumination of a display. Further, the wedge is dimensioned such that the light leaves because of the frustrated total internal reflection (FTIR) condition during its propagation through the light waveguide.

Diffractive wedge type embodiments of the light guiding element in an illumination device can provide reasonable flat illumination devices. The problem with such illumination devices comprising a wedge-shaped light guiding element is that they use a primary collimated wave field, which enters in a plane of a substrate as the light guiding element, which e.g. comprises an antireflection coating. To realize larger entrance angles as e.g. 87.134° deg, which gives approximately a twentyfold (20×) beam stretching, is very difficult and could be the limit for the wedge type approach. In other words, a large incidence angle must be chosen in order to enable a large beam stretching factor. An angle of e.g. 84.26° deg, which means 84.26° deg incidence angle to 0° deg exit angle to the surface normal of the light exit plane of the illumination device and which is present between the normal of the diffraction plane and the incidence beam, generates a beam stretching factor of $1/\cos(84.26°\text{ deg})=10$. On the other hand, an entrance angle of 86.18° deg generates then a fifteenfold (15×) and an entrance angle of 87.13° deg generates a twentyfold (20×) stretching factor.

Therefore, flat displays with light guiding elements designed in the form of a wedge are not suited due to their emission characteristics to satisfy the great demands which are made on an illumination device of a fast large sized switching display device.

SUMMARY OF THE INVENTION

Therefore, it is an object of the present invention to provide a large sized flat illumination device which is as thin as possible and which is capable to realize a homogeneous intensity distribution decoupled from the illumination device for illuminating a spatial light modulator device. Particularly, the light propagating through a light guiding element shall have a defined angular spectrum of plane waves after decoupling from the light guiding element in order to illuminate homogeneously a spatial light modulator according to the predefined use of the illumination device.

It is a further object of the invention to design the flat illumination device only with a small number of optical elements, where its construction shall be simple and cost-efficient so that an illumination device can be developed under minor expenses.

It is still an object of the present invention to provide light decoupling element(s) used in an illumination device which is(are) cost-efficient and applicable in illumination devices, in particular in illumination devices according to the invention. Because an additional aspect is the financial investment, which is mandatory in order to enlarge the scale of illumination devices. Large—one piece type—light decoupling elements, preferably volume gratings, which realize e.g. plane wave to plane wave or plane wave to spherical wave (that is a field lens) diffractions, require large optical components to be made. However, step and repeat processes require much smaller optical components only.

Furthermore it is an object of the invention to develop a method by which varying intensity distribution within the illumination device can be measured in a simple way.

The optimization of the wave field, which hits a decoupling plane of an illumination device, is mandatory in order to realize a homogeneous intensity distribution, which illuminates a spatial light modulator device later on. A calibration of this intensity distribution and an adapted encoding of sub-holograms which are used in specific holographic encoding methods are practical. However, this will cost dynamic range of the e.g. complex valued spatial light modulator device. That is why a reasonable homogeneous intensity distribution has to be provided already by the illumination device.

For this reason, according to the invention the object is achieved by way of an illumination device claimed in claim 1.

The illumination device according to the invention is provided for illuminating at least one spatial light modulator device being used preferably for displaying two-dimensional and/or three-dimensional images. The illumination device comprises at least one light source device with at least one light source for illuminating the at least one spatial light modulator device. A preferably substantially planar light guiding element is further provided which comprises at least one light conducting core, where the at least one light source device is arranged on a side of the light guiding element and where the light emanating from at least one light source of the at least one light source device propagates areal through the light guiding element. On top or inside of the light guiding element at least one light decoupling element is arranged. The at least one light decoupling element is provided for decoupling of a wave field of the light which propagates in the light guiding element into the direction of the at least one spatial light modulator device. The light guiding element has a refractive index which is significant lower than the refractive index of the at least one light decoupling element, where the entrance angle of the wave field entering the at least one light decoupling element is determined by the difference between the said refractive indices in such a way that an angular spectrum of plane waves decoupled from the at least one light decoupling element has a predefined value which depends on the required use of the illumination device.

Of importance is here that a transparent substrate including the light-conduction core of the light guiding element which is the medium of the propagation of the wave field has a refractive index which is lower than the one of the at least one light decoupling element or light decoupling plane.

What is proposed with the described invention here is to use a grazing incident angle incident on the light decoupling element. The grazing incidence means that the light incidence is very close to parallel light incidence relating to the long side walls of the light guiding element or the exit plane of the light decoupled out of the light guiding element/illumination device, and a longitudinal varying decoupling efficiency. This is combined with a reasonable thick substrate of the light guiding element which fulfils the condition $n_S < n_{LDE}$ or at least $n_S \leq n_{LDE}$, where n is the refractive index, S is the substrate and LDE is the light decoupling element. The light guiding element can preferably be covered with an absorptive back if required.

A high and constant diffraction efficiency of the light decoupling element, preferably a volume grating, is the preferred embodiment. Thus, the diffraction efficiency is very close to 1, which means e.g. 0.99. In this case, the decoupling efficiency is also close to 1. But the wave field, which locally touches the decoupling zone, is tailored by using wave field forming means, which are provided within a collimation device, which is arranged at the rim of the light guiding element. Thus, the intensity distribution, which is present within the exit plane of the illumination device, is homogeneous. More explicite, the light which reaches the decoupling zone is decoupled out of the FTIR situation. This is a main principle of the grazing incidence approach, which reduces the influence of back reflected and back scattered light.

Slightly longitudinal variations of the diffraction efficiency of the light decoupling volume grating or the local decoupling efficiency or even an additional absorptive filter, which is used at an exit plane of the illumination device, can be used in order to correct for small values of in-homogeneities.

A backlight illumination device (BLD) or a frontlight illumination device (FLD) using grazing incidence of light has to fulfil several specific conditions to be used within a holographic or stereoscopic or an auto-stereoscopic display. The description of the invention refers mostly to an illumination device applied in a holographic display. As a matter of course the illumination device described herein can be applied in other types of displays like stereoscopic or autostereoscopic displays too.

The parameter range which can be used is given by the application/use. One application is to illuminate a data panel with reasonable sufficient coherent light which is used to generate three-dimensional scenes by e.g. using one-dimensional or two-dimensional holographic encoding.

The angular spectrum of plane waves of a holographic encoded direction has to be in the range of $1/60°$ deg if High Definition (HD) view is aspired. The angular spectrum of plane waves of a non-holographic encoded direction has to be sufficient to fill the entrance pupil of the human eye and thus is e.g. in the range of 0.5° deg to 3° deg. Z dependent adaption of the angular spectrum of plane waves can be implemented.

The main principle which is used here is to avoid or suppress zigzag propagations (multiple reflections of the light within the light guiding element) of a reasonable coherent wave field. A zigzag propagation will be present within a light guiding element if the dimension allows for mode numbers $m \geq 1$ which means at least two modes within the plane which is perpendicular to the propagation distance. $m > 1$ can be acceptable as long as the angular spectrum of plane waves is within the required range.

One opportunity to avoid zigzag propagation of a coherent wave field is to provide an optical design which allows for the propagation of a single mode only. A wider angular spectrum of plane waves can propagate within a plane which is nearly parallel to the substrate of the light guiding element. Thus, the wider angular spectrum of plane waves which is required for the incoherent direction can be provided.

What is described here is that the propagation of the tailored wave field within the transparent plate serving as the light guiding element is a free space propagation within a dielectric material, which has a refractive index of e.g. n=1.48.

Several methods can be used to avoid the fulfilment of the standing wave condition of a multi-mode light guiding element. One procedure is to use a thickness $t_{LG}$ of the light guiding element which is larger than the coherence length $z_C$ of the light source device used. It can also be possible to choose a thickness $t_{LG}$ which is in the range of $z_C$. This is due to the fact that modes require a minimum propagation distance along z to be fully developed. This also means that a mode forming e.g. by using diffractive optics at the entrance plane of the light guiding element only works for small propagation distances. To control the mode pattern which is present along larger propagation distances the mode forming has to be implemented within the light guiding element itself and along the propagation distance z. This is most likely a complex implementation which can be e.g. based on a multi-layer approach which is not a cost efficient solution.

A practical approach according to the invention is to use a reasonable thick substrate as light guiding element and/or to add an absorptive layer. This will suppress the emergence of zigzag modes.

Analogue to a mono-mode light guiding element a constant intensity distribution has to be emitted into the direction of the spatial light modulator device used. This means that the decoupling which is e.g. done by using preferably a surface relief or a volume grating has to be optimized in a way to provide this. In other words, the energy which is present times the decoupling efficiency has to be a constant.

One opportunity is to use a volume grating which shows an optional distribution of the diffraction efficiency of a light decoupling element. The decoupling efficiency increases with increased propagation distance. To avoid a functional gradient which is too high and thus could be to complicate to be manufactured, this function can be used only partially.

To not to narrow the angular selectivity of the light decoupling element down to extreme small values an incidence angle of 90° deg shall be avoided. An exception is an illumination device (BLD or FLD) setup which uses a light source device with reasonable low temporal coherence.

The solution according to the invention is now to use a substrate as light guiding element which has a refractive index which is significant lower than the one of the light decoupling element. A greater difference results in a smaller optical path through the light decoupling element. A practical embodiment uses an exponential distribution of the refractive index within the matching layer between the light guiding element and the light decoupling element which can have a thickness of e.g. ≤1 μm. A refractive index of the substrate of $n_S$=1.47 and a refractive index of the light decoupling element (here e.g. photopolymer (PP)) of $n_{PP}$=1.5 gives the opportunity to realize close to 90° deg propagation of the light within the substrate as light guiding element and 78.5° deg within the light decoupling element, which is a practical value. The exit angle of the light out of the light decoupling element is e.g. 0° deg or has a local dependency in order to form a field lens which is used to direct the light e.g. to definite areas onto the spatial light modulator device. Other exit angles of the light than 0° deg are practical too.

Due to the coupled wave theory (CWT) of Kogelnik the local modulation of the refractive index n1(x,y) has to be varied in order to realize diffraction with local varying diffraction angle, which has constant diffraction efficiency within the entire plane of the volume grating serving preferably as the light guiding element used. If a field lens is provided, than a tailored intensity distribution of the coherent wave field, which is used for the exposure or an additional incoherent wave field, which is present during the exposure or the copy process of a master grating can be used in order to generate a locally adapted n1(x,y)≠constant, which enables a constant diffraction efficiency of e.g. $\eta_{VG}$=0.99. For example, an incoherent correction profile can be added to a coherent interference pattern by using a projector, which images the correction profile onto the photopolymer to be exposed. Thus, defined and also constant diffraction efficiency can be provided for various diffraction geometries, which have a local dependency of the diffraction angle, which is θ(x,y)≠constant. In other words, a volume grating field lens, which transforms a grazing incidence plane wave to a converging spherical wave, can be realized with diffraction efficiency, which is constant within the entire plane of the volume grating and which is very close to 1.

The diffraction angle is significantly smaller than the angle, which is present between the incident and the exit angle if the refractive index of the light decoupling element is larger than the one of the light guiding element, which defines the entrance space. If a light guiding element, which is used within a grazing incidence embodiment according to the invention and which is made e.g. of fused silica, is combined with a Photopolymer as light decoupling element, which can be e.g. BayFol HX from Bayer Material Science, than a diffraction angle of e.g. 77° deg can be present.

The advantage is that the angular spectrum of the plane waves within the low index propagation substrate as the light guiding element can be e.g. fivefold larger than $1/60°$ deg. This means that the angular spectrum of plane waves of the wave field entering the light decoupling plane is squeezed due to the geometry of diffraction, which is used here.

Thus, the entrance angle of the light into the light decoupling element can be determined by the difference of the refractive index of the light guiding element and the light decoupling element in such a way that the angular spectrum of plane waves decoupled out of the light decoupling element is modified corresponding to the required application/use of the illumination device. Furthermore a homogeneous decoupled intensity distribution can be created with which a spatial light modulator device is illuminated. This means, the angular spectrum of plane waves, which propagates within the user space, has the required conditions depending on the application/use of the illumination device. This depends on whether the illumination device is used to illuminate a display panel of an autostereoscopic display or that of a holographic (direct-view) display.

A further advantage of the solution according to the invention is that the light, which hits the light decoupling plane of the light decoupling element, is decoupled with a high diffraction efficiency, which is close to 1. Thus, scattered light which can be introduced by the light decoupling element is decoupled and does not propagate to further possible existing scattering elements.

As light decoupling element preferably a volume grating can be used. The light decoupling volume grating can be used with a constant diffraction efficiency DE, η(x)=constant, which is e.g. η=0.99, thus close to 1. This type of volume grating layout reduces alignment issues. A volume grating, which has structured diffraction efficiency, can be used to compensate for intensity fluctuations, which can be present in front of the volume grating, seen in the propagation of light. This type of laterally structured volume grating has to be aligned laterally with an uncertainty of less than 50 μm. Constant diffraction efficiency makes the alignment more comfortable.

Due to the inventive construction and combination of the light guiding element and the light decoupling element, and the light source device there is achieved an extremely flat illumination device.

Further preferred embodiments and improvements of the present invention are defined in the dependent claims.

In a first preferred embodiment of the invention, the illumination device can be designed such that for holographic applications the angular spectrum of plane waves decoupling from the at least one light decoupling element is not greater than $1/60°$ deg in at least one lateral direction, where the angular spectrum of plane waves is not greater than $1/60°$ deg in the direction of the holographic encoding and has a value of approximately 0.5° deg to 3° deg, preferably 1° deg, in a direction perpendicular to the direction of encoding. The human eye can resolve of up to 60 pixels per degree, which is referred to as high definition (HD). This means that the limit of the angular spectrum of plane waves, which illuminates the spatial light modulator device, comprising preferably sub-holograms encoded in the spatial light modulator device, which generate the cloud of three-dimensional distributed object points, shall be 1/60° deg only. If a wider angular spectrum of plane waves is used than the human eye will recognize smeared object points in front or behind the holographic display device.

The angular spectrum of plane waves, which propagates within the user space, has to be limited to 1/60° deg along the coherent direction of the holographic one-dimensional or two-dimensional encoded three-dimensional display. For a two-dimensional encoding the illumination device has to provide 1/60° deg within two directions, horizontal and vertical. For a one-dimensional holographic encoding the illumination device has to provide 1/60° deg within the holographic encoding direction and e.g. 1° deg within the direction of the sweet spot.

Within the transparent substrate serving as the light guiding element a much higher angular range can be used. This can be e.g. 4 times 1/60° deg due to the change of the angular spectrum of the plane waves during the diffraction at the decoupling plane of the light decoupling element, which is e.g. a volume grating, which works e.g. at 77° deg (incidence angle)/0° deg (exit angle).

The angular spectrum of the plane waves can be distributed non-symmetrically. This means to collimate light emitted of a light source device, which does not have just a round-like shape and e.g. the exit plane of an optical fiber (for two-dimensional encoding) or just a stripe- (for one-dimensional encoding) like shape.

Advantageously, the at least one light decoupling element can be arranged parallel to the propagation direction of the light in the light guiding element, where the light within the light guiding element propagates at an angle close to 90° deg to the surface normal of the light decoupling element. A basic principle, which can be used within different embodiments of illumination devices, is to use limited angular and or spectral selectivity in order to cut out a defined and desired angular and or spectral range only. Volume gratings as light decoupling elements provide the capability to be tailored to the requirements.

A reasonable thick volume grating can be used to couple out or redirect an angular range of the angular spectrum of plane waves of ±0.25° deg only, which can be used within an autostereoscopic display. The discrete volume grating thickness $d_{HOE}$, which provides an angular selectivity of ±0.25° deg, depends on the discrete geometry of reconstruction and can be e.g. within the range of 15 µm to 50 µm.

The thick volume grating can be used to e.g. couple out or redirect an angular spectrum of plane waves of ±1/120° deg only, which can be used within a holographic display.

The volume grating thickness $d_{HOE}$, which provides an angular selectivity of ±1/120° deg depends on the discrete geometry of reconstruction and can be e.g. within the range of 450 µm to 1.5 mm. These values, which are given for $d_{HOE}$ are practical. However, even a thin volume grating can provide a very small angular or spectral selectivity, when a very large angle, which means an angle close to 90° deg, is used as incidence angle, which is simultaneously the reconstruction angle $\theta_R$.

Further, the angular spectrum of plane waves of the wave field or wave field segment, which illuminated the volume grating, can also be broadened by the transfer function of the light or the light guiding components used. This also means that the modification of the angular spectrum of plane waves, which is initially provided by a collimation device, can be due to imperfections of the light or the light guiding element, which can be e.g. a plane parallel plate.

Z apodized modulation (being especially an apodization in the direction of the initial propagation of the light to be deflected) of the refractive index n1 of the volume grating, as it can be generated e.g. by the method being disclosed in the international patent application PCT/EP2012/060684 of the applicant, the complete content of which is incorporated herein by reference, can be used in order to suppress side lobes of the angular and or spectral selectivity. This can be used e.g. in an illumination device (BLD or FLD) based on wedge zigzag-propagation, plane parallel plate zigzag-propagation, 84.26° deg air wedge, 84.26° deg bulk wedge, wave guiding and grazing incidence of light. Thus the selectivity can be tailored to the requirements.

An intensity distribution of a collimated wave field, which propagates within the light guiding element, generally spreads out along z (the direction in which the light propagates), where the peak intensity is reduced. In other words, the intensity profile, which is present locally, changes along the propagation distance. Simulated data can be used in order to optimize the apodized reflectivity of each single reflection plane (see FIG. 33). Thus, it is possible to keep the intensity, which is reflected to the decoupling volume grating, at a constant value. Furthermore, equivalent intensity distributions $I(x,y)_{Mi}$ can be realized for all wave segments, which are directed to the decoupling volume grating. It is preferred to use coherence lengths, which are significant smaller than the relative distance of adjacent reflection or diffraction elements (see FIG. 33 and FIG. 30). The apodization profile of adjacent reflection planes $M_i$ and $M_{i+1}$ (Mi: planes, which provide the functionality of a semi-transparent mirror plane; can be arranged on a side of the light guiding element opposite to the volume grating) can be chosen in a way to avoid intensity step profiles, which can be visible at the intersection.

A cladding layer can be advantageously provided between the light guiding element and the at least one light decoupling element. Thereby additional modifications of the illumination device can be provided. One is to use a layer which is arranged between the substrate as light guiding element and the light decoupling element and which realizes an absorption a(z) which is decreased along the light propagation along z. This embodiment will cause loss of light but can advantageously reduce the amount of scattered light which can be due to light which propagates within the light decoupling element showing scatter effects. The approach is "light shall go once through the light decoupling element only, shall be decoupled and shall not go back to the light guiding element". The a(z) function of the cladding layer as absorptive layer can be chosen in a way to be able to use a volume grating as light decoupling element which has a constant diffraction efficiency η close to 1. It is also possible to use a combination of η(z) and a(z) to balance the loss of light and the amount of scattered light. In other words, there can be a(z)≠ constant and η(z)≠constant on top of the light guiding element which do not really guide the light but instead of this defines the refractive index only.

In addition to this also a reflectivity r(z) which is decreased along z can be used. The problem of using this approach in this kind of illumination device is that the recycling of the light reflected could be complex and thus could require additional technical effort.

The cladding layer is used to optimize the intensity distribution of the light which illuminates the spatial light modulator device used.

The cladding layer can be formed as an antireflection coating, preferably a dielectric coating, for providing a gradient-like transition of the refractive index of the light guiding element to the at least one light decoupling element. It concerns to the transition zone between the main substrate, namely the light guiding element and the light decoupling element. The cladding layer can be an anti-reflection coating, which can e.g. consist of a stack of dielectric layers.

Dielectric layers or planes, which are used within a segmented type embodiment, can be used as beam splitters, which show defined reflectivity. The planes have to be arranged in a 45° deg geometry in order to provide a redirection of the light of about 90° deg. An arrangement, which has 45° deg mirror planes, can be used without a decoupling volume grating as light decoupling element. But it is not cost-efficient and thus not preferred. A gradient in the reflectivity of a set of reflective planes can be used to provide a reasonable homogeneous intensity of the light, which is coupled out into the direction of the spatial light modulator device which has to be illuminated.

In order to avoid intensity variations, which could be noticeable by a user, an apodization profile can be provided in the partially reflective planes of the dielectric layers. Regardless of the beam divergence, the reflective distributions of the different reflective planes can be used in order to obtain a homogeneous exit intensity distribution.

In a preferred embodiment of the invention the cladding layer can be a graded index layer, which realized a smooth and continuous change from the low refractive index of the light guiding element to the higher refractive index of the light decoupling element as a volume grating. The index profile has to be optimized in order to minimize reflections.

In a further embodiment of the invention, an absorber layer can be provided which is arranged on the light guiding element on the opposite side of the cladding layer. The back or bottom of the light guiding element can be coated with an absorber layer or an absorptive material to ensure the mode suppression and the emergence of zigzag-modes respectively even if a thin substrate as light guiding element is used.

Furthermore, a collimation device can be provided for collimating the light emanating from at least one light source of the at least one light source device, where the collimation device can be designed in such a way that a reasonable collimated and tailored wave field which has the required angular spectrum of plane waves of preferably not greater than 1/60° deg is available. A reasonable collimated wave field consists of a tailored angular spectrum of plane waves. The average mean direction of the light propagation of all partially incoherent waves is close to 90° deg to the surface normal of the light entrance plane of the light guiding element, which means e.g. 88.5° deg or even 90° deg. Each single wave, which is a part of the angular spectrum of the plane waves, has a divergence, which causes a spread of the intensity distribution. This divergence can be influenced by the aperture/opening of the collimation device. The collimation device can have e.g. a slit-like aperture and can be mounted with the illumination device at the bottom edge of a display. Thus the light propagates upwards.

As described above, one parameter which defines the divergence of the single incoherent waves is the outer boundary of the collimation device, which means e.g. the size of a slit as aperture which limits the initial beam diameter of the wave field. Therefore, the collimation device can be a subject to an optimization process.

The slit, which is the exit plane of the collimation device for the light or e.g. a cylindrical lens or a lens array, can comprise an amplitude apodization profile instead of e.g. a step-like 0 to 1 aperture stop function. By means of this apodization of the collimated light beam the homogeneity of the decoupled intensity distribution can be optimized.

A phase apodization profile $\varphi(x,y)$, which can be present preferably behind the collimation device, can also be a subject to an optimization process. This additional phase function can be combined with the amplitude apodization profile $a(x,y)$, which was discussed above.

This means that the angular spectrum of plane waves of the collimation is not 1:1 the angular spectrum of plane waves, which propagates later after decoupling from the light decoupling element to a user.

A better optimization of the decoupled intensity distribution can be achieved by modification of the complex valued intensity distribution of the light source(s) of the at least one light source device, which has to be collimated. The size of the light source plane defines the maximal extension of the angular spectrum of plane waves, which propagates behind the collimating device which could be e.g. a lens array. Thus the shape of the at least one light source is subject to an optimization process.

A single point or point light source results in a single plane wave segment, which propagates behind the collimating device. This can be used particularly for two-dimensional encoded holographic displays but could cause intensity in-homogeneities, which can be seen in the exit plane of the illumination device.

A light source, which is slightly extended, provides more capabilities in regard to a tailored wave field. A plane of the extended light source can be illuminated with coherent light, which can be generated e.g. by a primary laser diode. A dynamic phase variation is generated by using a dynamic scatter plate, e.g. a rotating or laterally moved scatter plate. Thus, the absolute value of the mutual coherence $|\mu_{12}|$ of the collimated wave field is reduced if compared to the collimated point source in order to avoid interferences within the range of the light decoupling element.

A fixed amplitude distribution is realized within the plane of the light source to be collimated. This can be done e.g. by beam shaping or preferably by using a spatially structured amplitude mask, which can look like or even be a B&W (Black&White) film segment. This amplitude distribution $a_{LS}(x,y)$ of the light source plane shall be modified for the optimization of the intensity distribution of the exit plane of the illumination device. In addition a fixed phase distribution $\varphi_{LS}(x,y)$ of the light source plane can be added. Thus the light source device comprises a dynamic scatter plate and a static complex valued amplitude distribution $a_{LS}(x,y) \times e^{\hat{}}(\hat{i} \times \varphi_{LS}(x,y))$.

In other words, a light source of the light source device can be designed to realize a homogeneous illumination of the decoupling plane of the light decoupling element. Here one can use an extended light source and arrange an amplitude filter $a_{LS}(x,y)$ (=amplitude mask) behind the plane of the light source. A primary light source can also be imaged onto this plane by using imaging means. This gives the opportunity to use beam shaping means in order to provide the amplitude distribution of the light source, which results in an optimized homogeneity of the final exit intensity distribution which exits from the light decoupling element.

For example, a circular-shaped light source can be reshaped to a stripe-like light source by using e.g. a cylindrical or astigmatic lens as imaging means. The primary light source can be a laser diode as already mentioned above. The plane of the light source, which has to be collimated and which is subject to an optimization process, can be equipped with a dynamic scatter plate. The using of a laser as light source is important to provide a certain coherence length of e.g. 5 mm to 10 mm. The dynamic scatter plate is advantageous in order to provide incoherent superposition of the plane waves, which forms the tailored angular spectrum of plane waves corresponding to the application. This is very important. For instance, small "frosted" plastic plates or dynamic scattering liquid crystal materials formed as a scatter plate can be used in order to provide reasonable fast dynamic phase variation within the light source plane to be collimated.

In addition, as in the case of the exit plane of the collimation device too, the plane of the light source can also use an additional phase distribution $\varphi_{LS}(x,y)$, which is used to tailor the absolute value of the complex degree of mutual coherence $|\mu_{12}|$ of the wave field, which enters the transparent substrate as light guiding element later on. This can be a reasonable continuous phase function mask or even a surface relief type grating or a computer-generated hologram (CGH) in general.

This phase distribution, which can be used to modify the plane of the light source, can be combined with the amplitude distribution, which is used within the plane of the light source too. Thus an attenuated phase shift mask can be used within the plane of the light source in order to tailor the complex degree of coherence and to homogenize the intensity distribution of the exit plane of the illumination device. An attenuated phase shift mask or an array of attenuated phase shift masks-like elements can provide the complex valued filter function, which is subject to the process of optimization.

Advantageously the at least one light source device can comprise light sources for the primary colours red, green and blue, which are optimized separately regarding the intensity distribution of an exit plane of the light source device, where the optimized light paths of the single light sources are combined before entering in the light guiding element. By using X-cube arrangements as beam combiner for combining the individual colours (red, green, blue (RGB)) of the colour light sources it is also possible to perform the optimization discussed above for the different primary colours, namely RGB, in a separate way.

Red light has e.g. a wave length of $\lambda$=633 nm and thus has a larger divergence than blue light having e.g. a wave length of $\lambda$=457 nm. As already briefly touched above RGB light sources can be optimized separately, where the optimized light paths from the individual light sources can be combined by e.g. using a colour combining X-cube or volume grating based arrangements.

However, a preferred embodiment can use colour film-like amplitude distribution profiles $a_{LS}(x,y)$, which means to optimize the amplitude distribution $a_{LS\_B}(x,y)$ for the blue light, the amplitude distribution $a_{LS\_G}(x,y)$ for the green light and the amplitude distribution $a_{LS\_R}(x,y)$ for the red light separately. These three tailored amplitude distributions of the filters can be exposed into a fine grain red-green-blue type microfiche material. Therefore, reasonable good results could be obtained by using colour filters only. Hence, an X-cube arrangement as beam combiner has not to be provided here.

As discussed above, an angular spectrum of plane waves is tailored by optimization of the light sources of the at least one light source device and the collimation device in such a way that it propagates close to 90° deg (which means 88.5° deg or even 90° deg) to the surface normal of the incidence plane of the light guiding element. The divergence, which is present during the propagation, is used to illuminate the entire plane of the light guiding element. In other word, the beam diameter of the light propagating in the light guiding element has a value in the range of millimeters in one direction, where in the direction perpendicular to this direction the value of the diameter can be greater.

In another advantageous embodiment of the present invention the light can propagate through the light guiding element, particularly through the light conducting core, in a collimated manner in at least one direction. However, the light can also propagate on a zigzag path.

In a further preferred embodiment of the illumination device according to the invention, the light-conducting core of the light guiding element can be made in the form of a holographic volume grating or where the light guiding element can comprise inside a light decoupling element, preferably a volume grating, comprising a plurality of light decoupling segment elements preferably for reshaping the wave field which has to be coupled out and to implement a plurality of optical path differences which are present between parts of the wave field. If the light-conducting core is made in the form of a holographic volume grating then it is provided a layer or a substrate which has both a conducting and an output coupling function for the light at the same time. There are materials which do not comprise shrinkage and which do thus not show any alteration of the recorded grating geometry. A further approach is that the volume of the light guiding substrate can comprise a plurality of volumetric volume grating segments, which are used to provide not only the reshaping of the wave field which has to be coupled out but in addition to that also to provide a plurality of optical path differences, which are present between parts of the light field. The plurality of volumetric volume grating segments can be exposed into the substrate of the light guiding element.

The illumination device according to the invention can be used in a display, preferably a holographic display, more preferably a holographic direct-view display. The display can comprise an illumination device which has inventive features of at least one of the embodiments described above according to at least one dependent claim and/or which can combined with a spatial light modulator device, said spatial light modulator device being arranged downstream of the illumination device seen in the direction of light propagation. This is to say that the present invention can be used in direct-view displays of both reflective and light-transmissive type. Light-transmissive displays thus preferably comprise an illumination device with a light-transmissive spatial light modulator device which is arranged downstream of the illumination device in the direction of light propagation. In reflective displays, the reflective spatial light modulator device is arranged upstream of the illumination device in the direction of light propagation.

The object of the invention is also achieved by a method for measuring and compensating local and/or temporal intensity distribution variations of light existing at an entrance plane of a spatial light modulator device and provided by an illumination device according to claim 34.

With this method dynamic correction is provided, which is based on a measurement of the intensity distribution of the light, which is present within the entrance plane of a spatial light modulator device.

BRIEF DESCRIPTION OF THE DRAWINGS

The invention will now be described in more detail below with the help of embodiments and in conjunction with the accompanying schematic drawings. Generally preferred configurations and developments of the teaching are also explained in conjunction with the explanation of the preferred exemplary embodiments of the invention with reference to the drawing. In the drawing, the figures are side views unless otherwise specified, where the drawing is in each case in a schematic illustration:

FIG. 6 shows a flat volume grating based two-directional backlight illumination device.

Like reference designations denote like components in the individual figures and accompanying description.

DETAILED DESCRIPTION OF THE INVENTION

The grazing incidence illumination device can contain several specific modifications to be used within a holographic display or even within an autostereoscopic display. The illumination device can be used for coherent light and for light which only shows reduced spatial and/or temporal coherence. Amplitude and phase apodization can be used to optimize the intensity profile which propagates behind the entrance plane of the illumination device. Colour filters give the opportunity to optimize this for different colours separately. The specifications are dependent on the discrete embodiment.

The optical setup of the illumination device has to fulfil special requirements which are due to the grazing incidence. One condition is to avoid a light guiding element which can be due to index double steps. These index double steps, dips or peaks have to be avoided. A single index step or a gradient, which do not have a local minimum or local maximum within the transition zone between the light guiding element and a light decoupling element, is not that critical. The better solution is to avoid wave guide effects within the decoupling zone.

There are a lot of parameters of the illumination which can be modified in a way to enable wave front forming, homogenizing and multiplexing of functions. Spectral and/ or angular multiplexing can be used to realize e.g. several one-dimensional or two-dimensional field lenses.

Figure 1:
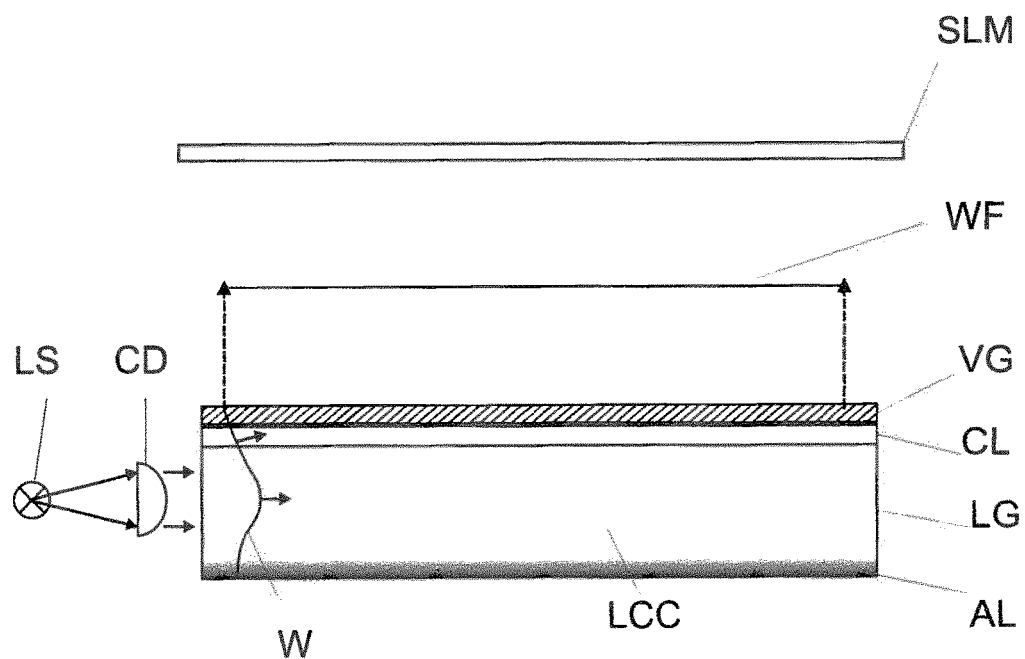
FIG. 1 shows a first embodiment of a flat illumination unit for a display device according to the invention.

Now to the general optical setup of the illumination device, FIG. 1 illustrates a first embodiment of a flat illumination device for a display device, preferably a holographic display device. The illumination device comprises a light source device LS, a collimation device CD and a planar light guiding element LG. The light guiding element comprises a substrate having a light-conducting core LCC, a cladding layer CL and an absorber layer AL. The side of the cladding layer CL which faces a spatial light modulator SLM has a light decoupling element VG which can be a volume grating or another type of grating. The back or bottom of the light guiding element is coated with the absorber layer AL to ensure the mode suppression even if a thin substrate as light guiding element is used. In other words, the absorbing layer AL avoids multi order zigzags as they are present in m>1 wave guiding structures. The cladding layer CL has a function $f(z)=n \times d$, which increases along z, where n is the refractive index of the cladding layer and d the thickness of the cladding layer. Thus a light decoupling element VG, here a volume grating, with a diffraction efficiency eta=constant is used. Alternatively or in combination with a varying of $f(z)=n \times d$, eta can be changed to eta=eta(z). In this case the diffraction efficiency eta is not constant but e.g. increases along z. Z=0 is close to the light source or in this FIG. 1 here, close to the entrance plane.

The light source device LS is arranged on one side of the light guiding element LG, in this figure on the left side. The light source device LS can comprise at least one light source, preferably one light source per primary colour RGB. Seen in the direction of light propagation after the light source device LS the collimation device CL is arranged for collimating the light emitting by the light source device LS. The collimation device CD comprises at least one lens or a lens array for the collimation of light. The E field of the light preferably lies in the plane of the light conducting core and is hence transverse-electric (TE) polarised. The direction of light propagation is indicated by the arrows.

The flat illumination device according to this invention works as follows: Referring to FIG. 1, the light which propagates through the light guiding element LG runs parallel through the light-conducting core of the light guiding element, the interface of cladding and output coupling grating. A part of the light leaves the light guiding element, passes the cladding layer CL and enters the light decoupling element VG, where the remaining part of light continues to propagate through the light guiding element. The light which exits areally at an angle is decoupled by the light decoupling element VG such that it falls on the spatial light modulator device SLM as a collimated wave field WF. This is indicated by the dotted arrows. After modulation by reflective pixels of the spatial light modulator device SLM, the light passes through a λ/4 layer of the spatial light modulator device and illumination device again. After the second passage of the λ/4 layer, the initial polarization TE of the light is turned by 90° deg. The light now has a transverse-magnetic (TM) polarization and is modulated by the pixels with values for the presentation of information.

For a modification of the illumination device to get a required angular spectrum of plane waves which is decoupled from the light decoupling element in the direction to the spatial light modulator device the divergence of the wave field is used. One exemplary embodiment is to use light propagation along the substrate as the light guiding element LG which is parallel to the exit or decoupling plane and thus has a relative angle of 90° deg to the surface normal vector, as shown in FIG. 1. The transport of energy goes along 90° and thus parallel to the exit surface of the substrate. A single wave W of the angular spectrum of the plane waves which propagates has a curvature. In other words, there is not a real plane wave segment here. The inventive idea here is to decouple a slightly curved part of the light at the rim of the wave field only. Due to the laws of diffraction this is a local reduction of the energy. The energy of other parts of the wave field will be transferred to this outer zone to compensate for the local depletion. Thus, a significant part—e.g. 90%—of the entire wave field WF is coupled out on this way.

As shown in FIG. 1, a collimated wave field is touching a decoupling plane lightly. Only a small portion of the wave is depleted by being decoupled into the direction of the spatial light modulator device SLM which has to be illuminated e.g. in a light-transmissive or reflective arrangement.

The light guiding element LG is made of a low refractive index type dielectric material, which e.g. has a refraction index of e.g. $n_{LG}=1.47$. It is used for the grazing incidence propagation of a reasonable collimated wave field. The low index light guiding element LG has an interface boundary plane to the volume grating layer VG, which has a higher refractive index of e.g. $n_{o\_VG}=1.5$.

The 90° deg grazing incidence angle is there refracted to 60° deg in this example, which can be diffracted to 0° deg exit angle. The cladding layer CL in form of an antireflection coating, preferably in form of a dielectric coating, is used between the light guiding element LG and the volume grating VG plane in order to reduce the reflection losses. This geometry described here is a polarization beam splitter geometry, which means that TM (transverse magnetic) polarized light can be diffracted with high diffraction efficiency close to 1 and TE (transverse electric) polarized light can pass the polarized beam splitter volume grating layer VG. TE polarised light can hit a second volume grating layer, which is optimized e.g. to diffract TE at 60° deg to a second exit angle of a multi-directional illumination device.

Although the variations of using polarization beam splitter geometries within flat illumination devices can be limited, it is an additional multiplexing option, which can be implemented within a backlight illumination device and which can add additional freedom of design. Polarization beam splitter and other multiplexing options can be combined.

A further option is to allow the propagation of light in zigzag modes within the light guiding layer. Zigzag modes which have a higher mode number will propagate with smaller angles than modes with a lower mode number. The penetration of the light wave into the cladding layer is increased if the mode number is increased. In other words, higher mode numbers allow for an increased thickness of the cladding layer which can reduce the technical effort to manufacture this cladding layer. A cladding can be used which shows reduced values of the n×d function if the propagation distance is increased. The modification here is to use a volume grating as light decoupling element on top of the cladding layer which is reasonable thick to decouple a reasonable small angular spectrum of plane waves which shall be e.g. 1/60° deg for holographic displays. This means that the volume grating will deplete one mode or a few modes only. A depletion of the mode with the highest mode number would be one preferred option.

A volume grating can decouple the highest mode out and thus deplete the mode at least partially. If light of one mode is depleted than the energy of the other modes is transferred to the mode which does not propagate with the intensity it should have due to the fulfillment of the Maxwell equations. Thus, it is possible to deplete all modes which propagate within a multi-mode light guiding element.

The parameter of the volume grating can be chosen in a way to decouple a single mode which has the right angle. An increased thickness of the volume grating can be used to narrow the angular selectivity of the volume grating. Thus, the decoupling of the wave field can be tailored by using the right parameters of the volume grating. In addition to that a $n(z_{HOE})$ apodized volume grating can be used to eliminate side lobes of the angular and/or spectral selectivity of the volume grating.

An absorptive $a(z_{PD})$ function or a reflective $r(z_{PD})$ function also can be implemented as additional coating which can be used to optimize the intensity distribution of the light which illuminates the spatial light modulator device used. These layers can be placed e.g. between the substrate as the light guiding element and the decoupling volume grating as the light decoupling element.

Figure 2:
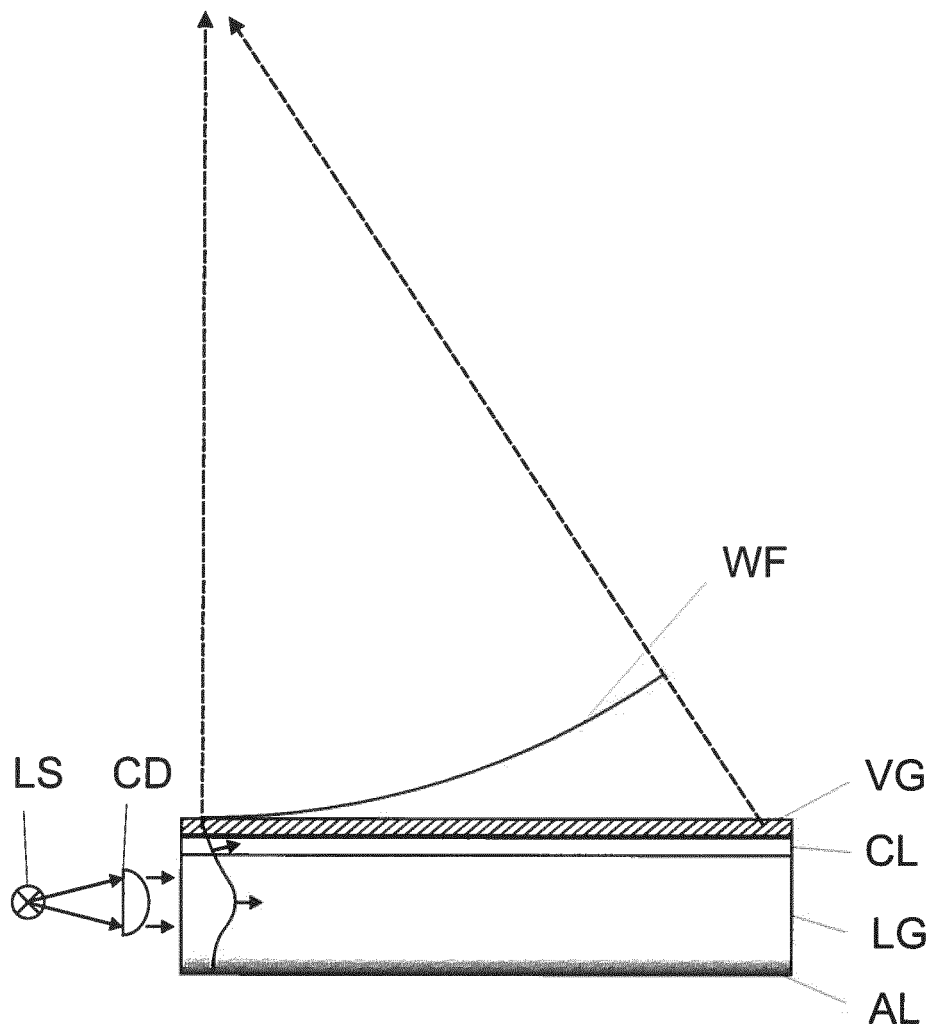
FIG. 2 shows the illumination device of FIG. 1, which provides an off-axis field lens.

In FIG. 2 the illumination device of FIG. 1 is shown, with which an off-axis field lens is created in such a way that a focus function is provided in the light which is coupled out of the light guiding element. Thereby, the wave field coupled out can be directed to or focussed in a desired direction, e.g. to definite areas on the spatial light modulator device.

Figure 3:
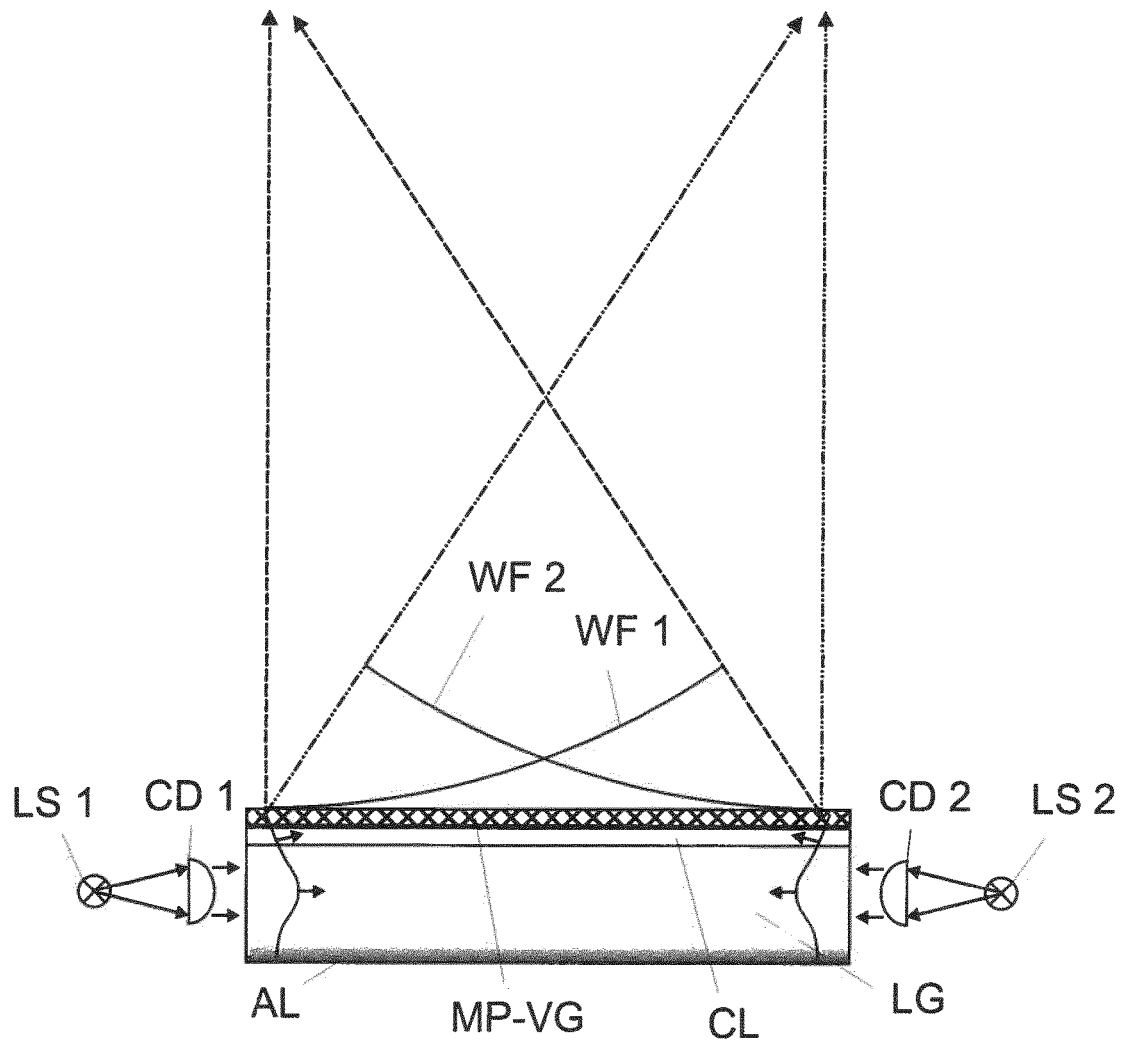
FIG. 3 shows the illumination device of FIG. 1, which provides two separately optical addressed off-axis field lenses.

A grazing incidence illumination device according to FIGS. 1 and 2 is illustrated in FIG. 3, which however provides two separately optical addressed off-axis field lens functions. One can see that for this embodiment of the illumination device two light source devices LS1, LS2 and two collimation devices CL1, CL2 are provided. Furthermore, as light decoupling element a multiplex volume grating MP-VG is provided. The multiplex volume grating MP-VG, can have a graded profile of the diffraction efficiency eta, which increases for increased propagation distances. It should be noted that this has to be provided implemented for both VG and thus in opposite directions. As shown, the wave field WF1 demonstrates the field lens 1 and the wave field WF2 demonstrates the field lens 2. This means the wave field WF1 is directed to a first direction and the wave field WF2 is directed to a second direction which is different to the first direction. This could be done simultaneously or sequentially, e.g. for directing the light to the respective eye of an observer to observe a reconstruction scene.

Figure 4:
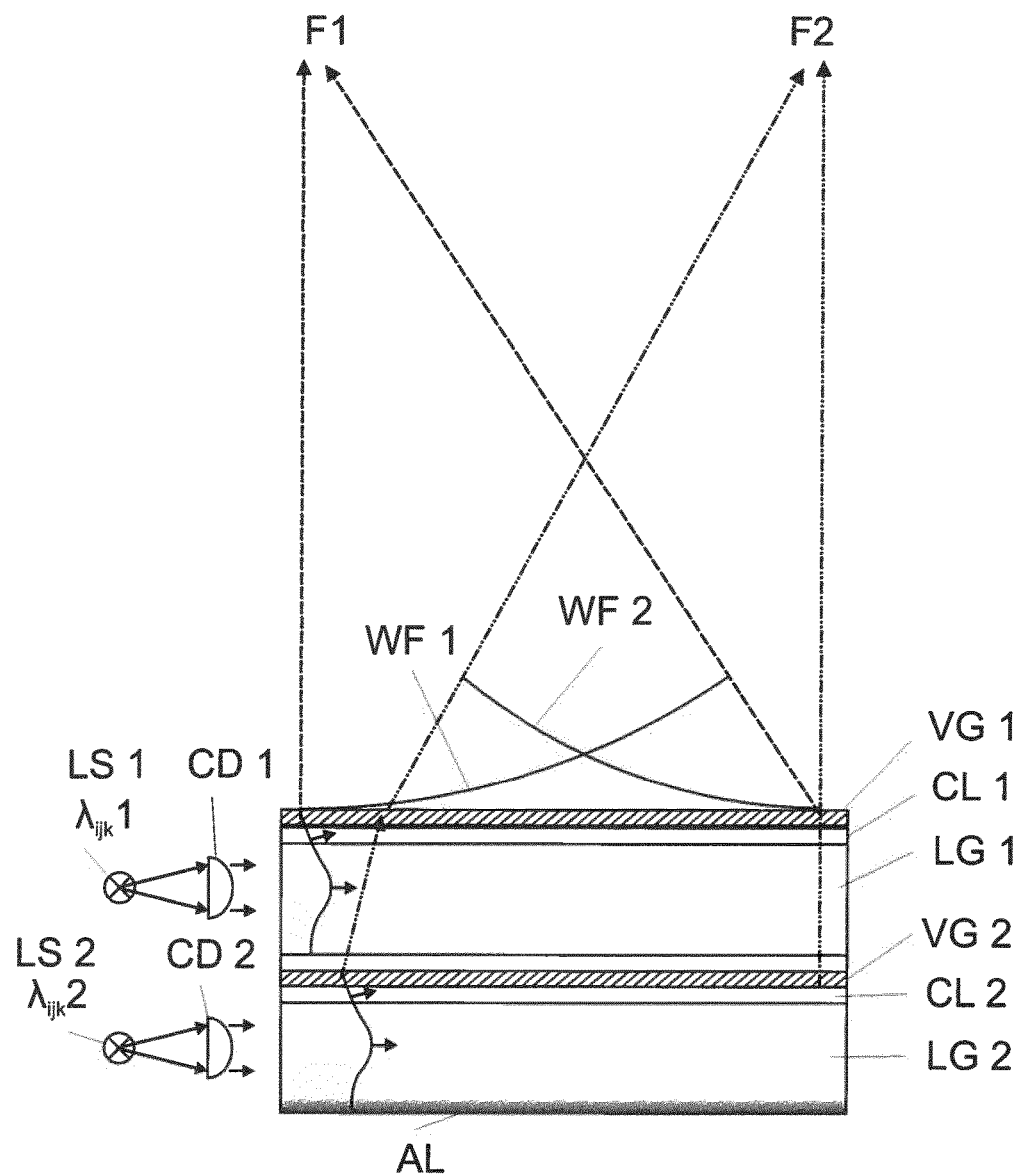
FIG. 4 shows a second embodiment of a flat illumination device according to the invention.

The gracing incidence illumination device can be designed in such a way that the device uses layered light guiding planes and different decoupling geometries, which means different intensity distributions of local exit angles of light. This means, that several layers, which use grazing incidence and volume grating decoupling can be stacked onto each other in order to generate different exit directions or different field lenses, as shown in FIG. 4. In this embodiment only two layers are designed each as the general illumination device according to FIG. 1, i.e. each layer comprises a light guiding element LG1, LG2, a light decoupling element VG1, VG2 in the form of a volume grating and a cladding layer CL1, CL2 between the light guiding element and the volume grating. However, only the bottom layer comprises an absorber layer as shown in FIG. 4. The different field lenses, illustrated as wave field WF1 and wave field WF2, can be addressed by switching ON and OFF the light sources LS1 and LS2, which are arranged to the different layer planes. The reconstruction geometries of the different volume gratings VG1 and VG2 arranging at different layer planes, which are related to different light guiding planes, fulfil the OFF-Bragg condition. Thus, cross talk can be suppressed effectively.

The implementation of angular multiplexing as shown in FIG. 4 within the illumination device has several advantages. A very fast response time is one of them. Thus, an illumination device (backlight or frontlight) can provide e.g. two, four or eight exit wave fields for each primary colour, which is red, green and blue. The main angular multiplexing directions, which can be e.g. 2, 4 or 8, can have slight differences between the colours used. This can be done e.g. to maximize the tracking range or in order to minimize aberrations.

The angular distribution not necessarily has to be equivalent to a field lens or tilted field lens. The distribution can differ from these in order to minimize the local angular load, which has to be provided by the fine tracking device, which can be e.g. an active type polarisation liquid crystal grating (PLCG), which uses periodic liquid crystals in plane rotation and thus differs from the saw tooth phase grating.

Figure 5A:
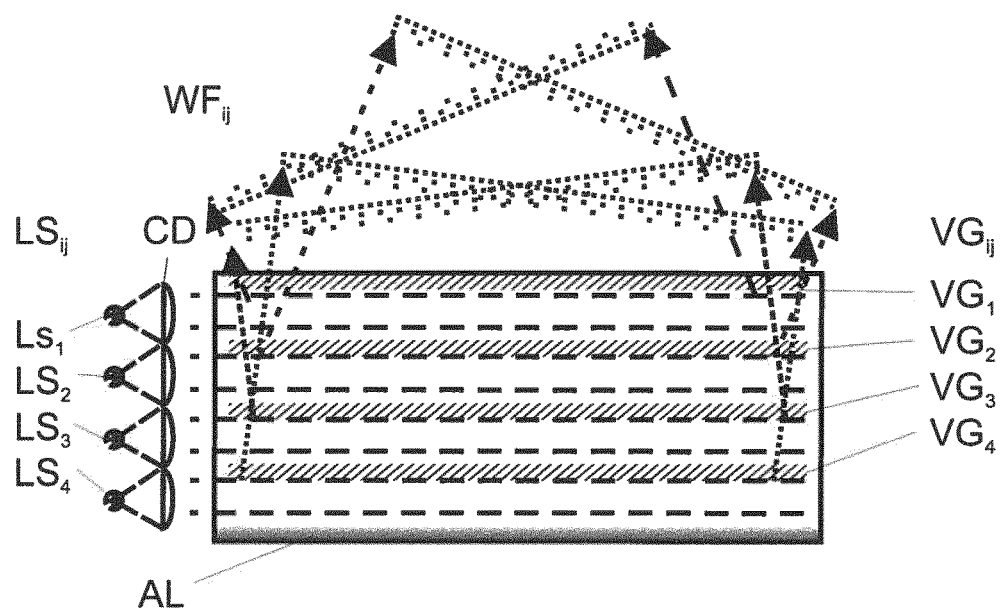
FIG. 5a, 5b shows a layered constructed illumination device.
Figure 5B:
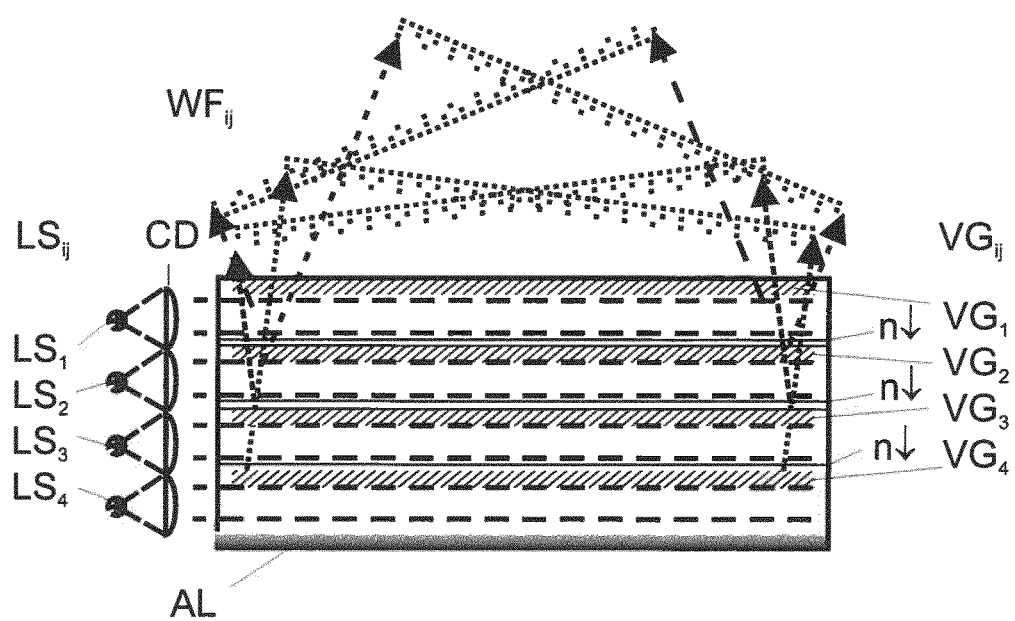

In the FIGS. 5a and 5b a stacked arrangement of an illumination device is shown, where the illumination device is a layered Off-Bragg illumination device which provides angular multiplexing e.g. for an autostereoscopic display or a holographic display. FIG. 5a shows an illumination device with functional separated layers, where in FIG. 5b the illumination device comprises physical separated planes/layers. A practical value of the z extension of a reasonable collimated low divergence wave field is 1 mm to 3 mm. This can be used for propagation distances larger than 1 m. In other words, a single functional layer as shown in the FIGS. 4 to 5b, which can be used e.g. within a backlight illumination device of a 55 inch display, can be 2 mm thick. The layer can comprise a volume grating plane of 1 mm thickness, where the z-width of the collimated wave field can be 1.5 mm. A 4 mm thick backlight illumination device can comprise 2 functional layers, which provide two angular distributions of the light emitted. In combination with a polarization liquid crystal grating (PLCG) having an electrode pitch of 1 μm an entire tracking range of 60° deg can be provided in order to e.g. serve four users as shown in the FIGS. 5a and 5b.

The use of primary colours $R_iG_jB_k$ with spectral spacing gives the opportunity to use one layer for the generation of several angular distributions of the light emitted. A spectral spacing of e.g. 5 nm to 10 nm can be sufficient for a set of a sub primary colour of an autostereoscopic display. Thus, e.g. $\lambda_{B1}=460$ nm, $\lambda_{B2}=470$ nm, $\lambda_{G1}=530$ nm, $\lambda_{G2}=540$ nm, $\lambda_{R1}=630$ nm and $\lambda_{R2}=640$ nm can be used in order to implement a twofold angular multiplexing of a backlight illumination device by using spectral multiplexing or spectral addressing of the angular multiplexing.

It should be noted that an array of reasonable collimated light sources can be used to illuminate the functional layers. These optical channels can be individual controlled in order to provide a scanning illumination device. Also an anamorphic beam expansion, which e.g. uses volume grating(s), can be modified in a way to provide scanning illumination. These scanning embodiments can easily be adapted along the direction, which is perpendicular to the plane, which is shown in the FIG. 5a, 5b. But it is also possible to implement further z functionality in order to provide a scanning of the illumination, which e.g. goes from the left hand side to the right hand side of the arrangements, which are shown in FIGS. 5a and 5b. In dependence on the spatial light modulator driving scheme for example three to four scanning segments can be sufficient.

The following aspect refers to the layered embodiment of the volume grating based decoupling, in particular to the mechanical layout of this.

A plate as light guiding element can be used, which uses a host system and a photo refractive chemical subsystem. An exposure transfers the interference pattern into a periodic modulation n1 of the refractive index. Fully polymerized material is not adhesive. But molecule chains, which do not have a bonding partner, will cause an adhesive surface.

An adhesive surface can be a problem for other process steps. One aspect is dust, which can stick onto the surface.

That is the reason why a sandwich is used, which provides a smooth and not a sticky surface. A sandwich, the structure of which is e.g. PMMA|PMMA+PRCS|PMMA (polymethylmethacrylate (PMMA)+photo refractive chemical subsystem (PRCS)) can be used as plane parallel plate as light guiding element, which will be exposed later on. The surface is fully polymerized PMMS, which is easy to use within a manufacturing process.

It can also be possible to polymerize outer zones of the light guiding element by using a very short wave length, which has a very small penetration depth of e.g. 100 μm only. Thus, an adhesive and sticky surface is avoided and the plate is still photo sensitive inside.

Furthermore, it is possible to use two thin sheets or plates and a space between them. The space can be filled with a reasonable transparent photorefractive material, which shows reasonable low scatter effects. This material can have a matrix host material, which is polymerized after being filled into the space between the two outer sheets.

It can be also possible to use a reasonable viscose curable adhesive, which can comprise an additional e.g. thermal or two components polymerisation based chemical subsystem.

It can be also practical to use photo refractive material, which can be transferred onto the used substrate formed from plastic. This is standard for SU8 photo resists, which are offered in different thicknesses on top of transfer films.

The outer sheet of the light guiding element has a lower refractive index n than the final fixed photo refractive material in order to provide better light guiding.

Here there is free space propagation within a dielectric material, which means that wave guiding structures, in the real meaning, are not the preferred embodiment.

The layered embodiments of the light guiding element in combination with the volume grating as light decoupling element can be modified in a way to increase the freedom of optical design.

The following embodiment refers to an illumination device with combined refractive and diffractive angular multiplexing. A reasonable thin layer of PQ-PMMA (phenanthrenequinone-polymethylmethacrylate) is placed on top of a refractive e.g. bi- or three-directional illumination device. The refractive layer can be close to the exit surface of the diffractive one. A combination of a volume grating decoupling layer, which is at least a part of a transparent substrate as the light guiding element with the substrate element, which carries e.g. a two-dimensional or a one-dimensional lens array using to collimate secondary light sources, is capable of a significant reduction of the weight.

An illumination device providing diffractive angular multiplexing and a slim form factor at the same time has a limited number of exit angles. The number of exit angles, which can be generated depends, among others, on the optical layout and the spectral band width of the light source used. This means that LED (light emitting diode) and OLED (organic light emitting diode) light sources are used within other arrangements than laser diode, which can be used e.g. within volume grating based designs, which require reduced spectral line width.

An illumination device using volume gratings, which can provide a reasonable high number of angular multiplexing exits, makes a refractive sub system obsolete. In this case a refractive sub system can be used as two-dimensional LED based illumination device. This illumination device just enables two-dimensional viewing for a large number of users/observers. In this case the refractive part can just be a standard illumination device, which uses edge-lit LED illumination and e.g. scatter elements or e.g. micro prisms for decoupling.

Several embodiments are practical. A few generic examples are described in the following:

1) One opportunity is to place a diffractive type, e.g. a volume grating layer, behind a plane, which carries the collimating lenses of the collimation device. The light, which is collimated by the three-directional refractive illumination device type will not be diffracted by the volume grating elements, which are designed in a way to provide an off-Bragg condition for these wave fields.

2) Another embodiment is to place a diffractive type, e.g. a volume grating based functional layer, between the collimating lens plane of the collimation device and the secondary light sources, which are collimated by the lenses. To use this arrangement, the volume grating provides the function of re-directing the light and in addition to shape the wave front in order to provide reasonable e.g. off-axis collimation. The refractive function of the lens array as collimation device has to be taken into account within this embodiment. A reverse calculation and a computer-generated hologram exposure can be used to implement the function required. A direct implementation is to use an in-situ exposure.

The over all design can be optimized in order to provide e.g. +10° deg and −10° deg as refractive angular multiplexing and +30° deg and −30° deg as diffractive angular multiplexing. The cross talk has to be limited for the refractive part, for the diffractive part and for the combined angular multiplexing of the entire illumination device.

For example a bi-directional refractive illumination device uses a plane of aperture stops, which is placed at a distance z, which show a symmetric intensity distribution in regard to both light sources, which are collimated by the same lens of a collimation device. A polarisation coded based cross talk reduction can however be more efficient. This also can be used to implement apodization profiles. Such apodization profiles can be implemented as amplitude distributions and/or as retardation profiles, which are analyzed later on by using a polarization filter plane.

3) Z-stacked diffractive angular multiplexing planes can also be used. Thus, refractive lens arrays are substituted by using of e.g. volume grating based angular multiplexing field lens planes. A boundary condition for this, which has to be satisfied in order to avoid cross talk, is a separation of the angular and/or spectral response functions. One example, which can be capable of explaining this, is the multiplexing of two counter propagating geometries. This means that e.g. a 90° deg field lens illuminated from the left side and a −90° deg field lens illuminated from the right side can only be used if an absorber layer is placed at the back surface of the light guiding element in order to block light, which can form a divergent field lens. This conflict can be solved by using slightly different, or generally spoken, reasonable different wave lengths. This means that light with wave lengths of 532 nm and 522 nm can be used as sub wave length of the primary colour green. The volume grating must have here a reasonable selective spectral and/or angular response function. The use of different sub wave lengths makes it possible to illuminate both angular multiplexing field lenses from the same side.

A different solution is to stack several volume grating based field lens planes onto each other. The different angular multiplexing of the field lenses FL_ij will ensure the absence of cross talk if the volume gratings, which should not be addressed, are situated reasonable off-Bragg. In other words, it is possible to stack e.g. four volume grating field lens planes onto each other with or without contact and realize the mutual off-Bragg condition for all volume gratings. A 90° deg field lens geometry requires a reduced coherence length of e.g. ≤1 mm in order to avoid angular addressing ranges, which are e.g. $\frac{1}{1000}°$ deg. These ranges are not practical for the particular application, which is e.g. a consumer three-dimensional display.

Reasonable satisfaction of the off-Bragg condition includes angular, spectral and polarisation selectivity. This can also be applied to pure refractive embodiments.

4) The discussed embodiments above can be tiled, nested tiled and also z-nested-tiled, which means tiled in different z planes. This gives a nested functionality of the illumination device. Functional binary contact and functional overlap can be used.

The layered embodiments of the illumination devices, in particular of the light guiding element, can be modified in a way to increase the freedom of optical design.

A varying slant is preferred in order to implement a pre-shaped field lens function, which is coupled out of the light guiding element. The coherence length has to be adapted in order to provide the angular spectrum of plane waves required. This is due to the fact that an effective thickness of a volume grating, which diffracts the light, depends on the coherence lengths of the wavelet, which propagates along the light guiding element.

An additional refractive spatial sampled prism matrix can be added at the exit plane of the light guiding and light decoupling structure, in particular at the exit plane of the light decoupling element, in order to provide several directions or several field lens functions at the same time. Active controlled functions can be implemented in order to provide a switch ON and switch OFF feature of the sampled directions. This can be implemented with prisms or frustums of a pyramid, which are related to individual pixels or regions of the data panel (spatial light modulator device). Thus, a pixel has e.g. a single prism or several prisms close to his exit or entrance surface. It is also possible to use Moiré effects reducing approaches as e.g. statistic variations of the pitch or prime factors.

The following aspect refers to the angular multiplexing. All illumination decoupling embodiments can be combined with refractive or even diffractive angular multiplex embodiments. Thus, prisms can be used in addition in order to provide additional angles. This can be done RGB (red, green, blue) pixel matched or without pixel match.

In other words, a three directional illumination device can be used e.g. in combination with a twofold angular multiplexing and a polarization liquid crystal grating, which has a blue light diffraction angle of up to ±5° deg only.

It should be noted that an angular multiplexing can be introduced by refractive and diffractive optical elements, which can be addressable or not. This gives the opportunity to implement a lot of alternative variants. Exemplary implementations can be e.g.:

Bi-directional-collimated illumination device|twofold prism angular multiplexing|polarisation liquid crystal grating Polarisation Liquid Crystal Grating—Fine-Tracking A:
Angular multiplexing permanent prisms do not match data pixel
One data pixel serves 2 fixed angular multiplexing directions
Angular multiplexing vertically stacked
Colour sub-pixel v=2×h
Post vertical one-dimensional scatter function
and
Polarisation Liquid Crystal Grating—Fine-Tracking B:
Angular multiplexing permanent prisms match RGB data pixel
Pixel count twofold
Angular multiplexing directions switched ON and OFF by addressing the data panel
Post vertical one-dimensional scatter function These modifications can be combined with zigzag propagation of light from different directions (zigzag in particular in the sense of multiple internal reflections).

The following describes an illumination device for a holographic display. In general, zigzag and no zigzag implementations are optional.

It is possible to implement wavelet like volume grating segment elements in different planes into the light guiding element in order to avoid coherent cross talk and phase irregularities. The lateral extent of volume grating segments can be e.g. less or even within the range of 1 mm. The diffraction geometry can be e.g. 90° deg/0° deg and can be varying with the distance of the centre of the display in order to implement a field lens function. The coherence length of the light source device used depends on the angular range, which is tracked coarse and/or fine by using diffractive elements. A coherence length of e.g. 0.5 mm to 1 mm should be sufficient for a discrete embodiment. Two or even more planes of the light guiding element comprise volume grating segment elements, which do not overlap. The part, which is empty within one plane can carry a volume grating segment element in another plane, which can be placed above the first one. Two adjacent planes of the light guiding element can be separated by a further plane, which is e.g. slightly thicker than the coherence length. Thus, the thickness of the layer to be used for the separation can be e.g. 1 mm. A coherence length of z_c=1 mm is 1/n within the material used. If a laser diode has a coherence length of z_c=1 mm within a vacuum, than the coherence length, which is present within e.g. PMMA is 1/1.5=0.67 mm. Thus a separation with 1 mm PMMA as layer is sufficient to avoid coherent cross talk between volume grating segment elements, which are placed within different z planes. To implement z limited volume grating segment elements within different z planes, a n1(z) apodized volume grating exposure can be used. It is also possible to use several e.g. plane parallel plates of photo refractive material as e.g. PQ doped PMMA (PQ-PMMA). Cross coupled light will propagate within the light guiding element formed as light guiding sandwich plate and will not be coupled out to the user space. This embodiment of using different planes of volume grating segment elements can be used e.g. within a zigzag propagation of light to coupling out geometry or grazing incidence to coupling out geometry. This embodiment can also be used to implement static angular multiplexing. This is done by generating several exit directions of the light at the same time. A volume grating can be multiplexed in a way to generate e.g. three exit beams or wave fields when illuminated with one beam or wave field. Alternatively, standard angular spectral or polarisation multiplexing can be used in order to provide multi directional illumination.

The following described embodiment refers to an illumination device of an autostereoscopic display. A polarization switching layer is used e.g. to turn the light from the TE mode to the TM mode. The diffracted or not diffracted light passes a volume grating based on a polarisation beam splitter. Thus e.g. a +45° deg/−45° deg or a +30° deg/−30° deg volume grating arrangement can be used to provide two light directions. The classic volume grating can be used at the polarization beam splitter series. Volume gratings containing birefringent material, which is e.g. liquid crystal dispersed within a volume grating material, can be used under on-Bragg diffraction to realize diffractive polarization beam splitter geometries. These geometries differ from the classic polarization beam splitter based volume grating series, which is 90° deg, 60° deg, 48.2° deg, and so on.

Several functional layers can be stacked to provide a larger number of directions. An artificial birefringent Savart plate can be used in combination with a prism array, which is placed at the exit plane of the illumination device. A striped illumination enters the Savart plate, which has an additional prism structure. By changing the polarization a lateral shift can be introduced. Different positions of the surface relief structure are illuminated. This means that different prism angles and thus different light directions can be addressed by changing the polarization e.g. from the TE mode to the TM mode.

The following embodiment refers to secondary light source points and a lens array for collimation. A one-dimensional or a two-dimensional lens array is illuminated by using several sets of secondary light sources, which have to be collimated. This can be a set of decoupling points of different light guiding fiber arrays. It is also possible to use small volume grating voxels, which can be designed for different reconstruction geometries and different primary and or subset wave lengths. These volume grating voxels are placed at different lateral and longitudinal positions of the dielectric plate. The intensity management can be done by changing the modulation of the refractive index n1 of the local volume grating. Multiplexing and thus addressing of different subsets of the volume grating voxel line or 2D array can be introduced by choosing different illumination angles, which can be in one plane or even in several, e.g. also perpendicular planes. Spectral subsets of a primary colour can also be addressed. In other words, there are several opportunities to provide subsets of secondary light source point arrays, which will be collimated by a lens array and which will give the opportunity to realize a set of illumination angles. The wave field, which propagates from the volume grating voxel to a collimating lens of the collimation device, can be adapted in a way to provide an reasonable good homogeneity of the intensity of the collimated light. It is also possible to adapt the phase distribution in order to optimize the collimation of light. A field lens function can be implemented.

The collimation of one-dimensional secondary light source stripes can be controlled by volume grating voxels, which are arranged along the light source line. Thus a homogeneous intensity can be provided along the light source line, which has to be collimated.

The embodiment to use secondary light source points, which are collimated by using refractive or even diffractive structures, can be transferred to a foil sandwich. To avoid the angular spectrum of plane waves, which is realized by a prism and a lens layer (e.g. by the company 3M), a lens in combination with a light source point approach can be used. A simple embodiment is a foil having a lens-like surface relief, which is chosen in a way to realize a focal length, which is equivalent to the film thickness. Thus, the back side of a light guiding plate can be coated/structured with a dot or line array, which acts as secondary light source array. Several modifications can be used.

The light source points are small scattering dots, which can be in contact to a frustrated total internal reflection light guiding element in the form of a light guiding plate. It is also possible to use small spheres of Q-dot materials, which are in contact to a frustrated total internal reflection UV-light guiding plate. Volumetric and/or surface relief structures can be used to couple out the light or to act as fluorescent secondary light source point. In addition, cross talk stop layer structures can be placed between the lens and the light source dot layer. These inter lens cross talk suppression structures can be binary or continuously apodized. Thus, a homogeneous collimation can be provided.

The following aspect refers to plane decoupling with volume grating voxels. If a high volume grating voxel density is used then no collimating lenses as collimation device is required. This can be referred to as plane decoupling. A field lens can be implemented by changing the exit angle locally. The volume grating voxel embodiment can be implemented in a grazing incidence illumination device. It is possible to use a stare way-like depth discrimination to reduce the amount of scattered light. The proposed procedure is to optimize the design of the illumination device in a way to minimize the number of volume grating voxels, which are hit by the illuminating beams. The lateral volume grating voxel size should not be too small in order to avoid larger diffraction angles, which are due to the size of the lateral aperture of the volume grating voxels. A geometry used can be 90° deg/0° deg or e.g. a flipped multiplex one. An advanced solution is to combine the stare way approach, which uses volume grating segment elements within different depth planes, with the wedge approach, which e.g. uses illumination at 84.26° deg. This can be done in a grazing incidence illumination device according to the invention, in a flat wedge or in a zigzag illumination device. The entrance angle of the volume grating voxel can be slightly changed or the direction of the entrance beams or both can be changed.

Volume grating voxels and volume grating segment elements in general can be laterally and/or longitudinally apodized in order to optimize the angular, spectral or energy distribution or combinations thereof of the illumination device.

The following described aspect refers to an active type cross talk blocking plane. To use one or even several spatial light modulators (SLM) as active structured aperture stops is not the solution, which provides the minimal effort. The flexibility is high in this case but the costs are high too. If a set of three LSij 1D or 2D matrix-like light source arrays are used in a nested arrangement, which provides e.g. a three directional illumination device, than three controllable apodized aperture stop layers are used to suppress the inter collimation lens cross talk of the lens array used. Several embodiments can be used.

A photo alignment can be used to generate the liquid crystal orientation pattern, which is required for an liquid crystal type embodiment. A polarization filter or an analyzer is placed at the exit plane of the illumination device. Thus, the polarization of the light, which propagated to the data panel as spatial light modulator device, is fixed. The data panel can already comprise a polarization filter, which can be used.

The following embodiment refers to a flat illumination device using a zero mode light propagation. In FIG. 6 it is shown a flat volume grating based two directional backlight illumination device. Two functional planes are illuminated by using two collimation devices CD1 and CD2, which can be switched ON or OFF time sequentially. The light sources LS1 and LS2 are placed at the left hand side of the backlight illumination device. Refractive lens arrays can be used to collimate a set of secondary light sources. In other words, a light source array, which is a line of light source points within the figure, is collimated by using a line type array of small lenses. Two collimated 1D light source arrays are arranged at the left side of the illumination device shown.

The use of off axis parabolic mirrors array illumination, which will be described later, provides an embodiment, which is even more compact.

More field lenses can be implemented by using more of the stacked planes, which are shown in FIG. 6.

Different embodiments can look quite similar. Thus, FIG. 6 can be used to describe a generic layout of an autostereoscopic display-MD-backlight illumination device layout, which uses low coherence illumination and a reconstruction, which is close to 90° deg/0° deg. In the case of low coherence, the light propagates within the weak volume grating, which means within a plane parallel plate containing a very weak modulation of the refractive index n1. The required modulation of n1 can be e.g. 0.0004/mm, which means $4 \times 10^{-7}$ for a path length of 1 m. This is a factor of 100000 compared to the modulation of n1, which is provided by time being photopolymers as e.g. HX 103 from Bayer Material Science. This also means to be able to use complete different materials, which not can be used for standard volume grating applications. But the length of a propagating wave package is defined by the process of emission. Thus, even a tungsten lamp or a LED can generate wave packages, which have a longitudinal extension in the range of 20 mm to 200 mm. At the same time the coherence length of both light source types can be 3 µm and 20 µm respectively. In other words, the length of a wave package, which is defined by the life time $\tau^*$ of the excited state of an electron or an electron-hole pair, is several orders of magnitude larger than the coherence length of the wave package. Thus, light, which is emitted by a LED, cannot be used to illuminate a thick volume grating, which has display dimensions. The angular and/or spectral selectivity of an e.g. 20 mm thick volume grating is too small to be practical.

FIG. 6 can also be used to describe a generic layout of a holographic MD-backlight illumination device, which uses reasonable coherent illumination and the gracing incidence embodiment. The grazing incidence embodiment provides an off-Bragg situation if used in counter propagation mode. This means that a single functional layer can be used to provide two field lenses as in FIG. 3. In this case the field lenses can be multiplexed within a single volume grating layer. This is due to the fact that the volume grating layer will see an angular spectrum of plane waves, which e.g. propagates at −75° deg and +75° deg. Two layers, which are both illuminated from two sides, can provide four different field lenses.

Figure 7:
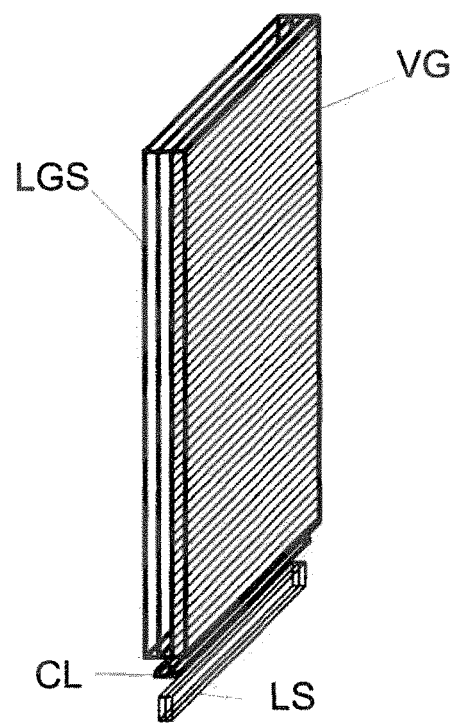
FIG. 7 shows a generic layout of a flat volume grating based backlight illumination device.

FIG. 7 illustrates a generic layout of a flat volume grating based backlight illumination device. The light source device LS is collimated by a collimating lens of the collimation device CL. The light source can be formed as a line light source and can be used in combination with a collimating lens formed as a cylinder lens. A light source array, which is one-dimensional here as shown in FIG. 7, is used in combination with a collimating lens array, which is a lens line type collimating lens array. If light with low coherence length is used, than the light propagates along and within the weak volume grating VG. The light is coupled out successively along the path.

A tablet related modification of the flat volume based backlight illumination device is described in the following. A generally known tablet can have an aspect ratio, which is e.g. 16:9 and thus equivalent to the one of large TV displays. Large autostereoscopic TV displays can use e.g. polarisation liquid crystal grating tracking and two to three one-dimensional field lenses, which are provided by the MD-backlight illumination device.

A tablet can use e.g. polarisation liquid crystal grating tracking and two one-dimensional field lenses, which are provided by the bi-directional backlight illumination device. In contrast to a large TV display, which is used in landscape orientation only, a tablet can be used in landscape and in portrait orientation. This means that a second one-dimensional field lens or two additional one-dimensional field lenses are required in order to provide autostereoscopic display operation in portrait orientation. In addition to this a second polarisation liquid crystal grating is required to provide fine tracking of the two eye of a user/observer.

A first tablet related embodiment provides an autostereoscopic display in landscape only in order to reduce the complexity, the costs and the thickness. An enhanced embodiment provides an additional autostereoscopic display in portrait operation. If a second crossed polarisation liquid crystal grating is implemented, than the eye box can be modified, which means to use a reduced vertical extension of the striped eye box using within the "autostereoscopic display in landscape only" device. This means that the striped eye box, which is shown in FIG. 6, can be reduced along the vertical direction. Sensors, which can be implemented in time being tablets, can be used to detect the rotation of the illumination device. An eye tracking (camera) system can be used to detect the relative rotation of the user, which can be present without rotating the device. This means to provide the autostereoscopic display orientation, which is required.

Due to the fact that a stack layout of the illumination device can be used, which requires optical isolation between the adjacent layers, a high index composition can be used for the light guiding element. High index means in relation to boundary layers. This means, that e.g. the light-inducting core have a refractive index of n=1.7 if the boundary layers have a refractive index of n=1.5 or that the light inducting core have a refractive index of n=1.5 if the boundary layers have a refractive index n=1.45.

Further, inSitu exposure of the volume grating as the light decoupling element can be used. Reconstruction geometries, which are plane wave to plane wave, can be exposed at wave lengths, which differ from the one and which are used later on within the illumination device. This means, that it also can be possible to use UV (ultraviolet) light sources, which are e.g. already used to expose photo thermo refractive glass.

If thick volume grating field lenses should be exposed, than it is preferred to use a reasonable coherent light source for the exposure, which has the same wave length, which is used later on within the illumination device.

To expose a field lens, a reasonable collimated wave field can be used as an exposure beam, which enters the volume grating layer e.g. from the right hand side referring to the FIG. 7. A pinhole, a slit or a special formed small aperture can be illuminated with a laser beam, whereby a divergent wave field is generated, which enters the volume grating layer from the front surface, which is the side facing to the light guiding element. This divergent wave field is used as second exposure beam. The reconstruction of an object is done by illuminating the volume grating layer with reasonable collimated light, which enters the volume grating layer from the opposite site, which is e.g. the right hand side referring to FIG. 7. The exact flip of the direction of the propagation causes a counter propagation of the signal beam, which means that a focussing lens function is generated.

Furthermore, master gratings can also be used. For a 90° deg plane wave to 0° deg plane wave configuration it is preferred to use a master generating the interference pattern required by using a wave length, which is shorter than the one, which is used later on within the product. Visual products can use master gratings, which are exposed to UV light.

The n1=n1(z) embodiment, which e.g. uses a master and which is illuminated with tailored coherent light, can also be used for weak volume grating illumination devices. Actively seen volume grating thickness in the mm range is not practical. Direct propagation within a weak volume grating is not practical.

A one-dimensional field lens, which provides a reasonable, e.g. horizontal extension of the eye box can also be exposed by using an embodiment of the illumination device, This illumination device uses a reflective scattering stripe as light source plane which is illuminated by a laser and then reflected in order to generate a divergent wave field, which interferes with the collimated exposure wave propagating along the volume grating layer. There will be a superposition of a very high number of interfering waves here. Each point of the scattering stripe acts as point light source, which generates a divergent spherical wave. Several exposures can be made close to each other and the striped scatter segment can be slightly shifted between the exposures. It is also possible to use only one point light source at once and to perform several exposures with different point light sources. This means that the point light sources can have different coordinates in space and different times to be used for the exposure. The use of computer-generated holograms (CGH) can provide a high flexibility of the beam shaping, which can be implemented in the exposure of volume gratings.

The following describes a flat illumination device using no zigzag propagation of light. In the case of using light with reasonable low coherence the illumination device, in particular a backlight illumination device uses different implementations of volume grating(s). One approach is to use relatively long propagation distances through a volume grating layer. The z_c is chosen in a way to be sufficient for the optical system used. One could think that to uses z_c<1 mm avoids narrow angular selectivities. But this is not the case. Because of the fact that the length of a wave package, which is defined by the life time $\tau^*$ of the excited state of an electron or an electron-hole pair, is several orders of magnitude larger than the coherence length of the wave package, which means e.g. 200 mm. This is not practical in regards of angular and/or spectral selectivity of a volume grating.

Also described was the opportunity to use stitched volume grating segments within illumination device decoupling planes. This can be e.g. used to realize a diffraction efficiency eta(z) with reasonable precision.

An additional aspect is not to use a single volume grating film only, but to use a reasonable thick layer or even a substrate as light guiding element which comprises inside volume grating segments as light decoupling segment elements which are exposed into this thick layer or substrate as light guiding element. The proposed modification is to use volume grating segments, which have a smaller size than the substrate used as light guiding element. This can look similar to the use of an e.g. 2 mm thick polypropylene (PP) material which is made for data storage applications as e.g. holographic discs. The volume grating segments have lateral extensions which are much smaller than the thickness of the substrate used. The lateral x-y-extension can also be larger than the thickness of the substrate as light guiding element. However, the inventive idea here is to use the entire volume and also to use the entire z range of the light guiding element to implement volume grating segments which are designed in a way to provide the shape of the light field which is required. As in the case of using in storage volume gratings e.g. rice corn like structures, the three-dimensional volumetric shape, the local period, the local index modulation and local tilts can be optimized. This is equivalent to use variable volume grating segments within three-dimensional volumes to guide and reshape optical wave fields which show reasonable low coherence. This can also be used for zigzag or wedge illumination devices.

To correct and reshape arbitrary wave fields, optical systems require depth. A single layer (as shown in FIG. 1) has limited capabilities only. An increased volume used means to increase the capabilities of the optical system. A first modification of a single layer setup of an illumination device uses two or several spatially separated layers as shown in FIG. 4. A further modification uses the entire volume of the light guiding element.

The angular spectrum of plane waves and the spectral line width of the illumination have to be adapted to the volume grating design used and vice versa.

One embodiment to reduce coherent superposition is to use a moving scatter plate or moving scatter plane. Another embodiment is to introduce optical path differences (OPD). This can be done by exposing a plurality of volumetric volume grating segment elements. In other words, the volume of the light guiding element can contain a plurality of volumetric volume grating segment elements, which are used to implement not only the reshaping of the wave field which has to be coupled out but in addition to that also to implement a plurality of optical path differences, which are present between parts of the light field.

An additional aspect is to avoid steps of the refractive index at the borders of the refractive layers of the illumination device. The Fresnel losses, which are due to these steps, can be reduced by using an additional set of refractive layers or by using of a single gradient layer as cladding layer, which can be placed between the light guiding element and the volume grating, which is used for decoupling the light. The gradient layer can be generated by using a diffusion process. One opportunity is to use a step profile which is made first and which is blurred in a second diffusion process. Another opportunity is to use a substrate as light guiding element, which is capable of the generation of volume gratings. One material which can do this is phenanthrenequinone (PQ) doped polymethylmethacrylate (PMMA). This material can be used as substrate of the light guiding element and as volume grating volume at the same time. Index steps are as high as the modulation which is introduced by the holographic exposure.

As in other embodiments the modulation can be chosen in a way to enable the optimal decoupling. This means that the local diffraction efficiency is increased for volumetric volume grating segment elements, which are placed at larger distances from the light source device.

The volumetric volume grating segment elements embodiment can also be used to realize the multiplex of the field lens function or other functions. Stitching of the volumetric volume grating segment elements is possible. This can be done without or with maintaining of the phase relation. A light source with a low coherence does not require a phase continuation of volumetric volume grating segment elements.

One possible exposure process is to use a single wave field or even a single plane wave as reference beam which is used during exposure and to segment or to stitch the second beam.

In addition the multiplex of the illumination and thus e.g. the multiplex of several exit angles of light, the multiplexing of several one-dimensional field lenses and two-dimensional field lenses should be integrated.

As already described above, a grazing incidence illumination device according to the invention can be used for coherent light and for light which only shows reduced spatially and or temporal coherence.

Figure 8:
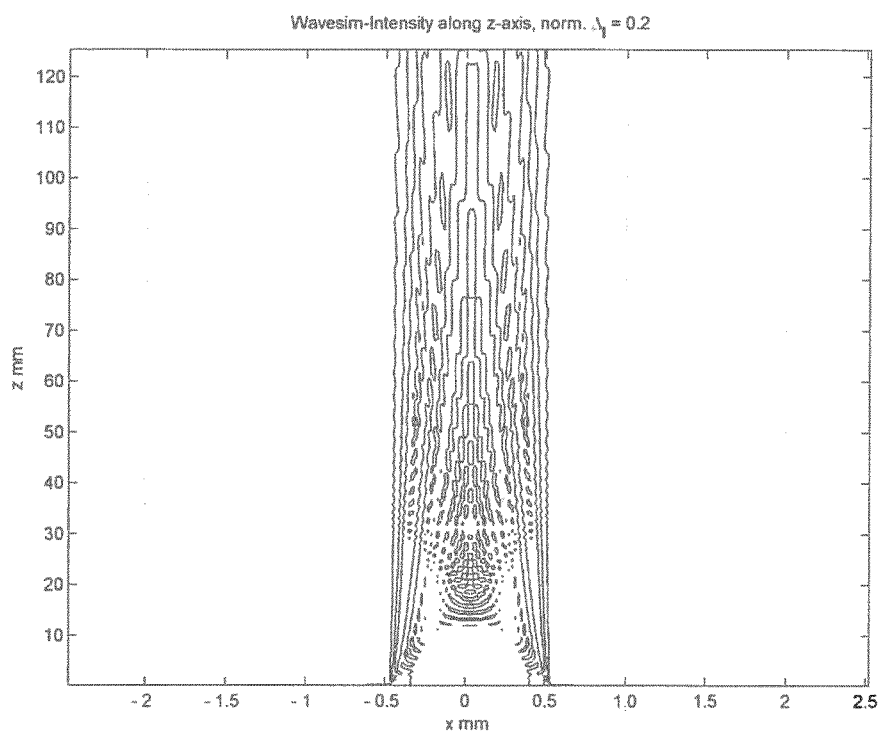
FIG. 8 shows in a diagram an intensity distribution of light behind a slit, the wave length is λ=532 nm and the refractive index of the material is n=1.461 and the propagation distance is 125 mm.

FIG. 8 shows the simulated coherent wave propagation behind a slit of the light source which has a width of 1 mm. This is just free space propagation of a wave field within a low refractive index dielectric material. The propagation distance is 125 mm and thus sufficient for a side illuminated holographic tablet type display. The wavelength used is 633 nm. The slit aperture is illuminated with a plane wave which has a constant intensity distribution.

It can be seen the intensity distribution which is present along the propagation direction z is modulated. Further, the wave field propagating behind the 1 mm wide slit shows significant intensity fluctuations. This makes however a homogeneous decoupling difficult. It should be noted that the amplitude distribution of the one single plane wave, which is used for the simulation of FIG. 8 is assumed to be $\exp(-x^2/x\_max^2)$ with $x\_max=1$ mm. This means that the Full Width at Half Maximum (FWHM) range of the single Gaussian modes, which is 2 mm, is much larger than the 1 mm slit aperture.

The maximum of the intensity distribution is 1 and the steps used to illustrate the intensity profile of FIG. 8 are 0.2. This means that the relative difference between adjacent lines is 0.2 and the maximum value is 1. It should be noted that a step level of 0.2 instead of e.g. 0.1 was used in order to do not overload the FIG. 8 with too many contour lines. Exact values of the relative intensity are shown here in order to make values comparable.

Figure 9:
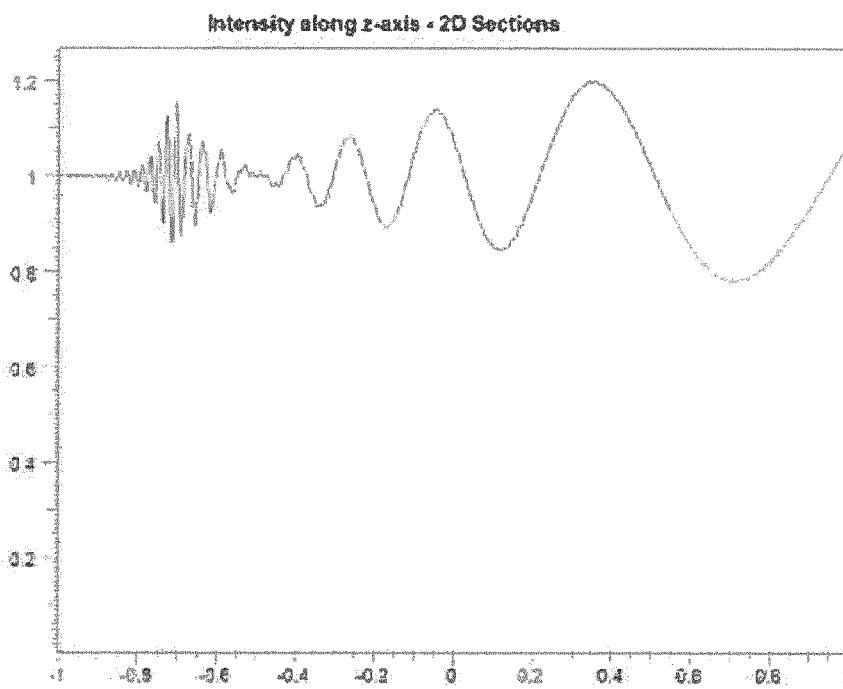
FIG. 9 shows a graph of the intensity distribution of the central line of light propagation which is shown in FIG. 8.

In FIG. 9 it is illustrated a graph of the intensity distribution along the central part of the intensity distribution, which is shown in FIG. 8. Large intensity fluctuations of up to ±20% are present along the z-axis, which defines the direction of light propagation, where these intensity fluctuations do not allow for a homogeneous exit intensity distribution.

The conclusion is that it is not practical to just collimate a point-like or slit-like light source. Therefore, an optimization process of the light source has to be done.

Figure 10:
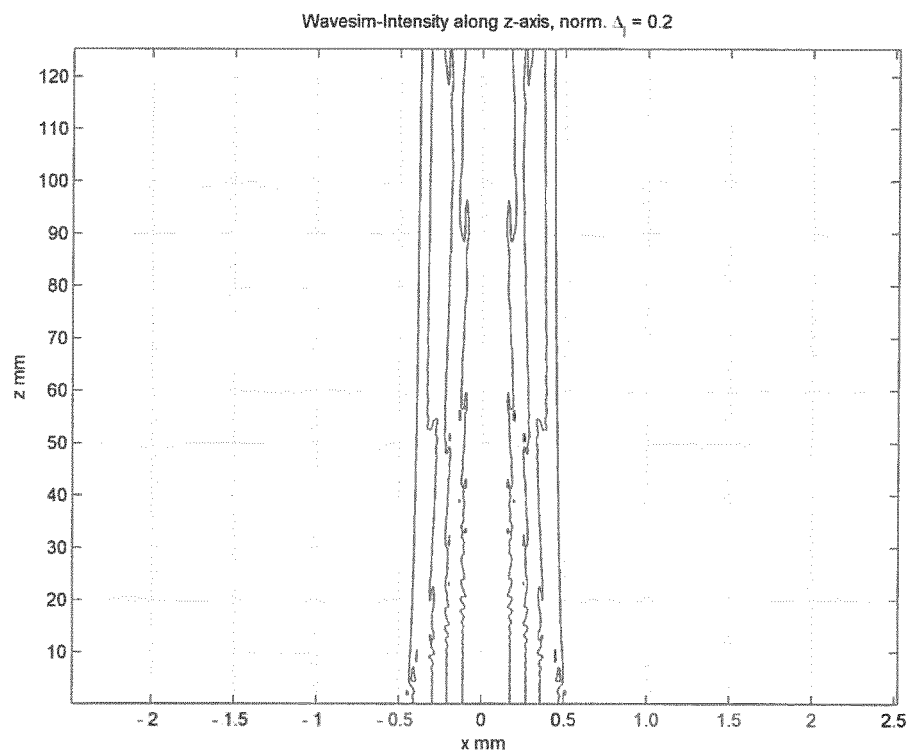
FIG. 10 shows in a diagram a simulated wave propagation behind a slit for an optimized light source, which is mainly characterized by an increased angular spectrum of plane waves (ASPW)
Figure 11:
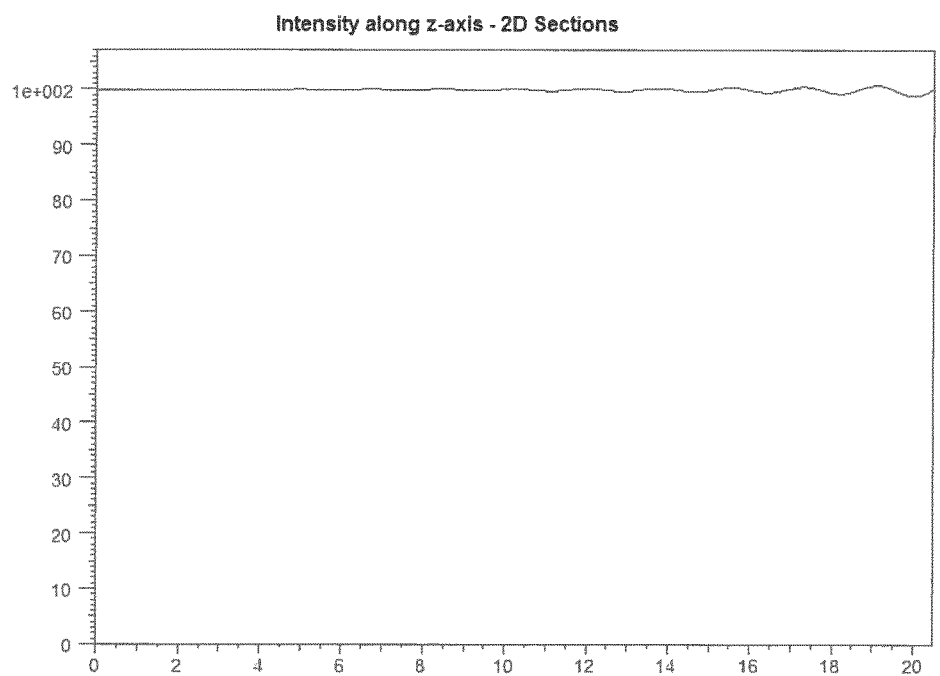
FIG. 11 shows a graph of the intensity distribution of the central line of light propagation which is shown in FIG. 10.

The following FIGS. 10 and 11 shows an optimized intensity distribution of the light source. In FIG. 10 a simulated wave propagation behind a slit of the light source is illustrated which has a width of 1 mm. One hundred wave fields are superimposed incoherently. The propagation distance is 125 mm. The wave length used is 633 nm. The amplitude distribution of each of the one hundred plane waves, which are used for the simulation of FIG. 10 is assumed to be $\exp(-x^2/x\_max^2)$ with $x\_max=0.5$ mm and not 1 mm as described to FIG. 8). This means that the FWHM range, which is 1 mm here, pass the 1 mm slit aperture. The one hundred collimated waves, which are present within the plane of the 1 mm wide entrance slit, span an angular range of the angular spectrum of plane waves of $1/60°$ deg. The waves are superimposed incoherently.

The maximum of the intensity distribution is 1 and the steps used to illustrate the intensity profile are 0.2. This means that the relative difference between adjacent lines is 0.2 and the maximum value is 1. It should be noted that a step level of 0.2 instead of e.g. 0.1 was used in order to be comparable to FIG. 8.

FIG. 11 shows the graph of the intensity distribution along the central part of the intensity distribution, which is shown in FIG. 10. The intensity fluctuations which are present within the central line are less than ±2%. So, it can be seen that only small fluctuations are present. Compared to FIG. 9 this is a reduction of the fluctuations of a factor of 10. A reduction of the fluctuations is a requirement for a homogeneous exit intensity distribution, which is present within the exit plane of the illumination device.

The conclusion of that is that an angular spectrum of plane waves of $1/60°$ deg can be used to improve the intensity distribution significantly.

In other words, to tailor the intensity and phase distribution of the light source, which is required, several modifications can be used. A first way to tailor the wave field is to apply an incoherent superposition of a higher number of wave fields. The resulting field has to fulfil the requirements of the discrete display. This means that in the case of an autostereoscopic display a reasonable wide angular and spectral range can be used. This should be explained with an example. The angular spectrum of plane waves can be chosen in a way to realize $\Delta\alpha=1°$ deg in one direction, e.g. in the horizontal direction, and even more degrees in another direction, e.g. in the vertical direction. The spectral line width can be $\Delta\lambda=10$ nm. In the case of a holographic display these values $\Delta\alpha$ and $\Delta\lambda$ are—in general—much smaller.

In the following an additional modification of an illumination device based on grazing incidence is described. As already mentioned an illumination device (BLD or FLD) based on grazing incidence can comprise several specific modifications to be used within a holographic or even within an auto-stereoscopic display.

Amplitude and phase apodization can be used to optimize the intensity profile which propagates behind the entrance plane of the light guiding element. Colour filters give the opportunity to optimize this for different colours separately. The specifications are dependent on the discrete embodiment of the illumination device.

Figure 12:
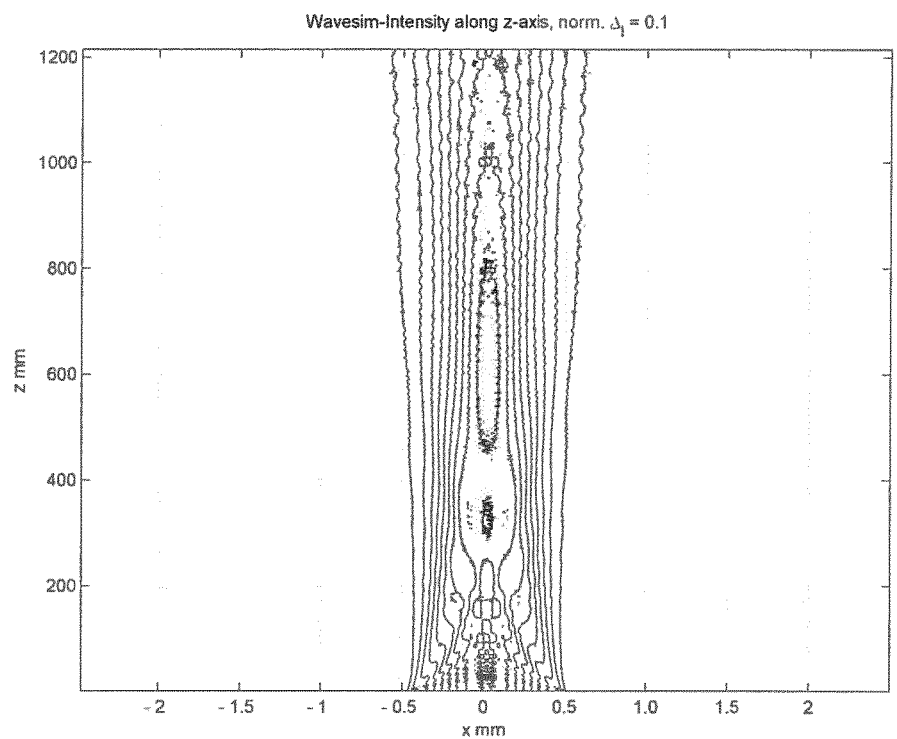
FIG. 12 shows in a diagram a simulated wave propagation within a dielectric medium behind a slit in a further embodiment, the propagation distance is >1.2 m.

FIG. 12 shows a simulated wave propagation behind a 1 mm slit of the light source. One hundred wave fields are superimposed incoherently. The propagation distance is 1215 mm, which is equivalent to the horizontal width of a 55*16:9 display. The wave length used is 633 nm and the thickness of the substrate as light guiding element assumed is 5 mm. In this figure the simulated result of the wave propagation within an illumination device is illustrated. As already mentioned the length of the light propagation is 1215 mm. The tilted black line in the diagram shows a plane, which can be used for the decoupling volume grating. The volume grating can be used to compensate for the intensity distribution which is present within the substrate as light guiding element. This can be done by modifying the diffraction efficiency $\eta(z)$. In addition and or in combination with this the diffraction efficiency $\eta(\theta_{in})$ also can be used. It should be noted that a reasonable thick volume grating can be used to couple out e.g. $1/60°$ deg only. This can be used in the case if the collimation of the light is not sufficient. Volume gratings can be used in a transmission or in a reflective mode. The maximum of the intensity distribution is 1 and the steps used to illustrate the intensity profile are 0.1 here. The relative difference between adjacent lines is now 0.1 and the maximum value is 1. Exact values of the relative intensity distribution are shown in order to make values comparable as already explained to the FIGS. 8 to 11.

Figure 13:
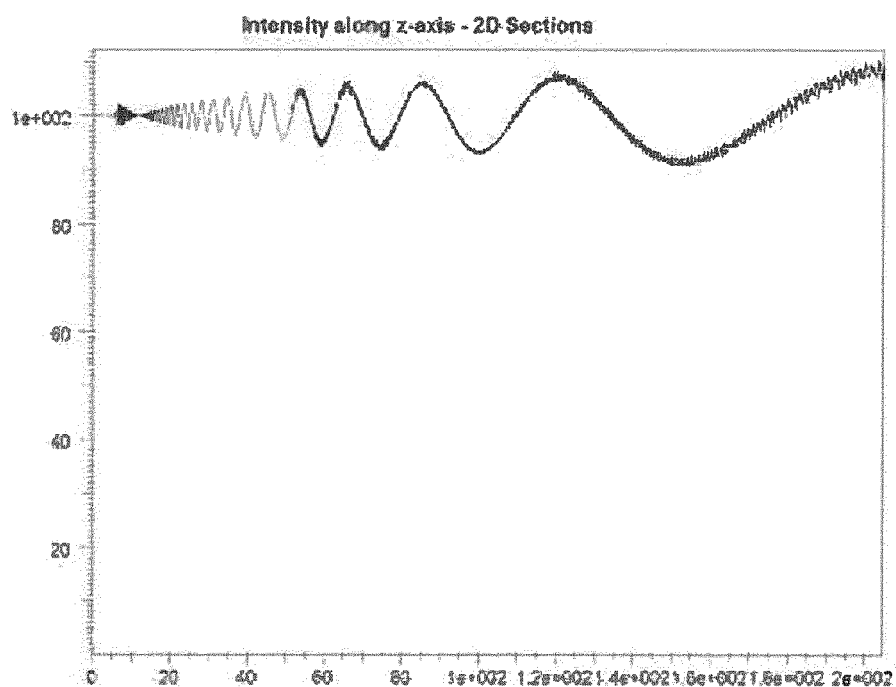
FIG. 13 shows a graph of the intensity distribution of the central part of the intensity distribution shown in FIG. 12.

In FIG. 13 a graph of the intensity distribution along the central part of the intensity distribution is illustrated. In other words, FIG. 13 shows the central part of the wave field, which propagates from $z_o=0$ to $z_{max}=1215$ mm. As it can been seen the highest spatial frequencies of the modulation are present close to the aperture stop having a width of 1 mm.

Figure 14:
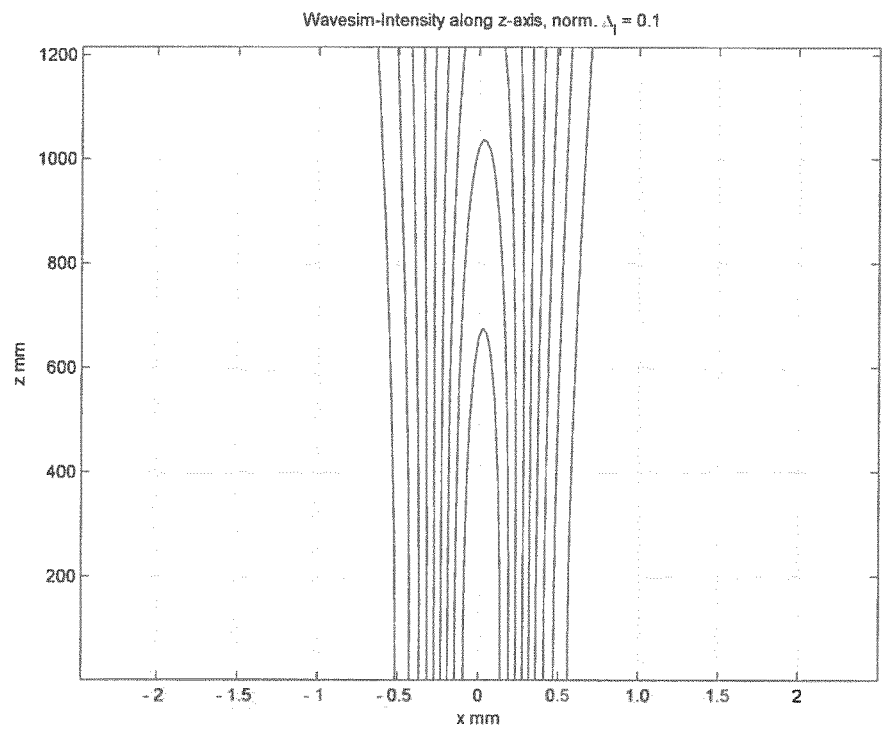
FIG. 14 shows in a diagram a simulated wave propagation behind a slit for an optimized extended light source.

The following explanation refers to an embodiment using extended light source with de-correlated spatial phase distribution. A first procedure to implement the wave field which is required is to use a secondary, distended light source or a light source being arranged spaced apart in the light source device. The light source is realized by imaging a primary light source onto a scatter plate. The phase distribution of the secondary light source is randomized by using of a dynamic scatter plane or a dynamic scatter element such as a plate. A static scatter plane or a static scatter element can also be used if the temporal coherence is reasonable low. Volumetric scatter elements or several longitudinal separated scatter planes which have a defined distance also can be used. A sufficient de-correlation can be obtained in the case of a reasonable large longitudinal extension, which should be in the range or even much larger than the coherence length $z_c$. FIG. 14 shows a simulated wave propagation behind a 2 mm slit. The maximum of the intensity distribution is 1 and the steps used to illustrate the intensity profile are 0.1 here. This means that the refractive difference between adjacent lines is 0.1 and the maximum value is 1. Compared to FIG. 12 a wider aperture is created which gives a better intensity distribution along z.

Figure 15:
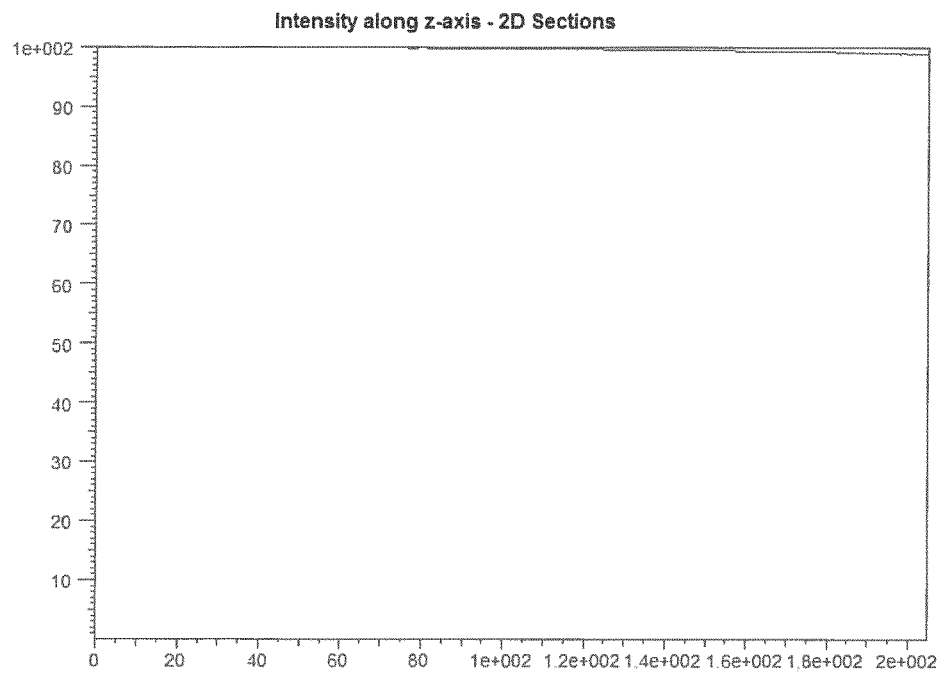
FIG. 15 shows a graph of the intensity distribution along the central part of the intensity distribution shown in FIG. 14.

FIG. 15 shows a graph of the intensity distribution along the central part of the intensity distribution, which is shown in FIG. 14. It can be seen that no significant intensity modulations are present behind the aperture stop having a width of 2 mm. The angular spectrum of plane waves was prepared in order to span $1/60°$ deg of incoherent superimposed waves. The distribution of the angular spectrum of plane waves was chosen to be an angular random superposition of one hundred plane waves.

The tailoring of this reasonable collimated wave field, which enters the transparent substrate as light guiding element, can use several parameters.

The difference between the results, which are shown in FIG. 12 and FIG. 14, is the width of the binary slit (or aperture stop), which is placed behind the collimation device. The aperture stop arranging behind the collimation device can be binary but can also comprise an apodization profile. This means that e.g. a Gauss type of a Kaiser-Bessel type apodization profile can be used. The merit-function, which has to be defined for the optimization, is the homogeneous decoupling of the propagating wave field or at least of a significant part of it, which can also be 30% only. Thus, a Kaiser-Bessel type apodization profile a(x,y) can be used as a starting value only. To realize a continuous window of transmission a(x,y) a fine grain or a holographic type black and white film material can be used. Alternatively, profile type coatings of absorptive material can be implemented in order to realize an amplitude filter a(x,y). It is also possible to press a transparent surface structure, which can look like a lens at the first few, onto an absorptive adhesive material. Materials with low difference of the refractive index are preferable in cases, which have to avoid additional phase deformation. Additional phase deformation can also be taken into account and compensated. The surface profile is chosen in a way to provide together with the Lambert-Beer's law the apodization function a(x,y), which provides the best homogeneity along the entire propagation along the transparent substrate as light guiding element. Thus, an apodization filter arranging behind the collimation device can be a subject to an optimization process.

A phase profile $\varphi(x,y)$, which is present behind the collimation device, can also be a subject to an optimization process. This additional phase function can be combined with the amplitude apodization profile a(x,y), which was discussed above.

The following section refers to light sources using longitudinal de-correlating elements. Moving scatter planes are used to reduce the spatial coherence of a wave field. In addition to this, a longitudinal de-correlation also can be used. This is done if light sources are used which have a coherence length $z_c$, which is to long for the application. In other words, some applications can take advantage of light sources which have a small line width but which can be realized by an incoherent superposition of e.g. several hundreds of equivalent light sources, which realize individual, non-correlated emissions. In these cases, longitudinal de-correlating elements can be used. One basic principle is to separate the light of a single light source into a plurality of beams which propagate along different light paths, which have different path lengths. After the introduction of different path lengths the light is recombined. The difference in the path lengths should be in the range of the coherence length $z_c$ or even longer.

An additional embodiment to this above described is to implement a defined spectral density s(v), which is not just simple de-correlated as described above. This makes sense for some special applications only. A widened spectral range can be used for autostereoscopic displays. But a s(v), which is too wide is not practical for holographic displays.

In general the spectral line width of the primary light source can be chosen or even designed in a way to provide the optimal conditions for the application, which is an illumination device of an autostereoscopic display or a holographic one-dimensional or two-dimensional encoded display.

The following section of the inventions refers to an advanced tailoring of the angular spectrum of plane waves before entering into the light guiding element. The secondary light source can be tailored in all parameters of the wave field used. This means that the use of a scatter plane or scatter plate and the use of an apodized filter with a(x·y) (amplitude apodization) provide a first parameter of the wave field which is tailored to the requirements. Thus, in general a sufficient illumination of a spatial light modulator device (SLM) is obtained.

According to the invention, a further modification of the illumination device can be obtained by using a more complex embodiment. The mutual coherence $P_{12}$ is modified in a way which is more advanced than just using of an amplitude apodization which can be e.g. a Gauss-function, a part of a cosine function or a Kaiser-Bessel window. In other words, the aim here is to homogenize the intensity distribution at the exit plane of the illumination device (please see FIG. 12). Thus, the aim here is different to the suppression of higher diffraction orders only. The intent is to suppress higher diffraction orders of the slit, which means behind the collimation device, which is equivalent to the entrance of the light into a dielectric slab which can be made of e.g. a reasonable low refractive index type plastic. However, in addition to this the intensity distribution has to be optimized along the z axis. A simple homogenization along z is just one possible embodiment.

One embodiment to tailor the wave field which propagates along the substrate as light guiding element is to use Bessel beams. In other words one phase distribution which can be used at the entrance plane of the transparent light guiding plate, which can be e.g. at the left hand side of the display, is the axicon or at least the one-dimensional axicon. The cone angle can be close to 180° deg.

A fixed phase distribution can be used in addition to the complex valued filter which is placed behind a dynamic scatter plane or scatter plate of the light source device, where the scatter plane forms the secondary light source.

It may be difficult to implement a set of wave fields which are all together within the $1/60°$ deg range and which can have different complex valued distributions within the plane of the secondary light source. One opportunity to do this is to use beam combiners. One implementation uses multiplexed volume gratings to combine secondary light sources which have different parameters and thus different characteristics.

It should be noted that the profiles used do not have to be symmetric. As an example, the amplitude apodization also can be made as a combination of a wedge and a symmetric function.

The following aspect refers to the angular multiplex option of light. Different orientations of the propagation of the light can be used. Thus, in dependence on the angular spectrum of plane waves required the optimal orientation can be used. The multiplex of directions, which are emitted into the direction of the spatial light modulator device, is limited. This is due to the small angular range used for the embodiment described here. This means that it is not possible to use a huge number of different propagation angles to address e.g. several one-dimensional or two-dimensional field lenses. One opportunity is however to use different sides of the substrate as light guiding element to couple in the light. This means for the light to come from the left or to come from the right side of the light guiding element as generally described in FIGS. 1 to 5b can be one option. Another option is to propagate upwards or downwards to multiplex e.g. several field lenses.

The following aspect of invention refers to the spectral multiplex option of light. One option to multiplex several one-dimensional field lenses is to use a set of different primary light sources. Thus, several light sources can be used for each primary colour. The spectral separation can be e.g. 10 nm. The illumination device of a holographic display can use smaller spectral steps than in the case of an illumination device of an autostereoscopic display. This means that the green colour of a holographic display can be a set of waves with e.g. 522 nm, 532 nm and 542 nm wavelength. The encoding of the scene colour can take into account which sub-colour is used to turn a specific field lens on.

The following section refers to an in-Situ exposure of an amplitude correction layer using in the illumination device.

A self-exposure procedure is used to compensate for intensity variations of the illumination device. This is an in-Situ exposure of an amplitude correction layer, e.g. an amplitude fine grain film, which is placed at the exit plane of the illumination device and which will show higher absorption at locations which are exposed to higher intensities. Thus, the value which has to be compensated by the data panel itself by e.g. using a Look-Up-Table (LUT) is reduced and no bit depth of the spatial light modulator device is lost for the compensation of in-homogeneities of the illumination device.

Figure 16:
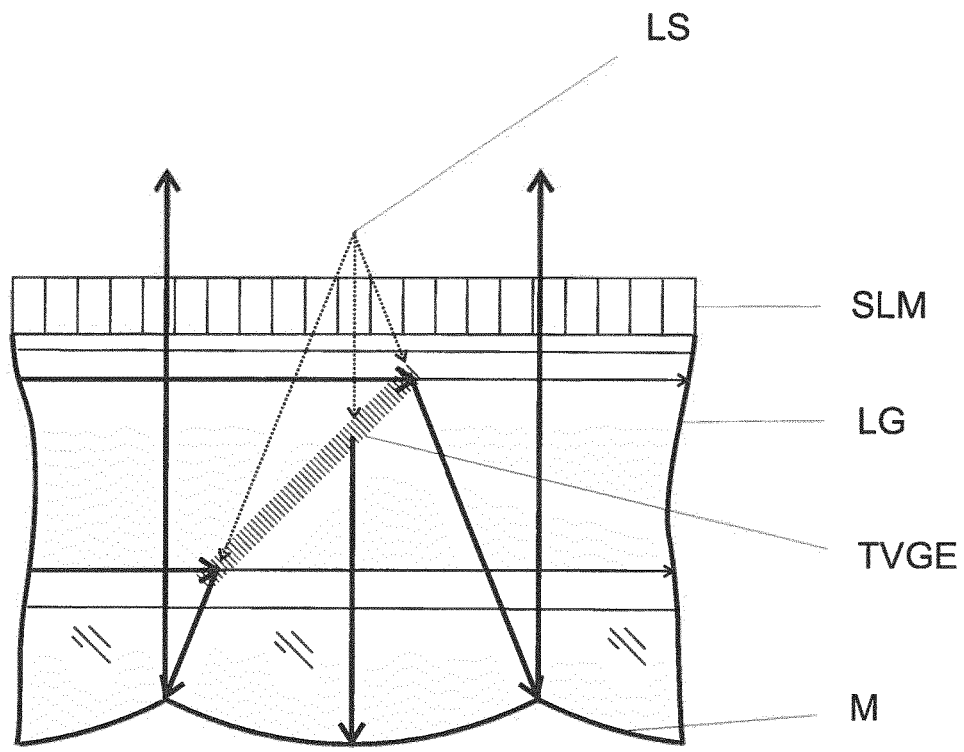
FIG. 16 shows a part of an illumination device, which uses grazing incidence collimated light within a light guiding element and a transmission type volume grating segment elements, which redirect a local portion of the light onto allocated collimating mirrors, which can be parts of an parabolic mirror array, FIG. 17a,17b both show a wedge based illumination device, which realize anamorphic magnification of the wave field along one and along two directions.

The following embodiment refers to a multi-directional illumination device. This embodiment can be combined with the embodiment of e.g. a bidirectional illumination device. Additional aperture stops or patterned retarders can be used in order to suppress the inter-collimating-lens cross talk, which is the cross talk between adjacent collimating segments. A multi-directional illumination device, which can address several exit directions time sequentially or at the same time, can be implemented in different ways. It is possible to use the setup shown in FIG. 16 and add a counter propagating wave and a reflective or transmissive type volume grating segment element, which is placed at a slightly different and thus lateral offset position. FIG. 16 shows a segment of an illumination device, which uses grazing incidence collimated light within a light guiding element LG formed as light guiding plane parallel plate. The light guiding element LG comprises light decoupling segment elements formed as volume grating decoupling segment elements. Further the light guiding element has a light conducting core with a high refractive index. This light conducting core is embedded in a substrate having a lower refractive index. A 45° deg tilted transmission type volume grating segment element TVGE is shown, which decouples a fraction of the light into the direction of a light collimating element. The decoupling volume grating segment element is located inside the light guide cover layer having the low refractive index. A dielectric stack layer can be provided. Parabolic mirror segment elements M are used for the collimation. A virtual light source LS is arranged in front of a spatial light modulator device array SLM. In general, the entire z range between the virtual light source and the collimating optical element M can be used for placement of the volume grating segment element TVGE. This also means that it is possible to use a reasonable small volume grating segment element TVGE as the light source point. This results in an arrangement, which is thicker than the one shown in FIG. 16. Small volume grating segment elements are used e.g. in data storage embodiments using holographic dot segments, which can have an extension of e.g. 2 µm×2 µm×5 µm, (x times y times z), only.

An exact counter propagation from the right hand side to the left hand side in FIG. 16 will generate a counter propagation of the reconstructed wave realizing a real light source point, which is in the wrong direction of the diffraction and has to be suppressed. In order to avoid this angular and/or spectral selectivity can be used to implement an off-Bragg condition.

Due to the fact that grazing incidence propagation can be more practical than e.g. a zigzag propagation, the collimated beam can be used in an in-plane rotated arrangement. This means not to use 180° deg counter propagation but e.g. a 90° deg tilt or a 2° deg tilt. Discrete values are dependent on the discrete volume grating geometries, the discrete spectral and/or angular ranges of the wave field used and on the layout of the volume grating segment elements. This referred to the angular addressing.

The following section refers to the spectral addressing. It is also possible to switch to a second or third set of primary colours, which are e.g. spectral separated by 5 nm, in order to address a second or third volume grating set, which provides a second or third set of segmented wave fields. Thus, it can also be possible to use the same direction of the reasonable collimated wave field, which enters the plane parallel plate as the light guiding element e.g. from the left hand side.

The further following section refers to polarization addressing. Volume grating polarization beam splitter reconstruction geometries, e.g. volume grating at 90° deg or 60° deg diffraction, can also be used here in order to implement the addressing of a directional illumination device by using different polarization states of the collimated light propagating parallel to the plane of the light guiding element. Additional polarization switches are mandatory in order to provide a constant exit polarization state, which can be required by the spatial light modulator device.

The different addressing methods discussed above can be combined in order to provide reasonable selectivity.

A layered arrangement of the illumination device can be used in order to provide an off-Bragg propagation, which can be used in order to enable a multi-directional embodiment of the illumination device. This multi-directional illumination device can use e.g. a setup similar to the one, which is shown in FIG. 16. In other words, the volume grating segment elements shown can be placed in different z planes and can be shifted laterally in order to provide the segmented wave fields, which are collimated by the optical elements, which are used within the collimation device. Thus, several reasonable collimated segmented exit wave fields can be provided in order to illuminate an autostereoscopic display or a one-dimensional or two-dimensional encoded holographic display. The post SLM fine observer tracking can be introduced by using an active type polarization selective in plane liquid crystal rotating phase grating (PLCG).

The following section refers to quantum-dot planes. Quantum-dot planes can also be implemented in the illumination device. Thus, an addressing of different directions can be implemented by activate quantum-dots, which are laterally separated and placed in slightly different z planes or which are just placed within adjacent light guiding structures of the light guiding element, The light guiding structures can be addressed separately. This is related to the infra-red light (IR) and to address different fluorescent colours in different planes. It is also possible to propagate a short wave length along a plane parallel plate as light guiding element under frustrated total internal reflection (FTIR) condition and to generate a visual colour within this plane parallel plate or within a thin additional layer. The local distribution of the dye concentration can be optimized in order to provide homogeneous visual illumination. Volume gratings or volume grating segment elements as light decoupling elements can be used to couple out the light from different directions, e.g. into different directions or into at least approximately the same direction. The local angular distribution can be optimized in order to implement a field lens function, which can be required within an autostereoscopic display. It is also possible to locate quantum-dot materials at local secondary light source points, line segments or lines. Due to the FTIR condition a limited angular range or cone is emitted into the direction of a collimating lens as collimation device, which can be a part of a collimating lens array.

The following described embodiment of the illumination device according to the invention refers to the polarization selectivity. The polarization selectivity of the volume grating used can be used in order to a) implement the OFF-Bragg condition for several reconstructing wave fields, b) in order to optimize the performance of the entire illumination device by choosing the polarization state, which is the optimal one of the complete system or c) in order to minimize the number of components, which are used within the complete device. The grating strength of TM polarized light is $v_{TM}=v_{TE}\cos(\theta)$, where $\theta$ is the diffraction angle, which is introduced by the volume grating. Thus, the ON-Bragg diffraction efficiency is given by $\eta_{TM}=\sin^2(v_{TM})=\sin^2(v_{TE}\cos(\theta))$. Thus polarization beam splitter equivalent OFF-Bragg angles are defined by this relation. The resulting polarization beam splitter geometries can be used in order to implement multiplexing as e.g. an angular multiplexing of functions as e.g. the field lens which can be multiplexed in a way to provide several field lenses FLij. Several field lenses can be addressed by changing the incident angle, the wavelength of the illumination light, which means to use several sub-wavelengths of a single primary colour as e.g. g1, g2, g3 differing only in several nm in their wavelength and so on, or by changing the polarization state. Only polarization beam splitter geometries, which belong to lower grating strengths $v$ are practical. A polarisation beam splitter geometry, which can be realized with the lowest value of the grating strength $v$ is a geometry, which has 90° diffraction angle. This can be e.g. −45° deg/45° deg or −80° deg/10° deg. If the correct grating strength is chosen, than the diffraction efficiency of TE polarized light is 1 and the diffraction efficiency of TM polarized light is 0.

The following section describes the use of polarisation selective geometries of a reconstruction with an example.

A wedge based illumination device uses an anamorphic angle of 84.26° deg in order to provide 1/cos(84.26° deg) =tenfold beam stretching. Two embodiments, which use a tenfold anamorphic stretching, are shown in FIGS. 17a and 17b. These embodiments can be used in order to describe the polarization dependence of different types of volume gratings.

The anamorphic beam stretching factor of tenfold requires an incident angle of 84.26° deg, which is used for all three stretches shown in the FIGS. 17a and 17b. The two beams, which use an incidence angle at 84.26° deg from air to a dielectric plane of the volume grating, are refracted first. This embodiment is used for a reflective type volume grating, which is illustrated in FIG. 7a and for a large display size volume grating, which is shown in FIG. 7b. For a refractive index of $n_{VG}=1.5$ of the used volume grating material, which can be e.g. a photopolymer, an incidence angle of 41.55° deg will be present within the grating volume. In FIG. 7a the collimation is done by using a set of off axis parabolic mirrors M, which are placed along a horizontal line. A similar optical arrangement is disclosed in DE 10 2012 100 201 A1, the complete content of which is incorporated herein by reference. In FIG. 7b a wedge based illumination device is illustrated which uses a first diffraction of −84.26° deg/0° deg in glass and a second diffraction of −84.26° deg/0° deg in air to provide a twice tenfold aperture stretch. Similar optical arrangements are disclosed in WO 2012/004016 A1, the complete content of which is incorporated herein by reference.

Once again, the two beams propagating in air and hitting the interface boundary plane air/volume grating at 84.26° deg, hit the volume grating at 41.55° deg only. Thus, the grating strength $v$, which applies for TM polarized light, is 0.748 lower than for TE polarized light. If the volume grating uses the first maximum of the ON-Bragg diffraction efficiency $(DE_{ON\text{-}Bragg})\eta(\theta)_{ON\text{-}Bragg}$ than the difference between the diffraction efficiency of TE polarized light and TM polarized light is less than 10%. The second maximum of $\eta(\theta)_{ON\text{-}Bragg}$ shows a high polarization selectivity and is close to a volume grating based polarisation beam splitter. The main point here is that the geometry 84.26° deg/0° deg at air can be used for TE and for TM polarized light with a high diffraction efficiency DE>0.9 at the same time. The difference between the gratings strengths, which provides diffraction efficiency DE=1 for TE or for TM polarized light is small. This means that there is only a small difference between TE and TM here. This applies for the volume grating itself. But not automatically for an antireflection coating, which can be placed at the interface boundary plane of air to the volume grating or of air to the substrate as light guiding element. Antireflection coatings show a significant difference between the transmission of TE and TM polarized light in general. Perpendicular incidence, which means anti parallel to the surface normal, will result in the same transmission, but the difference will be increased with increased incidence angles. Of importance is here that the volume grating can be used for both polarizations. However the antireflection coating cannot. This situation completely changes for the beam, which propagates within a substrate as light guiding element and hits the volume grating at 84.26° deg. This embodiment is shown at the lower part of FIG. 17b. A small collimated wave field propagates along a bulk material wedge and is diffracted by the volume grating by 84.26° deg. Thus, the grating strength $\nu$, which applies for TM polarized light is 0.1 times the one, which applies TE polarized light, which means $\nu_{TM}=0.1\ \nu_{TE}$. Thus, there is a huge difference of the diffraction efficiencies between TE and TM polarized light. This is due to the fact that there is close to the polarization beam splitter geometry, which used a diffraction angle of $\theta=90°$ deg. This means that the small volume grating segment VG, which is used to generate the first anamorphic stretch of the embodiment shown in FIG. 17b, can only be used to diffract TM polarized light. The main consideration is here that it is mandatory to illuminate this volume grating plane with TE polarized light, which means that the vector of the electrical field swings parallel to the grating planes of the first small volume grating segment.

A second consideration is here that it is not mandatory to illuminate a second volume grating plane with TE polarized light. To use TE polarized light for both planes is only a necessity if the anti-reflection coating works better for TE polarized light. To provide TE polarized light, which means an electrical field, which swings along the grating planes of the second, larger volume grating, a half wave plate has to be implemented behind the first small volume grating segment.

The described example above shall be just an example, which should point out that the discrete polarization management depends on the discrete embodiment of the illumination device, which uses volume grating(s). As it can be seen from the example above, polarization selectivity can be implemented in several ways.

The embodiments discussed here can be further modified to provide a multi-directional illumination device as the following section describes.

Figure 18:
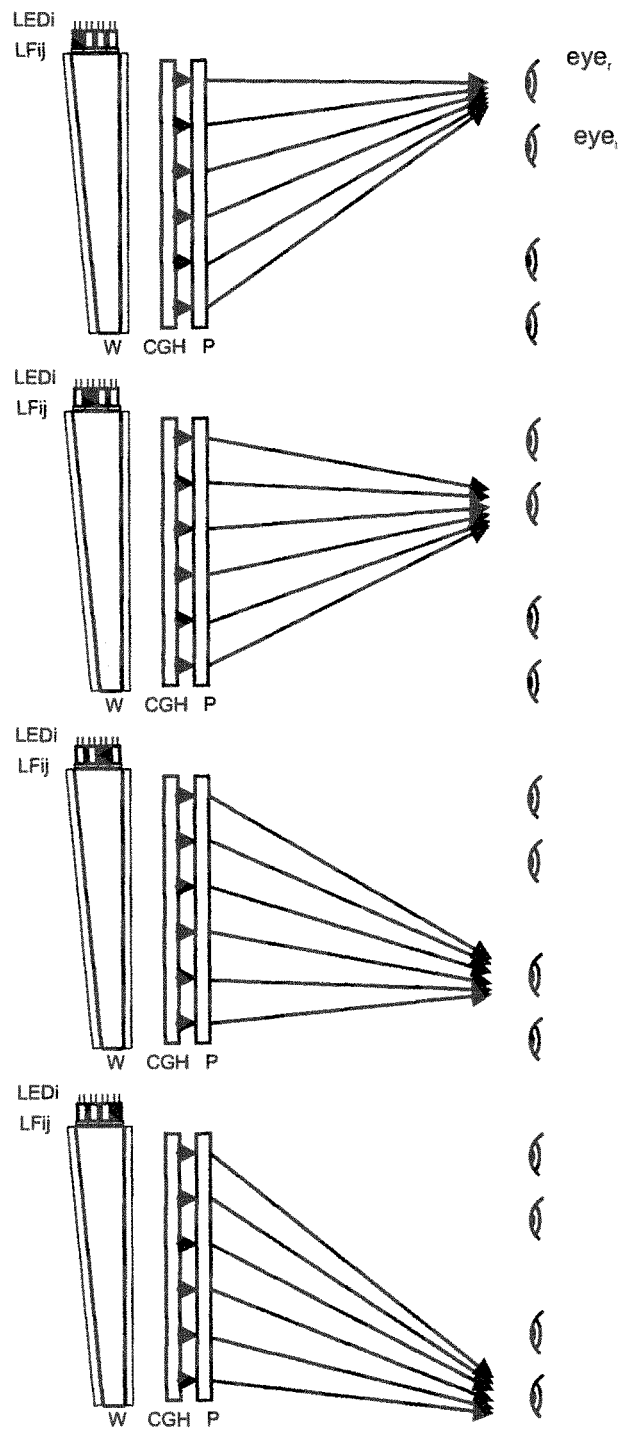
FIG. 18 shows a combination of a spectral and angular multiplex within a backlight illumination device.

Not all embodiments can use angular multiplex as e.g. illuminating the substrate as light guiding element from different directions and using a multiplexed volume grating. For these embodiments a spectral multiplex can be used by e.g. switching on or off different light sources which have slightly different but well defined wave lengths as shown in FIG. 18. Wave lengths can be defined by using laser diodes LD with cost efficient Bragg resonators. Thus, spectral steps of e.g. 5 nm can be realized. This is sufficient for a grating strength $\nu$ of a volume grating which is reasonable high. In other words, it is not mandatory to use a pure angular multiplexing approach for an illumination device. As can be seen from the illustrations in FIG. 18, depending on which laser diode of the light source is switched on, the light decoupling from the illumination device passes a computer-generated hologram CGH, e.g. encoded in a spatial light modulator device, and a polarizer P arranged downstream of the CGH seen in the direction of the light propagation is directed to a defined direction and thus to a respective eye of a user/observer.

The multiplex of angular directions which are emitted from an illumination device can be implemented by using different wave lengths or different entrance angles or both. Thus, the solution can be tailored to the requirements.

Figure 19:
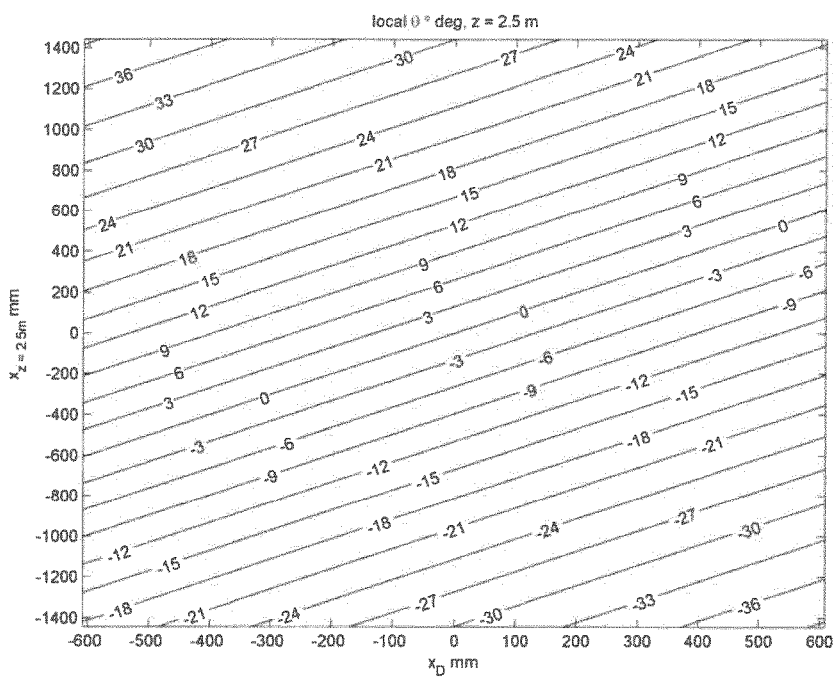
FIG. 19 shows the local horizontal exit angles within the exit plane of a directional emitting display.

The following section is related to a general local intensity distribution of exit angles of a holographic or autostereoscopic display. FIG. 19 shows the local horizontal exit angles $\theta°$ deg within the exit plane of a directional emitting display. The horizontal width of the display assumed is 1220 mm. The z-distance of the user/observer is fixed at z=2.5 m. The lateral position of the user spans a range of ±1450 mm. The central region has to provide an angular range of ±30° deg. The absolute value of the angular range, which has to be provided at the outer positions of the display are similar. The mean angular position of the outer lateral positions is tilted.

Figure 20:
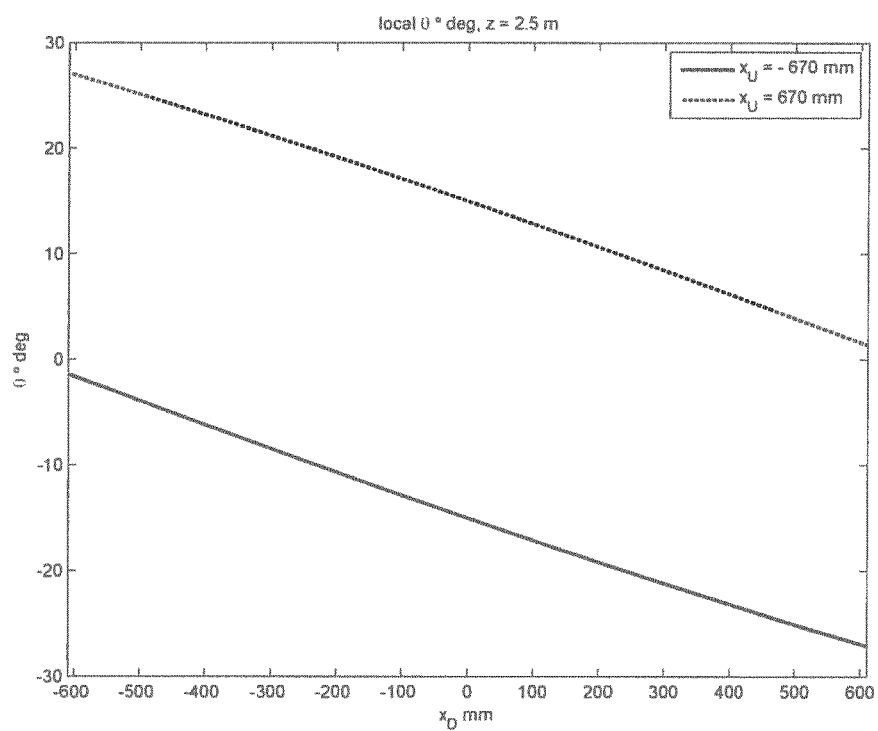
FIG. 20 shows in a diagram the horizontal exit angles within the exit plane of a directional display.

FIG. 20 shows the horizontal exit angles $\theta°$ deg, which have to be provided at the exit plane of a directional display, which has a horizontal extension of 1220 mm. The local angles are shown for two lateral positions x1 and x2 of a user, which is placed at a z-distance z=2.5 m. One lateral position is x1=−670 mm and the other lateral position is x2=670 mm. It can be seen from FIG. 20 that the absolute value of the local angular offset, which has to be provided for both user positions is approximately 30° deg. This means that plane parallel plates, which contain different decoupling geometries, can be stacked onto each other. The local exit angle, which is the signal angle $\theta_S$, can vary about 30° deg and the entrance angle $\theta_R$, which is the reconstruction angle, can be the same and thus e.g. 90° deg. To avoid cross talk during illumination, separated propagation planes or segments are used. Spatially and or spectral separation of equivalent $\theta_R$ can be used to avoid cross talk of different wave front forming states.

A counter propagating wave, which enters a volume grating carrying plane parallel plate as light guiding element at $-\theta_R$ will be diffracted backwards and can be blocked by using an absorptive plane or absorber layer.

The exit angle can differ from 90° deg to the surface normal, which is 0° deg in FIG. 19. As it can be seen in FIG. 20, geometries can be chosen in a way to avoid exit angles, which are perpendicular to the exit surface. These geometries can be used for frontlight illumination devices using volume grating(s), which are placed in front of a reflective type spatial light modulator device. The spatial light modulator device (SLM) reflects the entrance beam at the opposite counter propagating angle. The reconstruction geometry can be chosen in a way to separate "to SLM" and "from SLM" beam paths by using the angular selectivity of the volume grating used. This means that a SLM plane can be illuminated at 5° deg off axis. This also means that an SLM can be illuminated at 0° deg on axis and the SLM pixels can introduce an off axis offset of e.g. 10° deg. This can be done with MEMS (micro-electro-mechanical system) based SLM arrays.

Figure 21:
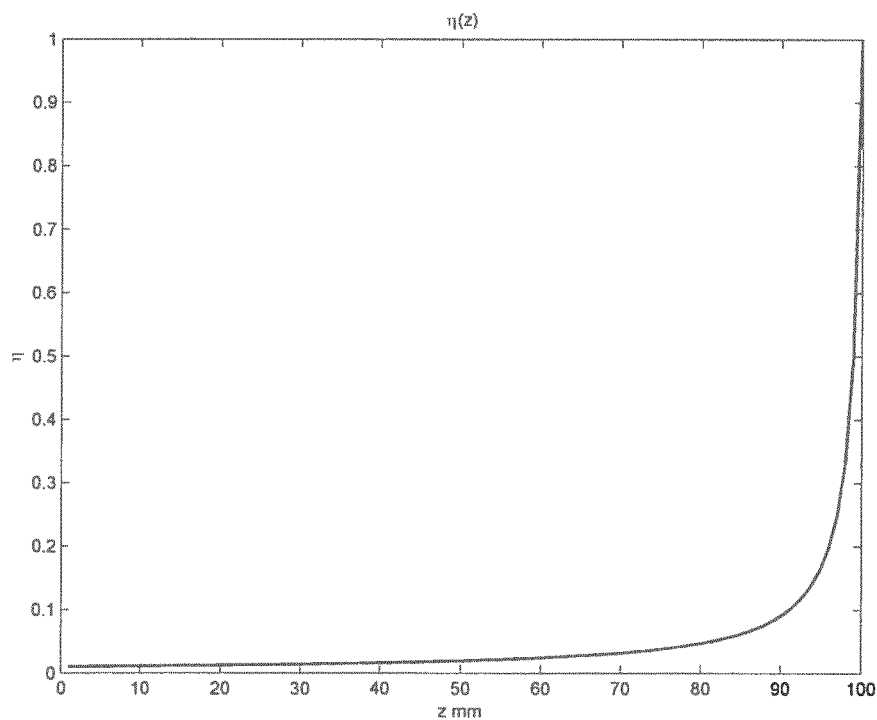
FIG. 21 shows in a diagram an example of a diffraction efficiency.

The following section refers to the distribution of the decoupling efficiency. FIG. 21 shows a diffraction efficiency η(z), which increases along the propagation distance z in order to provide homogeneous intensity distribution within the exit plane and a high overall efficiency. A propagation distance z of up to 100 mm is shown. This representation of z=0 mm to 100 mm can be transformed to an equivalent representation using z=0% to 100% of $z_{max}$, which is the maximum of the propagation distance and can be e.g. 700 mm or 1220 mm, which is equivalent to the vertical and horizontal extension of a 55 inch 16:9 display respectively. A high dynamic range of the used volume grating material is required in order to extract all light out of the illumination device (BLD or FLD). However, the dynamic range required can be reduced by accepting the loss of 20% of the initial light.

Figure 22:
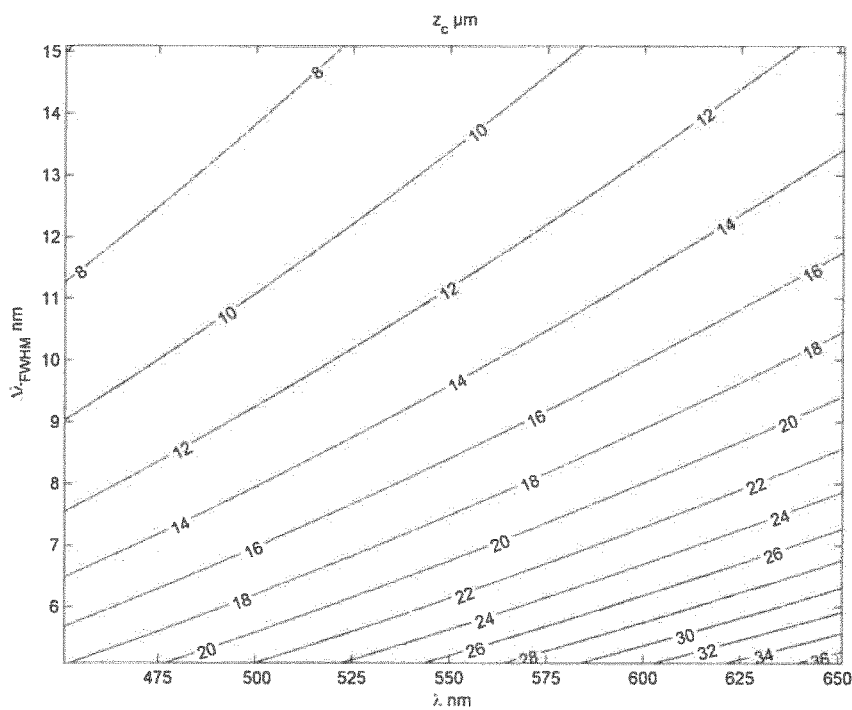
FIG. 22 shows in a diagram the coherence length in dependence on the wave length and the line width.

The following section is related to the spectral distribution. FIG. 22 shows the coherence length $z_c$ in dependence on the wave length λ and the line width Δλ. The length of wavelets defines the effective grating thickness $d_{HOE}$. The effective thickness of a volume grating defines the angular and spectral selectivity of the diffraction efficiency η. In other words, too large values of $z_c$ of e.g. 100 mm are not practical for optical layouts. However, values of $z_c$ of e.g. 5 μm to 100 μm are practical for optical layouts similar or close to $θ_R$=90° deg.

Figure 26:
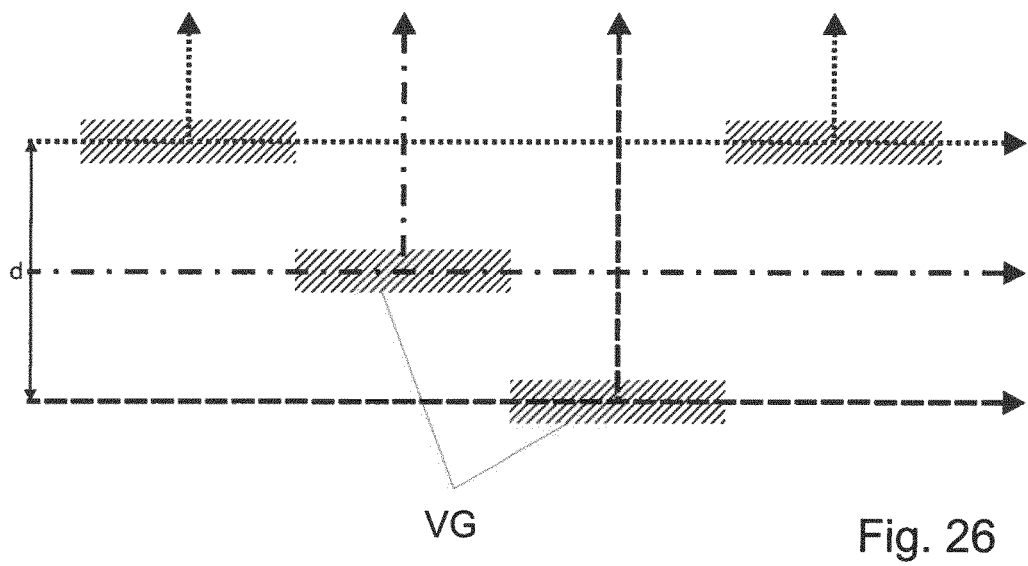
FIG. 26 shows volume grating decoupling segments, which are orientated parallel to the plane parallel substrate serving as light guiding element, which comprises the photo refractive material, where several sets of volume grating segments are located in different depth planes.

The following section refers to the angular selectivity of the large effective grating thickness. FIG. 26 shows the diffraction efficiency η in dependence on the offset to the design reconstruction angle $θ_R$ and the modulation of the refractive index n1. The design diffraction angle is here 88.091° deg. The assumed thickness of the volume grating is $d_{HOE}$=5 mm. The design geometry gives a stretching factor of 30. Thus, the effective propagation length within the volume grating is up to 5 mm×30=150 mm. The coupled wave theory (CWT) of Kogelnik was used for the simulation, which assumes monochromatic waves and thus $z_c \gg d_{HOE}$. The length of the wavelets used has to be small enough to enable a practical angular selectivity, which is e.g. ≥1/60° deg. Even in the case of holographic displays a coherence length of e.g. 1 mm can be sufficient. Thus, practical values of the angular selectivity can be realized.

The following section is referred to the angular dispersion. Another aspect is the angular dispersion of diffractive or even refractive components used in the illumination device. The grating equation $\sin(θ_S)=mλ/(nΛ_x)+\sin(θ_R)$ can be used to calculate the spectral range, which is used in order to realize an acceptable angular dispersion. A wave length of λ=532 nm, m=1, n=1.5, $θ_R$=90° deg, $Λ_x$=354.67 nm gives $θ_S$=0° deg. An offset of $Δθ_S$=±0.5° deg is obtained for a spectral offset of Δλ=±4.64 nm. An angular offset of 0.5° deg can be acceptable for autostereoscopic display embodiments. In other words, the spectral range of light sources used within an autostereoscopic display can be limited approximately to e.g. Δλ=±5 nm. The spectral range used can differ between the red, green and blue primary colour. This can be implemented in order to realize equivalent angular dispersion for all wavelengths. This also can be implemented in order to realize equivalent angular selectivity for the colour related volume grating(s), which can be multiplexed within a plane parallel plate as light guiding element. Triple notch filter can be used in order to provide the spectral distribution required.

The following section is related to the choice of a spatial light modulator device (SLM) in combination with an illumination device. Several types of spatial light modulator devices (SLM) or several modes of liquid crystal based SLM can provide reasonable contrast ratios if illuminated at different angles. Other SLMs do not work properly if illuminated e.g. at 5° deg and 20° deg. These types of SLM work for a small angular range only. Still other SLM types give reasonable contrast if the local illumination angle is taken into account. This means that e.g. a slight change of the pixel signal can be introduced, which depends on the local illumination angle. Phase values, optical path lengths or optical path differences (OPD) can be slightly changed in dependence of the local illumination angle. This can result in an adapted refresh rate of the SLM used. This means that the refresh rate of the SLM can be increased.

The following section deals with material properties. The layered volume grating embodiments, which are described in this document, are realized by using volume grating materials or embodiments, which make use of volume grating materials, which can differ from e.g. a volume grating foil on top of a substrate arrangement.

Several plane parallel plates comprising volume grating material are used in order to realize a stacked Off-Bragg volume grating reconstruction of a multi-directional illumination device.

In contrast to a volume grating material having e.g. a thickness of 20 μm and which is placed on top of a e.g. 150 μm thick reasonable index matched carrier foil, the volume grating material can be used in volumetric segments, which can be e.g. 1200 mm×700 mm×2 mm. In other words, the volume which is occupied by the volume grating material and used for decoupling or wave field reshaping is increased by a factor of 100.

Standard materials as e.g. HRF films (DuPont) or Bayfol HX films (Bayer Material Science) cannot be the best choice for the embodiments described here. This is due to the costs, which are too high if using a special purpose optimized foil type volume grating material at 2 mm thickness instead of 20 μm.

The following section refers to the modulation of the refractive index n1 in combination with material properties. Volume grating foil based materials are usually optimized in a way to provide reasonable high modulation of the refractive index n1. The material has to generate sufficient index modulation in order to enable diffraction efficiency close to one for the thickness of the volume grating film and the geometry of reconstruction used. This means that a modulation, which is required for a defined geometry of reconstruction, can be e.g. n1=0.02. This value is required to e.g. diffract a wave segment from −45° deg to 0° deg with diffraction efficiency close to one. The discrete value of the modulation of the refractive index, which has to be realized, depends on the diffraction angle, the entrance angle, the wavelength, the initial refractive index, the polarisation, the thickness of the volume grating layer and of course on the diffraction efficiency, which should be realized. For more details it is referred to the CWT of Kogelnik.

The stacked layer Off-Bragg illumination or the grazing incidence illumination, which uses volume grating decoupling will require much lower modulation in general, which means e.g. n1=0.002, n1=0.0002 or even much smaller values than these. These values can be slightly increased in dependence on the propagation distance within the light guiding element, which can comprise the volume grating material. Very small values of the modulation of the refractive index n1 can be used. This gives the opportunity to use a wide range of volume grating materials. High shrinkage materials as e.g. dichromat gelatine (DCG) are not preferred especially for very thick layers. The index of refraction n1 can be reasonable high, which means very low in general and the shrinkage has to be reasonable low in order to provide the angular geometries and the angular tolerances required.

The following section is related to index matching of adjacent layers. The match of the refractive index is an important aspect for volume grating embodiments. Reasonable sufficient index match has to be implemented in order to avoid reflections, which can cause a reduction of the image contrast. Special embodiments use index steps and defined reflectivity in order to guide the light within a glued sandwich of dielectric layers or plane parallel plates. Therefore, index match is important in general.

One embodiment to provide index match is to embed the volume grating layer into a substrate material as light guiding element, which is already used for backlight illumination (BLD). Several display classes have a refractive index n close to 1.5, as e.g. Corning eagle XG, which has n_532 mm=1.51. This means, that a display can based on material, which has a refractive index of n≈1.5. This means that it is preferred to use e.g. a PMMA based material combination rather than a PC (polycarbonate) based material combination. This is due to the fact that n_PMMA_532 nm=1.495 and n_PC_532 nm=1.592.

In the following section general usable materials are described. A wide range of material can be used within thick volume grating plates. The intention here is to describe several practical basic material compounds and embodiments.

Glass based photorefractive materials as e.g. photo refractive glass, which can be thermal processed after an UV or visible exposure in order to increase the refractive index n1. Higher temperatures of e.g. 300° C. to 500° C. will increase the diffusion of the compound used. Companies as e.g. Corning and Schott provide glass, which can be used as photo refractive material. These glass based materials are used to write Bragg gratings into optical fibres and gratings, which are used for wave length multiplexing and wave length de-multiplexing telecommunication devices. Glass based Bragg gratings are also used in order to act as a wave length dependent and thus wave length stabilizing resonator mirror. The density of B270 glass is 2.55 g/cm³. A plate can have 1200 mm×700 mm×2 mm=1680 cm³ and thus has a weight of 4.3 kg if made of glass. The density of PMMA is (1.17-1.2) g/cm³. A plane parallel plate as light guiding element, which has e.g. 1200 mm×700 mm×2 mm=1680 cm³, will have a weight of 1.99 kg. The weight is an aspect which is important for large displays. Thus, plastic based substrates as light guiding elements are preferred.

Polymer Based Photorefractive Materials:

A photopolymer comprises several chemical components. The different components fulfil different requirements. Several chemicals act in different roles. Each part within the chemical arrangement can be filled by a specific chemical, which is one of a specific group. This means that a huge number of different monomers exists, which can be polymerized. This also means that there is a huge number of different dyes, which have a sufficient cross-section and thus can be used in order to absorb the photon energy, which is present within the three-dimensional interference pattern. A host matrix can be used in order to reduce the shrinkage, which is due to the polymerisation. The material of the host matrix can differ from the material, which is polymerized by the interference pattern. The polymerization, which is due to the interference pattern, can be a direct polymerization or a result of a reaction chain, which can also require further thermal and/or chemical treatment.

The dye or more precisely the chromphoric group acts as the photosensitive component. The dye collects the optical energy. The spatial distribution is defined by the interference pattern. Different chromphoric groups have the maximal absorption at different wave lengths, as e.g. C=C in ethylene at λ=193 nm or N=O in 2-methyl-2-nitropropane at λ=300 nm and λ=600 nm.

There are several ways to polymerize here. One way to go is the direct photo induced polymerization, which is described as follows:

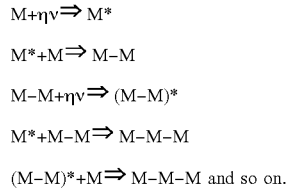

The most monomers (M) have maximal absorption at wave lengths, which are significant below 400 nm. To use visible instead or UV lasers can be more comfortable and more cost efficient. Another aspect is the absorption which increases at decreased wave lengths. This will generate a z apodization (i.e. an apodization in the direction of the propagation of the illumination light or perpendicular to the surface of the material into which a volume grating is illuminated) of the interference pattern. To avoid z apodization a reasonable low absorption is required for photo refractive materials, which have a thickness of e.g. up to several mm.

Another way to a photo induced polymerization is to use a sensitizer (S), which is described as follows:

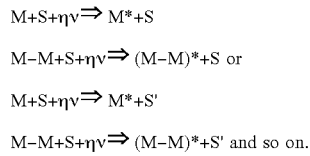

A sensitizer S is used for the charge transfer and can be left chemically unchanged. Thus the sensitizer can have the same structure after the reaction. The sensitizer can also be modified during the reaction to S'. Thus the sensitizer can be exhausted during the charge transfer. The use of a sensitizer gives the opportunity to use visible lasers for the exposure of the interference pattern. A polymer host matrix can be used, which carries PQ (phenanthrenequinone) molecules and further monomers or oligomeric components, which can be photo induced polymerized. PQ molecules act as doping agent.

If the quantum efficiency of the photo induced polymerization is too low, then additional post exposure thermal activation can be used. This increases the polymerization cross linking and also the refractive index n1 obtained.

A special aspect describing in the following, which has to be addressed for mobile application is the bending of the display device, which can be present. A bending will cause a change of the intensity, which is transmitted to a plane of a spatial light modulator device (SLM). The SLM or even another plane can comprise sensor elements, which detects the intensity distribution of the illumination. Hundred points as sensor elements can be sufficient, which e.g. work at 30 Hz. These types of sensor grids are already known from prior art. However, the sensor elements detect the light, which comes from the user space. This can be flipped in order to look to the illumination device or it just can be used by applying a filter operation, which detects the frequency of the illumination device. Dynamic changes, which are due to changing forces can be detected and a compensated by using an offset value, which is given to the SLM.

Now to a further aspect of the invention, the problem here is to provide a thin illumination device which can be used for holographic display devices, as e.g. mobile holographic three-dimensional display devices or even larger holographic display devices, or autostereoscopic display devices. A problem of very thin embodiments of an illumination device can however be the small tolerance values, which are possibly necessary. In other words, some very thin setups of the illumination device can be very sensitive to the change of mechanical parameters.

Therefore, a method is described which can be used to measure the result of mechanical stress inside the embodiment of the illumination device or within the display itself.

A photo detector array is provided to detect local temporal intensity variations of the intensity distribution of light which is coupled out by an illumination device. The background is that flat coherent illumination devices which are used e.g. within (mobile) holographic display device applications can suffer from mechanical stress which cause changes in the local diffraction efficiency of used volume gratings or other angular and/or spectral sensitive optical elements.

The photo detector array is in this described embodiment a detector grid, where naturally other types of a photo detector array can also be used as e.g. semi-transparent or highly transparent photo detectors. Detectors of the grid can be made in a way to minimize the disturbance which is introduced to the wave field propagating to a user/observer. One option to do this is to place the detector grid onto absorptive areas of a spatial light modulator device (SLM) itself.

An additional option to provide a detector grid which can be used in forward direction or, as supposed here, backwards is to use a light guiding grid or light guiding lines with defined "couple in points". A "couple in point" is formed e.g. by using of 45° deg fiber ends or a small size diffractive element on top of a fiber The array of couple in points is arranged in front of the SLM in order to act as grid of detection points.

Photo detector arrays arranging inside of spatial light modulator arrays had been already described in the prior art. The purpose of these proposals is mostly to implement an optical alternative to a touch screen embodiment, which means to detect the position of objects as e.g. fingers by using of a grid of photo detectors.

The main purpose here is however to detect the intensity distribution, which is present at the spatial light modulator device (SLM) in a temporal and spatial resolved way. Additionally detector elements, which detect mechanical stress, can be used. Striped PZT detectors are e.g. used to detect elongations. Optical fibers also can be used for this. Thus, several methods can be provided to detect e.g. the bending of a light guiding substrate. In contrast to this a photo detector array can be used to detect the parameter of interest in a direct way. Varying intensity distributions I(x,y,t) of light coming from an illumination device provided in a holographic display device are measured and are compensated by writing compensated transparency values into the SLM. A holographic encoding device takes the measured values into account for the encoding. Thus, a three-dimensional (3D) scene which is obtained by e.g. a one-dimensional (1D) or two-dimensional (2D) encoding will not suffer from intensity variations.

It is possible to use a photo detector array in backward and forward direction. This can be done if the illumination device works in a time sequential way. Thus, a photo detector array using to detect motions of the user/observer or of objects as e.g. fingers and which can be arranged close to a display device can also be used to detect varying intensity distributions I(x,y,t) on the exit plane of the illumination device. In this case the photo detector array has to be as fast as the pulsed illumination device.

It is also possible to provide a more indirect measurement of varying intensity distributions. One opportunity is to use the light which is not decoupled into the direction of a spatial light modulator device (SLM). A light guiding element as e.g. a plane parallel plate or even a wedge is illuminated from one side. The light which is not coupled out is measured at the other side of the illumination device. The values are used to detect global drifts, which than can be compensated by changing the overall brightness of the light source. A photo detector array formed as grid is arranged at one side of the illumination device, which is the exit plane of the collimation device and the entrance plane of the light guiding element. The photo detector grid spacing has to be sufficient.

Illumination devices which are very thin and preferably use the grazing incidence embodiment according to the invention are mostly very sensitive to a change of the local angle of incidence which is present at the plane of the light decoupling element, in particular the volume grating plane. Slightly changed incidence angles of the wave field which has to be diffracted can cause a change of the diffraction efficiency $\eta(x,y)$. This variation can be measured locally. A global value can be obtained too. Global offsets can be compensated by modulating the light sources used.

In the following additional angular measurements are described. It is also possible to provide a grid for angular measurements of the illuminating wave field. To give an example, a plurality of micro lenses is arranged in front of a four quadrant photo detector array. Thus, a local measurement point is used to detect the intensity distribution of light and the angle of the incident light at the same time. This detection is similar to the signal detection within a DVD player. These elements—detector+micro lenses—are arranged e.g. at one side of the illumination device, which is e.g. the opposite side of the entrance plane, which carries the collimation device.

A volume grating can also be used to provide angular measurements within an illumination device. A photo detector and an image detector array can be used within an arrangement, which uses volume grating(s) and the angular selectivity of the volume grating(s). Thicker volume gratings show a higher angular and spectral selectivity than thinner volume gratings. The parameters of the volume gratings can be tailored to the specific requirements. An angular offset will cause a changed intensity of the locally diffracted light.

The providing of a photo detector grid is preferred due to the fact that the measurement of varying intensity distributions I(x,y,t) can be performed with reasonable low complexity.

The following sections describe an illumination device according to the invention which uses segmented light decoupling elements, preferably segmented volume gratings. This is advantageously relating to the using of a large light decoupling element, since costs can be saved.

The tendency to use volume grating (VG) segment elements (in the following "volume grating segments" or "volume grating elements" is used) instead of a large scale continuous volume grating is driven by the costs. A production facility, which is capable of exposing e.g. 55 inch display size volume grating elements, which can be e.g. a volume grating illumination device, in particular a backlight illumination device (BLD, volume grating-field lens, volume grating combined field lens or multiplexed field lenses, by using a single exposure can be very expensive. Step and repeat exposure tools can cost only a fraction of this.

Segmented volume grating elements also can be optimized by using an iterative local optimization e.g. of the tilt, the grating period, the modulation of the refractive index n1. This can be e.g. done in order to compensate for shrinking effects during exposure or production, which can differ locally. Large scale volume gratings can use CGH (CGH=computer generated hologram) in order to implement corrections, even though this approach is more complex and more costly.

The volume grating segmentation can result in image quality reducing conflicts when used with coherent illumination. A generic embodiment, which uses segmented optical functionality in order to redirect the light and which can cause a conflict, is shown in FIG. 24.

Figure 24:
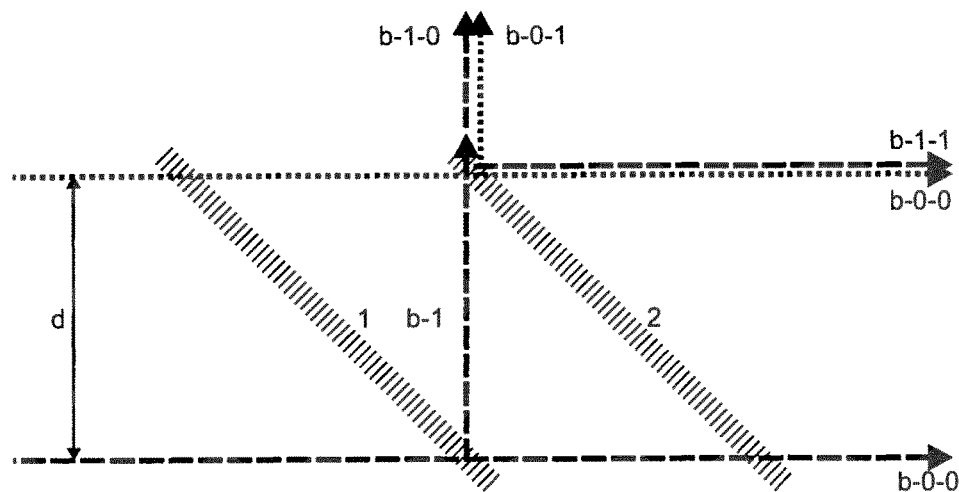
FIG. 24 shows two partially beam path overlapped diffractive light decoupling segment elements, which can be used within an illumination device of an autostereoscopic display or a 1D or 2D encoded holographic display.

As illustrated schematically in FIG. 24, reasonable collimated light enters a light guiding substrate serving as light guiding element having a plan parallel shape and a thickness d from the left hand side. (Under the expression "reasonable collimated light" is to be understood that the light is collimated with a predetermined angular spectrum of plane waves being suitable for the respective application). A small portion of the light is diffracted out of the light guiding element (also as light guide denoted) into the direction of a spatial light modulator device (SLM) (not shown in FIG. 24 but located on top of FIG. 24). Not all diffracted beams or wave field segments are shown. The beams, which can cause conflicts, are shown. Only some beams are shown in FIG. 24 in order to give a simplified description. The real situation is that there are wave field segments and that a partial overlap of adjacent decoupled wave field segments can be present.

As it can be seen in FIG. 24, a portion of the initial beam is diffracted at the first diffractive segment "1", which can be e.g. a transmission type volume grating segment. This beam can be indicated as b-1. The beam b-1 impinges on a part of the second decoupling element "2". The main part can pass the second element without being diffracted. This part, which can be indicated as b-1-0, will exit the illumination device and propagate to the SLM. A part of b-1 can be diffracted by the second decoupling element and will propagate parallel to the direction of the initial light, which entered the illumination device from the left hand side. This part, which is diffracted twice, can be indicated as b-1-1. The part b-1-1 propagates parallel to the beam b-0-0. A part of the initial upper beam is diffracted at the second decoupling element 2. This part is indicated as b-0-1. The result of the embodiment, which is shown in FIG. 24, is that the beams b-1-0 and b-0-1 propagate along the same exit direction. And that the beam b-1-1 and the beam b-0-0 propagate along the same direction, which is e.g. parallel to the surface plane of the illumination device substrate.

The question is now if a reduction of the image quality of autostereoscopic (ASD) or 1D or 2D encoded holographic displays can be prevented.

Figure 25:
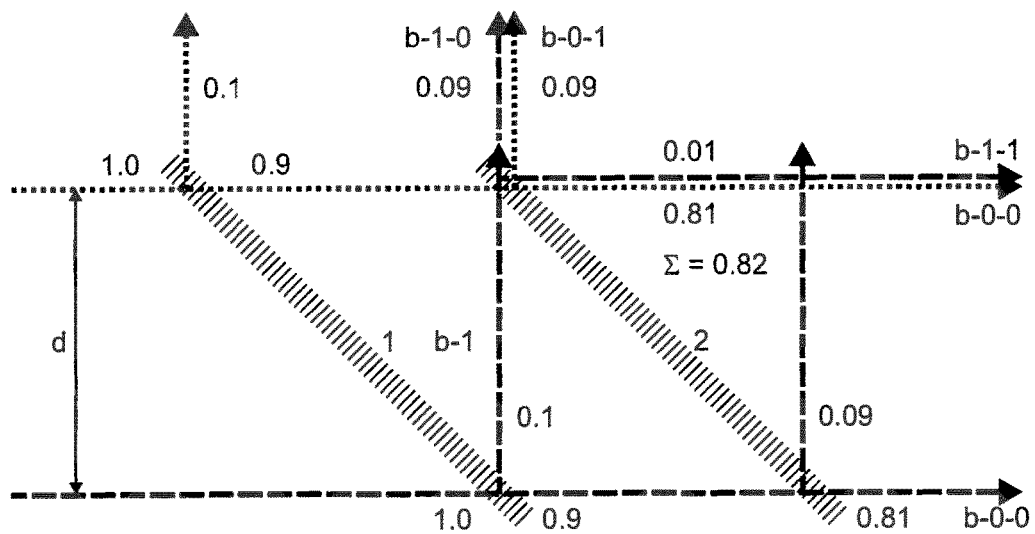
FIG. 25 shows two partially beam path overlapped diffractive segment elements, which decouple light out of a plane parallel plate, where a diffraction efficiency of η=0.9 was assumed for both volume grating segments, where the overlapped area can cause an increased intensity, which can be present at the exit plane.

One aspect is the intensity distribution, which can be present along the exit plane of an illumination device. The intensity distribution, which is generated by two neighbouring volume grating segments, is shown in FIG. 25. Two diffractive segments show a partially overlap of the beam paths. Thus, the intensity distribution of the light, which is e.g. decoupled out of a plane parallel plate, cannot be homogeneous. The intensity is increased along the overlap area.

Several modifications can be provided in order to reduce a possible intensity peak, which can be present at the overlap area.

1) One approach is to provide a seamless arrangement. Thus, a lateral uncertainty of the decoupling segments has to be e.g. $\Delta x \leq 20$ µm to $\Delta x \leq 50$ µm. Discrete values are dependent on the discrete display. A master can be made, which generates a set of volume grating segments, thus the number of high accuracy exposure shifts during a copy process for manufacturing the volume grating segments can be reduced. A master can e.g. be used to expose 50% of the segments and than be shifted only once in order to exposed the second set, which is nested between the first one.

2) A second approach is to use aperture apodization of the decoupling segments. Volume grating segments can have a diffraction efficiency (DE), which varies along the aperture of the segment. The DE profile of the overlapped area can be linear. A $\sin^2$ profile of the volume grating segments is also an option. General all distributions can be used, which enable a reasonable homogeneous intensity distribution. Due to the fact that $\sin^2 + \cos^2 = 1$, one can think of a sum of these two functions. The DE also should increase along the beam path in order to enable a homogeneous intensity distribution along a length of e.g. 1.2 m, which can be equivalent to e.g. 800 volume grating segments. This means that the DE of adjacent volume grating segments can have the same functional apodization profile but a very small difference of the mean value.

Remark in Regards to the Apodization Profiles:

The boundary condition is that the sum of the overlap area is reasonable close to one or generally close to the one of the adjacent non overlap areas. This is the reason why the apodization profile of a single volume grating decoupling segment does not have to be symmetric. Varying profiles between adjacent segments in an alternating way also can be used, but these profiles are less preferred.

2B) A modification of the approach, which uses an adapted and optimized apodization profile of the volume grating segments, can be obtained by using the boundary condition, which has to be fulfilled. And this is I_exit=constant along the display width.

This also means that it possible to modify the intensity distribution of the reasonable collimated wave field, which propagates along the plane parallel plate. This is due to the fact that the local intensity times the local DE gives the local exit intensity I_exit. The presence of overlap areas will cause a depletion of the intensity in the planes, which have a larger or the largest distance to the exit plane. This means that the relative intensity of the beam b-1 (see FIG. 24) is depleted along the propagation distance. In other words, the cross talk between the beams or wave field segments b-1-0 and b-0-1 can be reduced along the propagation distance. This has to be taken into account. This also means that the apodization profiles of the volume grating segments can be slightly changed—the functional distribution too and not only the amplitude—along the propagation distance.

The divergence of the wave field can transport energy in this region and thus provide energy to the overlap area even at larger propagation distances. This means that realistic simulations and measurements can be used in order to generate data, which can be used for the optimization of the discrete optical layout.

3) A third approach can be to measure the intensity distribution and to add an amplitude correction plane, which can be realized by a cost efficient printing process. If the intensity distribution, which has to be corrected is approximately the same for different illumination devices, which are manufactured then a pattern can be used, which is the same for all illumination devices.

4) A fourth approach can be to measure the intensity distribution of the exit plane of the illumination device and to use these calibration data for the SLM. The intensity distribution can be slightly smeared if the distance to the illumination device is increased. The use of a LUT (Look Up Table) can reduce the dynamic range of the SLM. But it is practical for reasonable small values which have to be corrected.

A calibration can be used in order to reduce the transmission of the local SLM pixels, which are illuminated with the higher intensity peak. This will cost dynamic range of the SLM pixels used.

Another opportunity is to use an apodization layer, which absorb local intensity peaks. This can be e.g. a black and white film material, which is exposed by the intensity distribution, which is present at the exit plane of the individual illumination device panel. This also can be done for three colours by using an RGB (red,green,blue)-colour film layer approach. This is a less preferred solution, because this can add additional scattered light.

5) A fifth approach is to use a slight focus. A slight focus means that the beams or wave front segments, which are diffracted by the volume grating segments, are not parallel. Thus it is possible to place the beam waist at the plane, which would cause cross talk otherwise. One variation of this is to provide a striped RGB illumination of the exit plane, which is the plane of a SLM. Thus, a RGB allocation can be provided. Several volume grating segments can generate a set of a red, a green and a blue illumination segment or even a plurality of several colour segments. In other words, a multiplexed volume grating segment can generate three stripes, which have different colours, which can have the same lateral extension, which are placed at a defined z plane and which have defined lateral distances. A multiplexed volume grating segment also can generate e.g. 10 red, ten green and ten blues illumination segments.

6) A compensation plane or compensation element, which compensates for local amplitude non homogeneity, local angular mismatch and for phase mismatch of adjacent segments, can require significant technical effort, which means that this can be not a cost efficient solution.

7) An active controlled liquid crystal (LC) grating, which can be e.g. a polarisation LC grating, (PLCG) can be placed in close contact to decoupling segments, which can have edges, which are parallel to the electrode lines of the PLCG. Thus the PLCG can be used to compensate for e.g. angular and phase mismatch.

If the volume grating segments are very small, e.g. 100 µm, then the overlap areas of adjacent volume grating decoupling segments cannot be recognized by the users. The coherence length $z_c$ should be reasonable small in order to avoid coherent inter segment cross talk. To use very small volume grating segments can be used for ASD only.

A second aspect of the volume grating segmentation is the angular distribution, which can be present along the exit plane of an illumination device. The requirements of ASD and 1D or 2D encoded holographic displays are different. ASD can e.g. accept $\Delta\theta_{out} \leq 0.5°$ deg between adjacent decoupling segments. Holographic displays can accept e.g. accept $\Delta\theta_{out} \leq 1/60°$ deg to $1/20°$ deg only.

An approach to correct for angular mismatch of adjacent decoupling segments is to use a surface relief structure, which comprises wedge segments. This can be an option but it is not the most cost efficient one. Small wedge functions also can be encoded into sub holograms, which are used in a holographic display. The angular range, which can be used, is the one between the $0^{th}$ and the $1^{st}$ diffraction order. If a sub hologram is e.g. illuminated at plus $1/10°$ deg and at minus $1/10°$ deg at the same time than this correction does not work and a smeared object point will be reconstructed at the retina of the observer eye.

A third aspect of the volume grating segmentation is the phase distribution, which can be present along the exit plane of an illumination device. This is not a problem for reasonable low coherence. A coherent overlap of decoupled wave field segments can have a fixed but not defined phase offset. Thus, dark or bright overlap areas can be visible. A checker board like phase correcting profile can be used. But this is not cost efficient. A preferred approach is to avoid coherent overlap to get rid of the phase step problem. Temperature changes of the illumination device can cause a relative phase change between adjacent decoupling segments. Thus the phase correcting element cannot work in such a case.

Non-Tilted Volume Grating Segments:

Volume grating decoupling segments can be placed within several depth planes. Gaps can be used between the decoupling volume grating segments, which can be larger than the coherence length $z_c$. Thus, the problem of not perfect matched inter segment phase steps can be avoided. This embodiment can be used for 1D or 2D encoded holographic displays and ASD too.

A wave field segment propagates along a volume grating or volume grating segment. A volume grating segment can have a thickness $d_{volume\ grating}$, which is e.g. within the range of several µm up to 1 mm. The propagation length of the wave field within a volume grating defines the angular and or spectral selectivity. As it can be seen in FIG. 27, the propagation length within a tilted volume grating segment is e.g. $d_{volume\ grating}/\cos(\theta_{tilt})$. The tilt angle, which is used for the arrangement, which is shown in FIG. 24, is $\theta_{tilt}=45°$ deg. Larger tilt angles $\theta_{tilt}$ will increase the propagation length within the volume grating. If the coherence length is significant larger than e.g. 250 µm tilted volume grating segments can be used. It is also possible to use non tilted volume grating segments, which have a lateral extension, which is e.g. ≤250 µm. These segmented decoupling volume gratings can be placed in different z planes (depth planes) of the substrate of the light guide of the illumination device.

FIG. 26 shows an arrangement of volume grating decoupling segments, which are orientated parallel to the plane parallel substrate, which comprises the photo refractive material and thus combines light guiding and diffractive decoupling. Several sets of volume grating segments are located in different depth planes. The dimensions and thus the beam path differences can be chosen in a way to avoid coherent superposition of adjacent decoupled wave field segments. The volume grating segments, which are shown in FIG. 26, can be placed within one plane parallel substrate.

Several substrate plates can be used stacked onto each other. They can have different exit geometries, which can be equivalent to several optical functions, in particular field to lens functions. The Off-Bragg approach of light being deflected or diffracted at different depth planes can be used in order to avoid cross talk between different volume grating segment sets.

Figure 27:
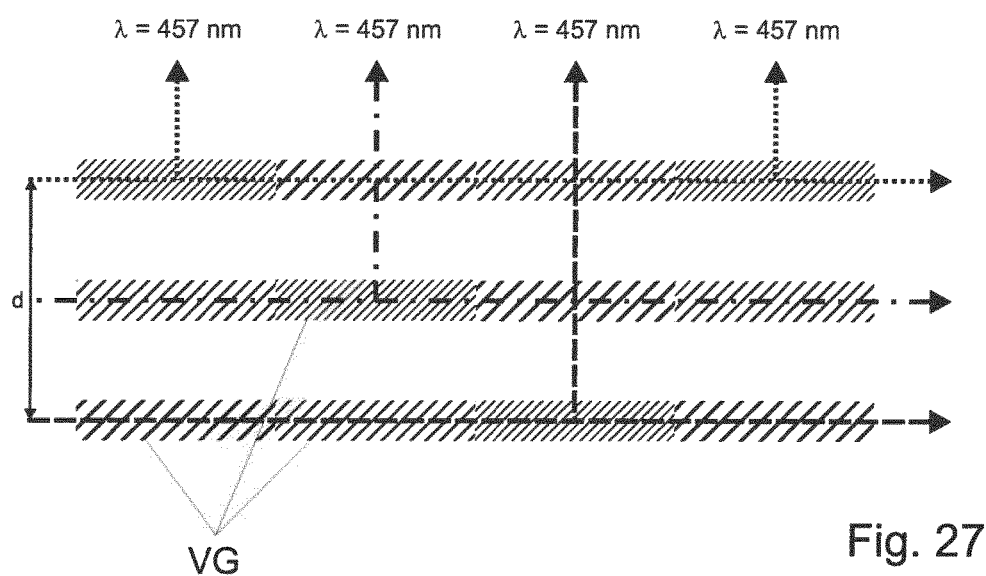
FIG. 27 shows nested longitudinal and lateral separated volume grating RGB decoupling segments, which are orientated parallel to the plane parallel substrate, which comprises the photo refractive material.

FIG. 27 shows an arrangement of nested longitudinal and lateral separated volume grating RGB (RGB=red, green, blue) selective decoupling segments. The segments are non tilted and orientated parallel to the plane parallel substrate, which acts as a light guide. Volume grating segments also can be exposed into identical volumetric segments. The arrangement, which is shown in FIG. 27, uses a spatial separation in order to reduce the maximum refractive index n1 required. The arrangement show in FIG. 27 can be used to generate a red, a green and a blue field lens function, if illuminated from the left hand side. Four of these structured plane parallel plates can be stacked on top of each other in order to provide four RGB field lens functions, which can be switched On or OFF separately and which do not show any cross talk.

Exposure:

The tailoring of the degree of mutual coherence and the temporal coherence of the exposure light can be used in order to provide a depth dependent apodization of the modulation of the refractive index n1, as this is disclosed e.g. in the international patent application PCT/EP2012/060684 of the applicant, the complete content of which is incorporated herein by reference.

In addition of the tailoring of the complex degree of coherence Γ, the intensity profiles of the wave fields, which are locally superimposed, can be tailored too. Thus it is possible to provide an apodization of n1, which is present within the plane of the volume grating segment and which can be called lateral apodization of n1.

The tailoring of Γ and the modification of the intensity distribution of the interfering wave field segments can be used for the exposure of buried and also tilted volume grating segments. This means that it is possible to expose the required volume grating segments into a plane parallel plate, which comprises a photo refractive material.

Therefore, a tilt, a z depth, a lateral apodization of n1 and a longitudinal apodization of n1 can be realized as is disclosed e.g. in the international patent application PCT/EP2012/060684.

Due to the fact that the substrate is used and that a reasonable low n1 is required in order to provide a reasonable low DE, which has to be implemented locally, low shrinkage of the substrate can be realized. This also means that the volume grating segments can be used as exposed and do not suffer from large shifts or deformations. Thus, it should be possible to realize an accuracy of the position of the segments, which is smaller than 10 µm. Heterodyne interferometer can be used in order to reduce the uncertainty of the position of the volume grating segments.

Figure 28:
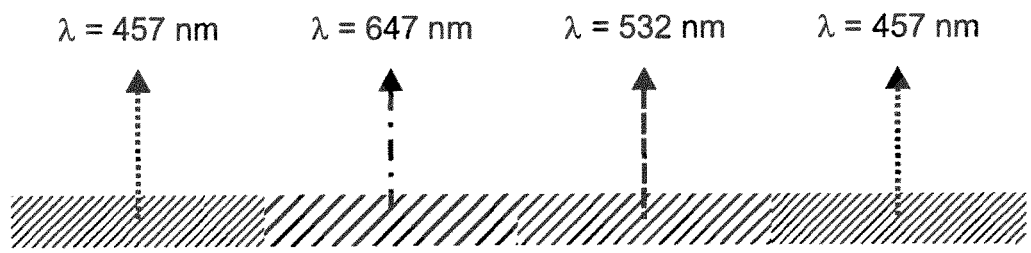
FIG. 28 shows RGB segmented decoupling, which can be used in order to reduce the loss of optical power.

RGB Striped Illumination:

An embodiment, which can be used in order to realize RGB striped or in general patterned illumination, is to use e.g. just the upper layer, which is shown in FIG. 27. This can be used for ASD and for 1D or 2D encoded holographic displays. This RGB segmented decoupling is illustrated in FIG. 28.

A striped arrangement can be used for ASD and for 1D encoded holographic 3D displays. If the distance of the RGB decoupling segments is reasonable small compared to the size of the segments, which can be e.g. distance d=15× volume grating segment size, than colour filters cannot be required. Due to diffraction at apertures longer distances can cause cross talk to adjacent pixel, which should be matched to other colours. Thus additional colour filters (CF) can be used. But the segmented illumination will reduce the loss of optical power regardless of the fact that CF can be used in addition and to compensate for the distance between illumination device and SLM, which can be too large.

Multi-Layer:

The Off-Bragg angular multiplex approach, which can be used for multi-layer volume grating embodiments can also be used for decoupling volume grating segments, which can be tilted or not.

The segmented or non-segmented illumination can be designed in order to be actively controlled. This means, that reconstruction geometry can be switched on or off. Spectral MP (MP=multiplexing, SMP=spectral multiplexing), and angular MP (AMP) also can be used for the generation of different exit wave fields of an illumination device. The use of switchable gratings or grating segments can be a solution for some applications or even a work around for embodiments, which e.g. spectral MP or angular MP of reconstruction geometries.

The implementation can be done by using LC molecules, which are embedded within structured volume grating matrix material. Structured volume grating matrix material means that a volume grating material is used in order to be structured by using e.g. two beam interference. The orientation of non-polymerized LC molecules gives the opportunity to allow for an LC rotation, which is angular limited. If an electrical field is applied, than the LC molecules can be rotated by several degrees. Thus the modulation of the refractive index n1 is changed, which means to change the diffraction efficiency to the desired value. This is explained e.g. in DE 10 2012 101 183, the complete content of which is incorporated herein by reference.

The approach of using controllable diffractive elements within flat illumination device embodiments can be used in order to provide a scanning illumination, which can be required to realize local dimming or fast driving of the SLM.

An alternative of using LC is to use non-linear optical polymers (NLOP). The refractive index can be changed by applying an electrical field or by exposing the material e.g. to UV light. A write beam, which has a wave length, which is not the same as it is used for a primary colour being used for displaying the image information, easily can be blocked by using a spectral filter.

A layer can be used, which comprises a volume grating, which uses photo addressable and rewritable NLOP. This layer, which can comprise a defined reconstruction geometry, can be switched on or off by coupling e.g. UV light into the light guiding layer.

As already described within related documents (e.g. in: WO 2010/149583, DE 10 2012 100 201.0, DE 10 2012 100 205.3, DE 10 2012 100 206.1, DE 10 2012 100 209.6, DE 102012100211.8, the complete content of each is incorporated herein by reference), different ways can be used in order to couple in the light into a flat volume grating illumination device, which comprises e.g. single functional volume grating layers or segmented volume grating elements, which can be used for decoupling.

Thick layers can be illuminated by using reasonable collimated light, which enters the layer from a polished side of the illumination device. This can be used for light guiding layers, which have a thickness of e.g. 0.5 mm to 5 mm.

Very thin layers can be illuminated by using grating or prism coupling, which can be placed on top of the layer structure. To implements this, an additional striped segment of e.g. (5 mm to 10 mm) times displays height can be required at the rim of the display. Diffractive grating coupler, which can be surface relief gratings or volume grating segments, can be used for reasonable small spectral line with, which means for e.g. Δλ≤5 nm. It is also possible to use switchable gratings as disclosed e.g. in WO 2010/149587 A2, the complete content of which is incorporated herein by reference, in order to enable controlled coupling. On embodiment is to use a single collimated wave field, which passes several layers and several controllable coupling elements. It is possible to switch one of several "couple-in-volume grating-segments" only. Thus, the light will pass three layers without being diffracted and will be diffracted by a fourth one, which is switched on. Thus, different layers, which can comprise different reconstruction geometries, can be addressed time sequentially. The addressing can be done electrically or optically. This kind of routing of the illumination light can be used in different embodiments and is not restricted to 3D ASD or 1D or 2D encoded holographic displays.

One opportunity to couple in visual light into a layered light guiding illumination device is to use fluorescent materials or Q-dot (Quantum dot) material, which is embedded e.g. within a transparent high n plastic core layer, and which can be illuminated from the side or even from the top or the bottom. The red green and blue light, which is e.g. generated by using UV (ultra violet) light, is generated within the layer and within the FTIR condition already (FTIR=frustrated total internal reflection). An edge can be coated with a reflective material in order to increase the efficiency of the visual light generation.

The segmented decoupling of reasonable or at least partial coherent light, which can be used in holographic displays can take advantage of using the OFF-Bragg condition, which has to be fulfilled between adjacent segments. This can be done by using e.g. the angular and/or the spectral selectivity.

Switching ON and OFF adjacent segments time sequential also can be used in order to avoid cross-talk of adjacent decoupling segments. This can be done by e.g. switching ON and OFF two groups of segments, which can show cross-talk if switched ON at the same time.

There can be a transition zone between a wedge zigzag, plane parallel plate zigzag, 84.26° air wedge, 84.26° bulk wedge, wave guiding and grazing incidence, as they are disclosed in e.g. (e.g. in: WO 2012/004016, WO 2010/149583, DE 10 2012 100 201.0, DE 10 2012 100 205.3, DE 10 2012 100 206.1, DE 10 2012 100 209.6, DE 102012100211.8, the complete content of each is incorporated herein by reference), the complete content of which is incorporated herein by reference. This means that the aspects, modifications and principal guidelines, which have been described for a discrete embodiment, can be applied for a large variety of volume grating using systems.

Cut Out What is Needed:

A basic principle, which can be used within different embodiments of illumination devices, is to use limited angular and or spectral selectivity in order to cut out a defined and desired angular and or spectral range only. Volume gratings provide the capability to be tailored to the requirements.

Reasonable thick volume gratings can be used to couple out or redirect an angular range of the ASPW of ±0.25° deg only, which can be used within an ASD. The discrete volume grating thickness $d_{HOE}$, which provides an angular selectivity of ±0.25° deg depends on the discrete geometry of reconstruction and can be e.g. within the range of 15 µm to 50 µm.

Thick volume gratings can be used to couple out or redirect an ASPW of ±1/120° deg only, which can be used within a holographic display. The volume grating thickness $d_{HOE}$, which provides an angular selectivity of ±1/120° deg depends on the discrete geometry of reconstruction and can be within the range of 450 µm to 1.5 mm. These values, which are given for $d_{HOE}$ are practical. But even a thin volume grating can provide a very small angular or spectral selectivity, when a very large angle, which means an angle close to 90° deg, is used as incidence angle, which is the reconstruction angle $\theta_R$.

The ASPW of the wave field or wave field segment, which illuminated the volume grating, also can be broadened by the transfer function of the light or wave guiding optical components used. This also means, that the modification of the ASPW, which is initially provided by the collimation device, can be due to imperfections of the light or wave guiding component, which can be e.g. a plane parallel plate.

Cut out what's required only helps to get rid of the broadening, which is caused by the imperfections. The loss of optical power or light intensity, which can be e.g. 20%, can be neglected.

Z Apodized Volume Grating:

Z apodized modulation (being especially an apodization in the direction of the initial propagation of the light to be deflected) of the refractive index n1 of the volume grating as it can be generated by the method being disclosed in e.g. in the international patent application PCT/EP2012/060684 of the applicant, the complete content of which is incorporated herein by reference, can be used in order to suppress side lobes of the angular and or spectral selectivity. This can be used in wedge zigzag, plane parallel plate zigzag, 84.26° deg air wedge, 84.26° deg bulk wedge, wave guiding and grazing incidence illumination device.

Conclusion:

To consider, "only cut out what's required" is an important feature of volume grating, regardless of the type of implementation used. And the z apodization of n1 provides the suppression of side lobes. Thus the selectivity can be tailored to the requirements.

Polarization Selectivity:

The polarization selectivity of the volume grating can be used in order to e.g. A) implement OFF-Bragg condition for several reconstructing wave fields, B) in order to optimize the performance of the entire device by choosing the polarization state, which is the optimal one of the complete system or C) in order to minimize the number of components, which are used within the complete device.

This can also be used for front light illuminations devices, which have to realize a reasonable separation between the beam path, which goes to a reflective type SLM and the modulated light, which comes back from the SLM and propagates to the user space.

A combination of angular and polarization selectivity of the diffraction efficiency can be used here. The grating strength of TM polarized light is $v_{TM}=v_{TE}\cos(\theta)$, where θ is the diffraction angle, which is introduced by the volume grating. Thus, the ON-Bragg diffraction efficiency is given by $\eta_{TM}=\sin^2(v_{TM})=\sin^2(v_{TE}\cos(\theta))$. Thus polarization beam splitter equivalent OFF-Bragg angles are defined by this relation. The resulting polarization beam splitter (PBS) geometries can be used in order to provide MP as e.g. an angular multiplexing, AMP of functions as e.g. the field lens (FL), which can be multiplexed in a way to provide several FLij. Several FLij can be addressed by changing the incident angle, the wavelength of the illumination light, which can also mean to use several sub wavelengths of a single primary colour as e.g. g1, g2, g3 differing only in several nm in their wavelength and so on, or by changing the polarization state.

Only the geometries, which do belong to lower gratings strength ν can be practical. A PBS geometry, which can be realized with the lowest value of the grating strength ν is a geometry, which has 90° deg diffraction angle. This can be e.g. −45° deg/45° deg or −80° deg/10° deg. If the correct grating strength is chosen, than the diffraction efficiency, DE of TE polarised light is 1 and the DE of TM polarised light is 0. The PBS geometry, which be realized at the second lowest value of the grating strength ν is a geometry, which has 60° deg diffraction angle. At this PBS geometry only TM polarized light is diffracted. The third lowest grating strength of a volume grating based PBS can be realized at 48.2° deg and 90° deg again.

Example

A wedge illumination device can use an anamorphic angle of 84.26° deg in order to provide 1/cos(84.26° deg)=10× beam stretching. Two embodiments, which use a 10× anamorphic stretch are depicted in FIG. 7. These embodiments can be used in order to describe the polarisation dependence of different types of volume grating.

The anamorphic beam stretching factor of 10× requires an incident angle of 84.26° deg, which is used for all three stretches shown in FIG. 17a, 17b. The two beams, which use an incidence at 84.26° deg from air to the dielectric plane of the volume grating are refracted first. This approach is used for the reflective type volume grating, which is depicted at the left hand side of FIG. 26 and for the large display size volume grating, which is shown in FIG. 17b. For a refractive index of $n_{volume\ grating}$=1.5 of the volume grating material used, which can be e.g. a photopolymer, an incidence angle of 41.55° deg will be present within the grating volume.

Once again, the two beams, which propagate in air and which hit the interface boundary plane air/volume grating at 84.26° deg, hit the volume grating at 41.55° deg only. Thus, the grating strength ν, which applies for TM polarized light is 0.748 lower than for TE polarised light. If the volume grating uses the first maximum of the ON-Bragg diffraction efficiency $(DE_{ON\text{-}Bragg})\eta(\theta)_{ON\text{-}Bragg}$ than the difference between the DE of TE polarized light and TM polarized light is less than 10%.

The second maximum of $\eta(\theta)_{ON\text{-}Bragg}$ shows a high polarization selectivity and is close to a volume grating-PBS. But this is not the point here. The main point here is that the geometry 84.26° deg/0° deg at air can be used for TE and for TM polarized light with high diffraction efficiency DE>0.9 at the same time. The difference between the gratings strengths, which provides DE=1 for TE or for TM polarized light is small. This means that there is only a small difference between TE and TM here. This applies for the volume grating itself. But not automatically for the AR (antireflection) coating, which can be placed at the interface boundary plane of air to volume grating or air to substrate. Antireflection coatings show a significant difference between the transmission of TE and TM polarized light in general. Perpendicular incidence, which means anti parallel to the surface normal, will result in the same transmission, but the difference will be increased with increased incidence angles. Once again, the point here is that the volume grating can be used for both polarizations but the AR coating cannot.

This situation completely changes for the beam, which propagates within a substrate and hits the volume grating at 84.26° deg. This embodiment is shown at the lower part of FIG. 17b. A small collimated wave field propagates along a bulk material wedge and is diffracted by the volume grating by 84.26° deg. Thus, the grating strength ν, which applies for TM polarized light is 0.1 times the one, which applies TE polarized light, which means $\nu_{TM}$=0.1 $\nu_{TE}$. Thus, there is a huge difference of the diffraction efficiencies between TE and TM polarized light. This is due to the fact that there is close to the PBS geometry, which used a diffraction angle of θ=90° deg. This means that the small volume grating segment, which is used to generate the first anamorphic stretch of the embodiment B), which is shown in FIG. 17b, only can be used to diffract TM polarized light. The point here is, that it is mandatory to illuminate this volume grating plane with TE polarized light, which means that the vector of the electrical field swings parallel to the grating planes of the first small volume grating segment. The second point here is, that it is not mandatory to illuminate the second volume grating plane with TE polarized light. To use TE for both planes is only a must if the AR coating works better for TE polarized light. To provide TE polarized light, which means an electrical field, which swings along the grating planes of the second, larger volume grating, a half wave plate has to be provided behind the first small volume grating segment.

This was just an example, which should point out that the discrete polarization management depends on the discrete embodiment of the illumination device, which uses volume grating. As it can be seen from the example, polarization selectivity can be provided in several ways.

Although the variations of using PBS geometries within flat illumination devices can be limited, it is an additional MP option, which can be provided within an illumination device and which can add additional freedom of design. PBS and other MP options can be combined.

The layered volume grating embodiments, which are described in this document, can be realized by using volume grating materials or embodiments, which make use of volume grating materials, which can differ from e.g. a volume grating foil on top of a substrate arrangement.

Several plane parallel plates, which comprise volume grating material, can be used in order to realize a stacked Off-Bragg volume grating reconstruction of a multi-directional illumination device. In contrast to a volume grating material, which has e.g. a thickness of 20 μm and which is placed on top of a e.g. 150 μm thick, reasonable index matched carrier foil, the volume grating material can be used in volumetric segments, which can be e.g. 1200 mm×700 mm×2 mm. In other words, the volume, which is occupied by the volume grating material and used for decoupling or wave field reshaping, is e.g. increased by a factor of 100. Standard materials as e.g. HRF films (DuPont) or Bayfol HX films (Bayer Material Science) cannot be the best choice for the embodiment described here. This is due to the costs, which can be too high if using a special purpose optimized foil type volume grating material at 2 mm thickness instead of 20 μm.

Modulation of the Refractive Index n1:

Volume grating foil based materials are usually optimized in a way to provide reasonable high modulation of the refractive index n1. The material has to generate sufficient index modulation in order to enable a DE (diffraction efficiency) close to one for the thickness of the volume grating film and the geometry of reconstruction used. This means that a modulation, which is required for a defined geometry of reconstruction, can be e.g. n1=0.02. This value can be required to diffract a wave segment from −45° deg to 0° deg with a DE close to one. The discrete value of the modulation of the refractive index, which has to be realized, depends on the diffraction angle, the entrance angle, the wavelength, the initial refractive index, the polarization, the thickness of the volume grating layer and of course on the diffraction efficiency, DE, which should be realized. See the CWT of Kogelnik for more details.

The stacked layer Off-Bragg illumination or the grazing incidence illumination, which uses volume grating decoupling will require much lower modulation in general, which means e.g. n1=0.002, n1=0.0002 or even much smaller values than these. These values can be slightly increased in dependence on the propagation distance within the light or wave guiding medium, which can comprise the volume grating material. Very small values of the modulation of the refractive index, n1 can be used. This gives the opportunity to use a wide range of volume grating materials. High shrinkage materials as e.g. DCG (dichromat gelatine) are not preferred especially for very thick layers.

The index of refraction n1 can be reasonable high, which means very low in general and the shrinkage has to be reasonable low in order to provide the angular geometries and the angular tolerances required.

Index Match to Adjacent Layers:

The match of the refractive index can be an important aspect for volume grating embodiment. Reasonable sufficient index match has to be provided in order to avoid reflections, which can cause a reduction of the image contrast. Special embodiments can use index steps and defined reflectivity in order to guide the light within a glued sandwich of dielectric layers or plane parallel plates. Therefore, index match is important in general. One embodiment to provide index match is to embed the volume grating layer into a substrate material, which can be already used for backlight illumination devices. Several display classes have an n close to 1.5, as e.g. Corning eagle XG, which has n_532 mm=1.51. This means, that a display can be based on material, which has a refractive index of n≈1.5. This means that it is preferred to use e.g. a PMMA based material combination rather than a PC based material combination. This is due to the fact that n_PMMA_532 nm=1.495 and n_PC_532 nm=1.592.

Materials:

A wide range of material can be used within thick volume grating plates. The intention here is to describe several practical basic material compounds and embodiments. Glass based photorefractive materials as e.g. photo refractive glass, which can be e.g. thermal processed after an UV or visual exposure in order to increase n1. Higher temperatures of e.g. 300° C. to 500° C. will increase the diffusion of the compound used. Companies as e.g. Corning and Schott provide glass, which can be used as photo refractive material. These glass based materials are e.g. used to write Bragg gratings into optical fibres and gratings, which are used for wave length multiplexing (WMP) and wave length de-multiplexing (WDMP) telecommunication devices. Glass based Bragg gratings are also used in order to act as a wave length dependent and thus wave length stabilizing resonator mirror.

The density of B270 glass is 2.55 g/cm³. A plate can have 1200 mm×700 mm×2 mm=1680 cm³ and thus has a weight of 4.3 kg if made of glass. The density of PMMA is (1.17-1.2) g/cm³. A plane parallel plate, which has e.g. 1200 mm×700 mm×2 mm=1680 cm³, will have a weight of 1.99 kg. The weight is an aspect, which is important for large displays. Thus, plastic based substrates can be preferred.

Polymer Based Photorefractive Materials:

A photopolymer comprises several chemical components. The different components fulfil different requirements. Several chemicals act in different roles. Each part within the chemical arrangement can be filled by a specific chemical, which is one of a specific group. This means that a huge number of different monomers exists, which can be polymerized. This also means that there is a huge number of different dyes, which have a sufficient cross-section and thus can be used in order to absorb the photon energy, which is present within the 3D interference pattern.

A host matrix can be used in order to reduce the shrinkage, which is due to the polymerization. The material of the host matrix can differ from the material, which is polymerized by the interference pattern. The polymerization, which is due to the interference pattern, can be a direct polymerization or a result of a reaction chain, which also can require further thermal and/or chemical treatment.

The dye or more precisely the chromophoric group acts as the photosensitive component. The dye collects the optical energy. The spatial distribution is defined by the interference pattern. Different chromophoric groups have the maximal absorption at different wave lengths, as e.g. C═C in ethylene at λ=193 nm or N═O in 2-methyl-2-nitropropane at λ=300 nm and λ=600 nm.

There are several ways to polymerize here. One way to go is the direct photo induced polymerization, which can be described as follows:

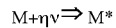

$M + \eta\nu \Rightarrow M^*$

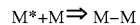

$M^* + M \Rightarrow M{-}M$

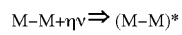

$M{-}M + \eta\nu \Rightarrow (M{-}M)^*$

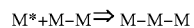

$M^* + M{-}M \Rightarrow M{-}M{-}M$

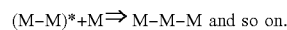

$(M{-}M)^* + M \Rightarrow M{-}M{-}M$ and so on.

The most monomers (M) have maximal absorption at wave lengths, which are significant below 400 nm. To use visual instead or UV lasers can be more comfortable and more cost efficient. Another aspect is the absorption which increases at decreased wave lengths. This will generate a z apodization (i.e. an apodization in the direction of propagation of the illumination light or perpendicular to the surface of the material into which a volume grating is illuminated) of the interference pattern. To avoid z apodization a reasonable low absorption is required for photo refractive materials, which have a thickness of e.g. up to several mm.

Another way to a photo induced polymerization is to use a sensitizer (S), which can be described as follows:

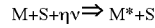

$M + S + \eta\nu \Rightarrow M^* + S$

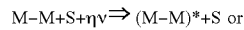

$M{-}M + S + \eta\nu \Rightarrow (M{-}M)^* + S$ or

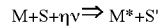

$M + S + \eta\nu \Rightarrow M^* + S'$

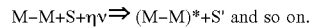

$M{-}M + S + \eta\nu \Rightarrow (M{-}M)^* + S'$ and so on.

The sensitizer S is used for the charge transfer and can be left chemically unchanged. Thus S can have the same structure after the reaction. The sensitizer S also can be modified during the reaction to S'. Thus S can be exhausted during the charge transfer. The use of a sensitizer gives the opportunity to use visual lasers for the exposure of the interference pattern.

A polymer host matrix can be used, which carries PQ molecules and further monomers or oligomeric components, which can be photo induced polymerized. PQ molecules act as doping agent. If the quantum efficiency of the photo induced polymerization can be too low, then additional post exposure thermal activation can be used. This can increase the polymerization cross linking and also can increase the n1 obtained.

Design Freedom Due to Volume Grating Use:

The use of volume gratings as light decoupling elements provides an increased freedom of the optical design.

An angular multiplexed illumination device as it is described herein and/or as it is described in the documents cited herein offers the opportunity to provide several exit angles.

The use of volume grating segments is described. The volume grating segments can provide an exit wave field, which can be equivalent to the one of a small light source LS, being a point, a line segment or a line. The collimating refractive, diffractive, reflective or transmissive type collimation lens arrays can be used in combination of a light guiding structure, which uses volume grating segments in order to couple out adapted and optimized wave fields, segmented wave fields or a wave field segment into one or into several directions. Volume grating decoupling segments can be arranged side by side, with or without physical overlap, or they even can be arranged in different z planes. They can be used at an off-Bragg condition if an overlap of the volume grating segments or of the propagating wave field is present. This can be provided by using spectral and/or angular selectivity of volume grating. The volume grating segments can be orientated in plane or tilted in respect to the direction of the light, which propagates within the light guiding plate, the light guiding stripes or the light guiding structure in general.

The tilted orientation is related to a fan out.

Figure 29:
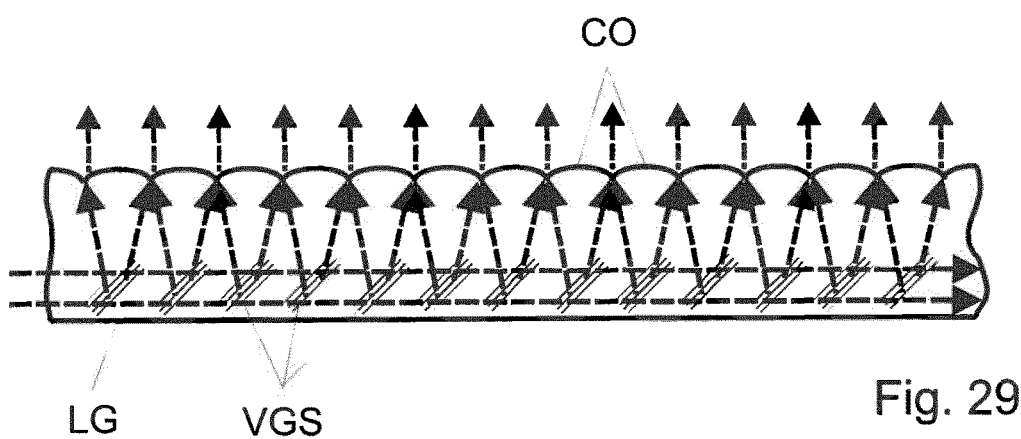
FIG. 29 shows decoupling reflective type volume grating segments, which provide local wave field segments, which are equivalent to the one of imaginary light sources having the shape of e.g. points, line segments or lines.
Figure 30:
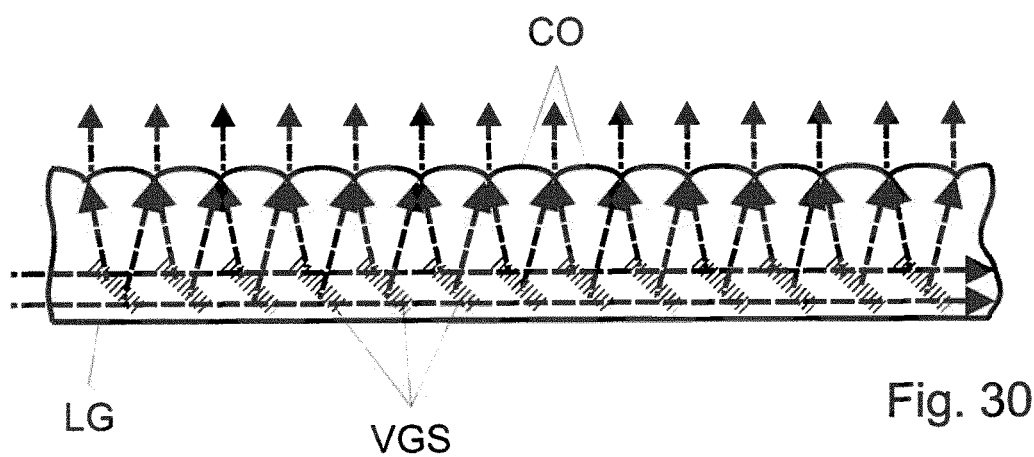
FIG. 30 shows decoupling transmission type volume grating segments, which provide local wave field segments, which are equivalent to the one of imaginary light sources having the shape of e.g. points, line segments or lines.

Volume grating segments can be arranged in separated light guiding segments. Light, which is coupled into different segment sets, will be decoupled from different volume grating segment sets. This means that the generic embodiments, which are shown in FIGS. 29 and 30 can be a part of a plane parallel plate, which comprises volume grating segments VGS and additional refractive type or diffractive type collimations optics CO. Collimation optics can be realized by using refractive lenses, which can be spherical or aspherical shaped in order to minimize the aberrations. Collimation optics can be realized by using DOE or HOE structures (DOE=diffractive optical element; HOE=holographic optical element). Collimation optics also can be used in reflection.

The reflective and transmissive type volume grating segments, which are illustrated in FIGS. 29 and 30, show different angular and spectral selectivity. The discrete choice between reflective volume grating and transmissive volume grating depends—among others—on the spectral and/or angular range, which should be diffracted.

Volume grating segments as shown above can be exposed into a plane parallel substrate plate, which comprises a photo refractive material. This can be done by using of a cost efficient step and repeat process (S&R-P=step and repeat process). The discrete interference patterns, which will form the discrete volume grating segments, have to be regional confined. An S&R-P of a small segment or a set of segments can provide this.

A segment of an illumination device is shown in FIG. 16, which uses grazing incidence collimated light within a light guiding plane parallel plate. The plate comprises decoupling volume grating segments. A 45° deg tilted transmission type volume grating segment is shown, which decouples a fraction of the light into the direction of a light collimating element. Here, parabolic mirror segments are used for the collimation. The virtual LS point is placed in front of the SLM array. In general the entire z range between the virtual LS and the collimating optical element can be used for placement of the volume grating segment. This also means that it is possible to use a reasonable small volume grating segment as the LS point. This results in an arrangement, which is thicker than the one shown in FIG. 16. Small volume grating segments are used e.g. in data storage embodiments, which use holographic dot segments, which can have an extension of e.g. 2 µm×2 µm×5 µm, (x times y times z), only.

As in other embodiments, the DE of the volume grating segments can be increased along the beam path of the reasonable collimated light, which propagates along the slab light guide. This can be used in ASD and in holographic illumination devices too. The volume grating segments do not have a physical overlap and thus enable S&R-P and the opportunity to be used within a holographic display at the same time. It is preferred to use a relation between lens pitch $\Lambda_{CL}$ and coherence length $z_C$, which enable incoherence between adjacent collimated wave field segments. Thus, no relative phase steps have to be taken into account, which can be introduced by e.g. a change of the display temperature. This means to use $z_C < \Lambda_{CL}$.

It is advantageous to use the volume grating material capabilities within a light or wave guiding structure.

Multi-Directional Illumination:

This also can be combined with the approach of e.g. bidirectional illumination device. Additional aperture stops or patterned retarders can be used in addition in order to suppress the inter-collimating-lens cross talk, which is the cross talk between adjacent collimating segments. A multi-directional illumination unit, which can address several exit directions time sequentially or at the same time, can be implemented in different ways.

It is possible to use the setup shown in FIG. 16 and add a counter propagating wave and a reflective or transmissive type volume grating segment, which is placed at a slightly different and thus lateral offset position. An exact counter propagation from the right hand side to the left hand side will generate a counter propagation of the reconstructed wave, which realises a real light source point, which is in the wrong direction of the diffraction and has to be suppressed. In order to avoid this angular and/or spectral selectivity can be used to implement an off-Bragg condition.

Angular Addressing:

Due to the fact that grazing incidence can be more practical than e.g. a zigzag propagation, the collimated beam can be used in an in-plane rotated arrangement. This means not to use 180° deg counter propagation but e.g. a 90° deg tilt or a 2° deg tilt. Discrete values are dependent on the discrete volume grating geometries, the discrete spectral and/or angular ranges of the wave field used and on the layout of the volume grating segments.

Spectral Addressing:

This means that it is also possible to switch to a second or third set of primary colours, which are e.g. spectral separated by 5 nm, in order to address a second or third volume grating set, which provides a second or third set of segmented wave fields. Thus, it can also be possible to use the same direction of the reasonable collimated wave field, which enters the plane parallel plate e.g. from the left hand side.

Polarisation Addressing:

Volume grating-PBS reconstruction geometries, e.g. volume grating at 90° deg or 60° deg diffraction, also can be used here in order to implement the addressing of a directional illumination device by using different polarisation states of the collimated light, which propagates parallel to the substrate plane. Additional polarisation switches can be mandatory in order to provide a constant exit polarization state, which can be required by the SLM.

The different addressing methods can be combined in order to provide reasonable selectivity.

A layered arrangement can be used in order to provide an off-Bragg propagation, which can be used in order to enable a multi-directional embodiment, which can use e.g. setups similar to the ones, which are depicted in FIGS. 29, 30 and 16. In other words, the volume grating segments shown can be placed in different z planes and can be shifted laterally in order to provide the segmented wave fields, which are collimated by the optical elements, which are used within the collimation array. Thus, several reasonable collimated segmented exit wave fields can be provided in order to illuminate an ASD or a 1D or 2D encoded holographic display. The post SLM fine observer tracking can be e.g. introduced by using an active type polarization selective in plane LC rotating phase grating (PLCG).

An illumination device which uses the principle shown in FIG. 16 and a multi layered volume grating design can be thicker than the one shown in FIG. 16. A larger tilt of the volume grating segments can be used in order to keep the thickness at small values, which means <10 mm.

A reasonable thick volume grating segment takes out a light field with an angular and or spectral limited range only. This means that the field, which is coupled out can be "cleaner" in the sense of ASPW (ASPW=angular spectrum of plane waves) than the one which propagates within the plane parallel plate. A loss of a few percent can be neglected.

Calibration and Correction:

It can be also possible to use $z_C > \Lambda_{CL}$. Temperature stabilization can enable stable phase relations or phase offsets between adjacent wave field segments. An e.g. segmented phase correction element can be implemented as an e.g. checker board phase step plate. An active phase offset correction also can be introduced by adding local controllable phase shifting elements. The monitoring can be done by just imaging the exit plane of the collimation array onto an image detector. A control loop can be used in order to introduce the local correction phase required.

Even if $z_C < \Lambda_{CL}$ an angular calibration can be advantageous in order to provide reasonable angular match of adjacent exit directions. The measured values can be used in order to generate local angular correction data. Allocated active type polarisation LC gratings (PLCG) can be used for the correction, which is perpendicular to the electrode lines of the PLCG. This only works for reasonable small distances between the illumination unit and the PLCG. It is also possible to generate a static e.g. checker board like correction angle prism arrangement, which introduces very small correction angles. An optimized production process, which uses low shrinkage photo refractive material should be capable of providing angular errors, which are significant less than $1/20°$ deg, especially if exit angles of adjacent collimation segments are compared with each other.

Q-Dot Planes:

Q-dot (quantum dot) planes also can be implemented. Thus an addressing of different directions can be implemented by activate Q-dots, which are laterally separated and e.g. placed in slightly different z planes or which are just placed within adjacent light guiding structures, which can be addressed separately. This is related to the IR (IR=infrared) and to address different fluorescent colours in different planes. It is also possible to propagate a short wave length along a plane parallel plate under FTIR (frustrated total internal reflection) condition and to generate a visual colour within this plate or within a thin additional layer. The local distribution of the dye concentration can be optimized in order to provide homogeneous visual illumination. Volume gratings (volume grating) or volume grating segments can be used to couple out the light from different directions, e.g. into different directions or into at least approximately the same one. Local angular distribution can be optimized in order to e.g. implement a field lens function, which can be e.g. required within an ASD. It is also possible to locate Q-dot materials at local secondary LS points, line segments or lines. Due to the FTIR condition a limited angular range or cone is emitted into the direction of collimating lens, which can be a part of a collimating lens array.

How to Make:

An opportunity is to use injection molding. E.g. PMMA granulate can be used in order to form the host material, which can be e.g. 30% to 90% of the final plane parallel plate or of another optical element. An additive can be used, which is based on a different monomer, oligomeric chemistry. But it is also possible to e.g. use MMA and a few amount of PQ as the "photo refractive additive", which is added to the host matrix material. The granulate material of the host material is polymerized already. The "photo refractive additive" can be mixed with the host material within the process of injection molding. PQ (CAS: 84-11-7) can be used e.g. at a temperature of 240° C., which is used for the process of injection molding. The "photo refractive additive" can be e.g. ultrasound mixed with a two component epoxy based host material, which is e.g. casted or injected into forms or just formed to plane parallel substrates.

E.g. MMA can be mixed with a chemical, which starts the polymerization to PMMA. This can be e.g. azo-bis-isobutyronitrile (AIBN=azo-bis-isobutyronitrile), which is used in an amount of e.g. 0.2% to 1% of the weight of the entire mixture. The polymerisation, which uses AIBN, can be activated by heating up the mixture to e.g. ca. 80° C. or even to higher temperatures.

Phenanthrenequinone (PQ=Phenanthrenequinone) can be used in order to dope methylmethacrylate, MMA. The mixed material can comprise e.g. 0.1% to 2% of PQ by weight.

AIBN should not be used in an amount, which results in a complete polymerisation of MMA into PMMA. This is due to the fact that a small amount of monomers or oligomeric molecules has still to be present in order to be polymerized by using the PQ sensitizer. This means that in the case of a photorefractive chemical subsystem, which uses MMA the bulk radical polymerization of MMA to PMMA with AIBN should not be complete. Thus, the amount of AIBN has to be limited.

However, this changes if the photo refractive chemical subsystem (PRCS=photo refractive chemical subsystem) is changed into a subsystem, which is independent of the subsystem, which polymerized the host matrix of the plane parallel plate.

UV or visual curable polymer systems also can be used as PRCS, which is implemented into the host material. Thus, e.g. optical adhesives, which are e.g. offered by Norland Inc., can be used as PROS or even as host material.

Mechanical Layout:

A plate can be used, which uses a host system and a PRCS. Due to the fact that ends of chains are required to be transferred into spatially patterned index modulation n1, the adhesive surface can be a problem for other process steps. That is the reason why a sandwich can be used, which provides a smooth and not a sticky surface. A sandwich, the structure of which is e.g. PMMA|PMMA+PRCS|PMMA can be used as plane parallel plate, which will be exposed later on.

It can also be possible to polymerize outer zones by using a very short wave length, which has a very small penetration depth of e.g. 100 μm only. Thus, an adhesive and sticky surface is avoided and the plate is still photo sensitive inside.

It is possible to use two thin sheets or plates and a space between them. The space can be filled with a reasonable transparent photorefractive material, which shows reasonable low scatter effects. This material can have a matrix host material, which is polymerized after being filled into the space between the two outer sheets.

It can be also possible to use a reasonable viscose (VIS) curable adhesive, which also can contain an additional e.g. thermal or two components polymerisation based chemical subsystem.

It can be also practical to use photo refractive material, which can be transferred onto the e.g. plastic substrate used. This is e.g. standard for SU8 photo resists, which are offered in different thicknesses on top of transfer films.

The outer sheet can have a lower refractive index n than the final fixed photo refractive material in order to provide better light guiding.

Illumination Device Combined Refractive and Diffractive Angular MP:

A reasonable thin layer of PQ-PMMA can be placed on top of a refractive e.g. bi- or three-directional illumination device. The refractive layer can be close to the exit surface of the diffractive one. A combination of a volume grating decoupling layer, which is at least a part of a transparent substrate with the substrate, which carries e.g. a 2D or a 1D lens array, which is used to collimate e.g. secondary light sources, is capable of a significant reduction of the weight.

An illumination device, which can provide diffractive AMP and a slim form factor at the same time, can e.g. have a limited number of exit angles. The number of exit angles, which can be generated depends, among others, on the optical layout and the spectral band width of the LS used. This means that LED and OLED light sources can be used within other arrangements than LD, which can be used e.g. within volume grating based designs, which require reduced spectral line width. (LED=light emitting diode; OLED=organic light emitting diode)

A volume grating illumination device, which can provide a reasonable high number of AMP exits, makes a refractive sub system obsolete. In this case a refractive sub system can e.g. be used as 2D LED BLU, which just enables 2D viewing for e.g. a large number of users. In this case, the refractive part can just be a standard illumination device, which uses edge-lit LED illumination and e.g. scatter elements or e.g. micro prisms for decoupling.

Several embodiments can be practical. A few generic examples are described here.

1) One opportunity is to place a diffractive type, e.g. volume grating layer behind a plane, which can carry the collimating lenses. The light, which is collimated by the e.g. three-directional refractive type illumination device will not be diffracted by the volume grating elements, which are designed in a way to provide an off-Bragg condition for these wave fields.
2) Another embodiment is to place a diffractive, e.g. volume grating based functional layer between the collimating lens plane and the secondary LS, which are collimated by the lenses. To use this arrangement, the volume grating can provide the function of re-directing the light and in addition to shape the wave front in order to provide reasonable e.g. off-axis collimation. The refractive function of the lens array has to be taken into account within this embodiment. A reverse calculation and a CGH exposure can be used to implement the function required. A direct implementation is to use an in situ exposure.

The over all design can be optimized in order to provide
for instance +10° deg and
−10° deg as refractive AMP and +30° deg and −30° deg as diffractive AMP.

The cross talk has to be limited for the refractive part, for the diffractive part and for the combined AMP of the entire illumination device.

E.g. a bi-directional refractive illumination device can use a plane of aperture stops, which is placed at a distance z, which show a symmetric intensity distribution in regard to both LS, which are collimated by the same lens.

A polarization coded based cross talk reduction however can be more efficient. This also can be used to implement apodization profiles. Such apodization profiles can be implemented as amplitude distributions and/or as retardation profiles, which are analyzed later on by using a PF plane.

3) Z-stacked diffractive AMP planes also can be used. Thus, refractive lens arrays can be substituted by using of e.g. volume grating based AMP field lens planes. A boundary condition, which has to be satisfied in order to avoid cross talk, is a separation of the angular and/or spectral response functions. One example, which can be capable of explaining this, is the MP of two counter propagating geometries. This means that e.g. a 90° deg field lens FL1 illuminated from the left and a −90° deg field lens FL2 illuminated from the right can only be used if an absorber is placed at the back surface in order to block light, which can form a divergent field lens (FL=field lens). This conflict can be solved e.g. by using slightly different, or generally spoken, reasonable different wave lengths. This means that e.g. light with wave lengths of 532 nm and 522 nm can be used as sub wave length of the primary colour green. The volume grating must have a reasonable selective spectral and/or angular response function.

To use of different sub wave lengths makes it possible to illuminate both AMP FL from the same side.

A different solution is to stack several volume grating based FL planes onto each other. The different AMP of the field lenses FL_ij will ensure the absence of cross talk if the volume gratings, which should not be addressed are situated reasonable off-Bragg. In other words, it should be possible to stack e.g. four volume grating FL planes onto each other, which means with or without contact, and realize the mutual off-Bragg condition for all volume grating. A 90° FL geometry can require a reduced coherence length of e.g. ≤1 mm in order to avoid angular addressing ranges, which are e.g. 1/1000° deg and thus cannot be practical for the particular application, which is e.g. a consumer 3D display.

Reasonable satisfaction of the off-Bragg condition can include angular, spectral and polarization selectivity. This also can be applied to pure refractive approaches.

4) The discussed embodiments can be tiled, nested tiled and also z-nested-tiled, which means tiled in different z planes, which gives a nested functionality of the illumination unit. Functional binary contact and functional overlap can be used.

A varying slant is preferred in order to implement a pre shaped field lens function, which is coupled out of a light guide. The coherence length has to be adapted in order to provide the ASPW required. This is due to the fact that an effective thickness of a volume grating, which can diffract the light, depends on the coherence lengths of the wavelet, which propagates along the light guide.

As already described and explained an additional refractive spatial sampled prism matrix can be added at the exit plane of a light guiding and light decoupling structure in order to provide several directions or several field lens functions at the same time. Active controlled functions can be implemented in order to provide a switch ON and switch OFF feature of the sampled directions.

This can be provided with prisms or frustums of a pyramid, which are related to individual pixels or regions of the data panel. Thus, a pixel can have e.g. a single prism or several prisms close to his exit or entrance surface. It is also possible to use Moiré effects reducing approaches as e.g. statistic variations of the pitch or prime factors.

Angular MP:

All illumination device decoupling approaches can be combined with refractive or even diffractive angular multiplex embodiments. Thus, prisms can be used in addition in order to provide additional angles. This can be done RGB pixel matched or without pixel match. In other words a three directional illumination device can be used in combination with a 2×AMP and a PLCG, which has a blue light diffraction angle of up to ±5° only.

An AMP can be introduced by refractive and diffractive optical elements, which can be addressable or not. This gives the opportunity to implement a lot of alternative variants.

Exemplary implementations can be e.g.:

Bi-Directional-Collimated illumination device|2× prism angular MP|PLCG

PLCG-FineTracking A:
AMP permanent prisms do not match data pixel
One data pixel serves 2 fixed AMP directions
AMP vertically stacked
Color sub pixel v=2×h
Post vertical 1D scatter function
and
PLCG-FineTracking B:
AMP permanent prisms match RGB data pixel
Pixel count 2×
AMP directions switched ON and OFF by addressing the data panel
Post vertical 1D scatter function These modifications can be combined with zigzag from different directions (zigzag in particular in the sense of multiple internal reflections).

Illumination Device for a Holographic Display:

In general, zigzag and no zigzag implementations are optional.

It is possible to implement wavelet like volume grating segments in different planes in order to avoid coherent cross talk and phase irregularities.

The lateral extent of volume grating segments can be e.g. less or even within the range of 1 mm. The diffraction geometry can be e.g. 90° deg/0° deg and can be varying with the distance of the centre of the display in order to implement a field lens (FL) function.

The coherence length of the light source LS used depends on the angular range, which is tracked coarse and/or fine by using diffractive elements. A coherence length of e.g. 0.5 mm to 1 mm can be sufficient for a discrete embodiment.

Two or even more planes can comprise volume grating segments, which can not overlap. The part, which is empty within one plane can carry a volume grating segment in another plane, which can be placed above the first one.

Two adjacent planes can be separated by a further plane, which is e.g. slightly thicker than the coherence length.

Thus, the thickness of the layer to be used for the separation can be e.g. 1 mm. A coherence length of $z\_c=1$ mm is $1/n$ within the material used.

If a laser diode (LD=laser diode) has a coherence length of $z\_c=1$ mm within vacuum, than the coherence length, which is present within e.g. PMMA is $1/1.5=0.67$ mm. Thus a separation with 1 mm PMMA is sufficient to avoid coherent cross talk between volume grating segments, which are placed within different z planes.

To provide z limited volume grating segments within different z planes, a $n1(z)$ apodized volume grating exposure can be used. It is also possible to use several e.g. plane parallel plates of photo refractive material as e.g. PQ doped PMMA (PQ-PMMA). Cross coupled light will propagate within the light guiding sandwich plate and will not be coupled out to the user space.

This embodiment of using different planes of volume grating segments can be used e.g. within zigzag to coupling out or grazing incidence to coupling out geometries.

This also can be used to implement static angular MP (AMP). This can be done by generating several exit directions at the same time.

A volume grating can be e.g. multiplexed in a way to generate e.g. three exit beams or wave fields when illuminated with one beam or wave field.

Alternatively standard angular spectral or polarisation MP can be used in order to provide multi directional illumination.

ASD-Illumination Device:

Implementation of a PBS approach into multi directional illumination device

A polarization switching layer can be used to e.g. turn TE to TM mode. The light can pass the PBS-volume grating diffracted or not diffracted. Thus e.g. a +45° deg/−45° deg or a +30° deg/−30° deg volume grating arrangement can be used to provide two directions. The classic volume grating can be used at the PBS series. Volume gratings, which comprise birefringent material, which is e.g. LC dispersed within a volume grating material, can be used under on-Bragg diffraction to realize diffractive PBS geometries, which differ from the classic PBS-volume grating series, which is 90° deg, 60° deg, 48.2° deg, and so on.

Several functional layers can be stacked to provide a larger number of directions. The artificial birefringent Savart plate can be used in combination with a prism array, which is placed at the exit plane. A striped illumination can enter a Savart plate, which carries an additional prism structure. By changing the polarisation a lateral shift can be introduced. Different positions of the surface relief structure are illuminated. This means that different prism angles and thus different directions can be addressed by changing the polarisation e.g. from TE to TM mode.

Secondary Light Source Points and Lens Array Collimation:

A 1D or 2D lens array can be illuminated by using several sets of secondary light sources, which have to be collimated. This can be a set of decoupling points of different light guiding fiber arrays.

It is also possible to use small volume grating voxels, which can be designed for different reconstruction geometries and different primary and or sub set wave lengths. These volume grating voxels can be placed at different lateral and longitudinal positions. The intensity management can be done by changing the modulation of the refractive index n1. Multiplexing and thus addressing of different subsets of the volume grating voxel line or 2D array can be introduced by choosing different illumination angles, which can be in one plane or even in several, e.g. also perpendicular planes. Spectral subsets of a primary colour also can be addressed. In other words, there are several opportunities to provide subsets of secondary light source point arrays, which will be collimated by a lens array and which will give the opportunity to realize a set of illumination angles. The wave field, which propagates from the volume grating voxel to a collimating lens can be adapted in a way to provide an reasonable good homogeneity of the intensity of the collimated light. It is also possible to adapt the phase distribution in order to optimize the collimation. A field lens function can be implemented.

The collimation of 1D secondary light source stripes can be controlled by volume grating voxels, which are arranged along the light source line. Thus a homogeneous intensity can be provided along the light source line, which has to be collimated.

The approach to use secondary light source points, which are collimated by using refractive or even diffractive structures, can be transferred to a foil sandwich. To avoid the ASPW, which is realized by the prism plus lens layer approach (e.g. by 3M), a lens plus light source point approach can be used. A simple embodiment is a foil, which carries a lens like surface relief, which is chosen in a way to realize a focal length, which is equivalent to the film thickness. Thus, the back side can be coated/structured with a dot or line array, which acts as secondary light source array. Several modifications can be used.

The light source points can be small scattering dots, which can be in contact to a FTIR light guiding plate. It is also possible to use small spheres of Q-dot materials, which are in contact to a FTIR UV guiding plate. Volumetric and/or surface relief structures can be used to couple out the light or to act as fluorescent secondary light source point. In addition cross talk stop layer structures can be placed between the lens and the LS dot layer. These inter lens cross talk suppression structures can be binary or continuously apodized. Thus, a homogeneous collimation can be provided.

Plane Decoupling with Volume Grating Voxels:

If a high volume grating voxel density is used then no collimating lenses can be required. This can be referred to as plane decoupling. A field lens can be implemented by changing the exit angle locally.

The volume grating voxel (volume gratingV) approach can be e.g. implemented in a grazing incidence approach. It is possible to use a stare way like depth discrimination to reduce the amount of scattered light. The proposed procedure is to optimize the design in a way to minimize the number of volume gratingV, which are hit by the illuminating beams. Please note that the lateral volume gratingV size should not be too small in order to avoid larger diffraction angles, which are due to the size of the lateral aperture of the volume gratingV.

A geometry used can be 90° deg/0° deg or e.g. a flipped multiplex (MP) one. An advanced solution is to combine the stare way approach with the wedge of the entrance beam approach. This can be done in a grazing incidence illumination device, in a flat wedge or in a zigzag illumination device. The entrance angle of the volume gratingV can be slightly changed or the direction of the entrance beams or both can be changed.

Volume gratingV and volume grating segments in general can be laterally and/or longitudinally apodized in order to optimize the angular, spectral or energy distribution or combinations thereof of the illumination device.

Active Type Cross Talk Blocking Plane:

To use one or even several spatial light modulators (SLM) as active structured aperture stops is not the solution, which provides the minimal effort. The flexibility is high in this case but the costs are high too. If e.g. a set of three LSij 1D or 2D matrix like light source arrays are used in a nested arrangement, which provides e.g. a three directional illumination device, than three controllable apodized aperture stop layers can be used to suppress the inter collimation lens cross talk of the lens array used. Several embodiments can be used.

A photo alignment can be used to generate the LC orientation pattern, which is required for an LC type embodiment. A polarization filter (PF) or analyzer is placed at the exit plane. Thus, the polarisation of the light, which propagated to the data panel is fixed. The data panel can already comprise a PF, which can be used.

The problem is to provide a thin illumination unit which can be used for holographic displays as e.g. mobile holographic 3D displays or even larger holographic or autostereoscopic displays. The problem of very thin embodiments can be the small tolerance values, which can be necessary. In other words, some very thin setups can be very sensitive to the change of e.g. mechanical parameters.

A method is described which can be used to measure the result of e.g. mechanical stress inside the embodiment of the illumination unit or within the display itself.

SLM/Illumination Device 1:

A photo detector array can be implemented to detect local temporal intensity variations of the intensity distribution which is provided by an illumination device. The background is that flat coherent illumination units which are used e.g. within mobile holographic display applications can suffer from mechanical stress which can cause e.g. changes in the local diffraction efficiency of volume gratings or other angular and/or spectral sensitive optical elements. The detectors of the grid can be made in a way to minimize the disturbance which is introduced to the wave field which propagates to the user. One option to do this is to place the detector grid onto absorptive areas of the SLM itself. Semitransparent or highly transparent photo detectors also can be used.

An additional option to provide a detector grid which can be used in forward direction or, as supposed here, backwards is to use a light guiding grid or light guiding lines with defined "couple in" points. A couple in point can be formed e.g. by using of 45° deg fiber ends or a small size diffractive element on top of a fiber.

Photo detector arrays, which are placed inside SLM arrays had been already described earlier. The aim of these proposals was e.g. to implement an optical alternative to a touch screen embodiment, which means to detect the position of objects as e.g. fingers by using of a grid of photo detectors.

The aim here is to detect the intensity distribution, which is present at the SLM in a temporal and spatial resolved way. Additionally detector elements, which detect mechanical stress can be implemented. Striped PZT detectors are e.g. used to detect elongations. Optical fibers also can be used for this. Thus, several methods can be implemented to detect e.g. the bending of a light guiding substrate. In contrast to this photo detector arrays can be used to detect the parameter of interest in a direct way. Varying intensity distributions I(x,y,t) can be measured and compensated by writing compensated transparency values into the SLM. A holographic encoding device can take the measured values into account. Thus, a 3D scene which is obtained by e.g. 1D or 2D encoding will not suffer from intensity variations.

It can be also possible to use a photo detector array (PD array=photo detector array) in backward and forward direction. This can be done e.g. if the illumination device works in a time sequential way. Thus, a detector array which can be used to detect motions of the user or of objects as e.g. fingers which can be placed close to the display also can be used to detect I(x,y,t) on the exit plane of the illumination device. In this case the PD array has to be e.g. as fast as the pulsed illumination device.

It is also possible to implement a more indirect measurement. One opportunity is to use the light which is not decoupled into the direction of the SLM. A light guiding element as e.g. a plane parallel plane or even a wedge can be illuminated from one side. The light, which is not coupled out can be measured at the other side of the illumination device. Thus, a PD array can be placed at one side of the illumination device. The PD grid spacing has to be sufficient.

Illumination devices which are very thin and e.g. illumination devices which use the grazing incidence embodiment can be very sensitive to a change of the local angle of incidence which is present at the volume grating plane. Slightly changed angles of the wave field which has to be diffracted can cause a change of the diffraction efficiency η(x,y). This variation can be measured locally. A global value can be obtained too. Global offsets can be compensated by modulating the light sources LSi used.

Additional Angular Measurements:

It is also possible to implement a grid of angular measurements. To give an example, a plurality of micro lenses can be placed in front of four quadrant PD. Thus, a local measurement point can be used to detect the intensity and the angle of the incident light at the same time. These elements can be placed e.g. at one side of the illumination device. Volume grating also can be used to implement angular measurements within an illumination device. PD and image detector arrays can be used within an arrangement, which uses volume grating and the angular selectivity of the volume grating. Thicker volume grating show a higher angular and spectral selectivity than thinner volume grating. The parameters of the volume grating can be tailored to the specific requirements.

The implementation of a PD grid can be preferred due to the fact that the measurement of I(x,y,t) can be performed with reasonable low complexity.

As was explained earlier, no zigzag or grazing incidence illumination setups can be used for coherent light and for light which shows only reduced spatially and or temporal coherence.

The embodiments discussed here can be further modified to provide multi directional illumination.

Not all embodiments can use angular multiplex as e.g. illuminating the substrate from different directions and using a multiplexed volume grating. For these embodiments a spectral multiplex can be used by e.g. switching on or off different light sources which have slightly different but well defined wave lengths. Wave lengths can be defined by e.g. using LD with cost efficient Bragg resonators. Thus, spectral steps of e.g. 5 nm can be realized. This is sufficient for a grating strength ν of the volume grating which is reasonable high. In other words, it is not mandatory to use a pure angular multiplexing approach for an illumination device.

The multiplex of angular directions which are emitted from an illumination device can be implemented by using different wave lengths, different entrance angles or both. Thus, the solution can be tailored to the requirements.

The problem is to realise a flat illumination device for a holographic display. The angular resolution of the eye under optimal conditions is $1/60°$ deg. The illumination device of a holographic display therefore must have a limited plane wave spectrum, e.g. from $<1/20°$ deg to minimally $1/60°$ deg, that is it must be well collimated light.

A solution which avoids multiple reflexions at the surface borders of the substrates and the error tolerances involved by these reflexions is to use waves inside of the substrate which propagate parallel or nearly parallel to the surface planes of the substrate (no zigzag). This also reduces the necessary depth of the illumination device.

FIG. 19 shows the local horizontal exit angles θ° deg within the exit plane of a directional emitting display. The horizontal width of the display assumed is 1220 mm. The z-distance of the user is fixed at z=2.5 m. The lateral position of the users spans a range of ±1450 mm. The central region has to provide an angular range of ±30° deg. The absolute value of the angular range, which has to be provided at the outer positions of the display are similar. The mean angular position of the outer lateral positions is tilted.

FIG. 20 shows the horizontal exit angles θ° deg, which have to be provided at the exit plane of a directional display, which has a horizontal extension of 1220 mm. The local angles are shown for two lateral user positions x1 and x2. It is assumed that the user is placed at a distance of z=2.5 m. One lateral position is x1=−670 mm and the other one is x2=670 mm. Please note that FIG. 28 already comprises these two cross section vectors shown.

It can be seen within FIG. 20 that the absolute value of the local angular offset, which has to be provided for both user positions is approximately 30° deg. This means that plane parallel plates, which comprise different decoupling geometries, can be stacked onto each other. The local exit angle, which is the signal angle $\theta_S$, can vary about 30° deg and the entrance angle $\theta_R$, which is the reconstruction angle, can be the same and thus e.g. 90° deg. To avoid cross talk during illumination, separated propagation planes or segments are used. Spatially and or spectral separation of equivalent $\theta_R$ can be used to avoid cross talk of different wave front forming states.

The exit angle can differ from 90° deg to the surface normal, which is 0° deg in FIG. 19. As it can be seen in FIG. 20, geometries can be chosen in a way to avoid exit angles, which are perpendicular to the exit surface. These geometries can be used for volume grating front light illumination devices, which are placed in front of a reflective type SLM, which reflects the entrance beam at the opposite, counter propagating angle. Once again, the reconstruction geometry can be chosen in a way to separate "to SLM" and "from SLM" beam paths by using the angular selectivity of the volume grating used. This e.g. means that a SLM plane can be illuminated at 5° deg off axis. This also means that an SLM can be illuminated at 0° deg on axis and the SLM pixels can introduce an off axis offset of e.g. 10° deg. This can be e.g. done with MEMS based SLM arrays.

Distribution of the Decoupling Efficiency:

FIG. 21 shows a diffraction efficiency η(z), which increases along the propagation distance z in order to provide homogeneous intensity distribution within the exit plane and a high overall efficiency. A propagation distance z of up to 100 mm is shown. Please note that this representation of z=0 mm to 100 mm can be transformed to an equivalent representation, which uses z=0% to 100% of $z_{max}$, which is the maximum of the propagation distance and can be e.g. 700 mm or 1220 mm, which is equivalent to the vertical and horizontal extension of a 55 inch 16:9 display respectively.

A high dynamic range of the e.g. used volume grating material is required in order to extract all light out of the illumination device. But the dynamic range required can be reduced by e.g. accepting the loss of 20% of the initial light.

Spectral Distribution:

FIG. 22 shows the coherence length $z_c$ in dependence on the wave length $\lambda$ and the line width $\Delta\lambda$. The length of wavelets defines the effective grating thickness $d_{HOE}$. The effective thickness of a volume grating defines the angular and spectral selectivity of the diffraction efficiency $\eta$. In other words, too large values of $z_c$ of e.g. 100 mm can not be practical for optical layouts similar to the one. But values of $z_c$ of e.g. 5 μm to 100 μm can be practical for optical layouts similar or close to $\theta_R=90°$ deg.

Figure 23:
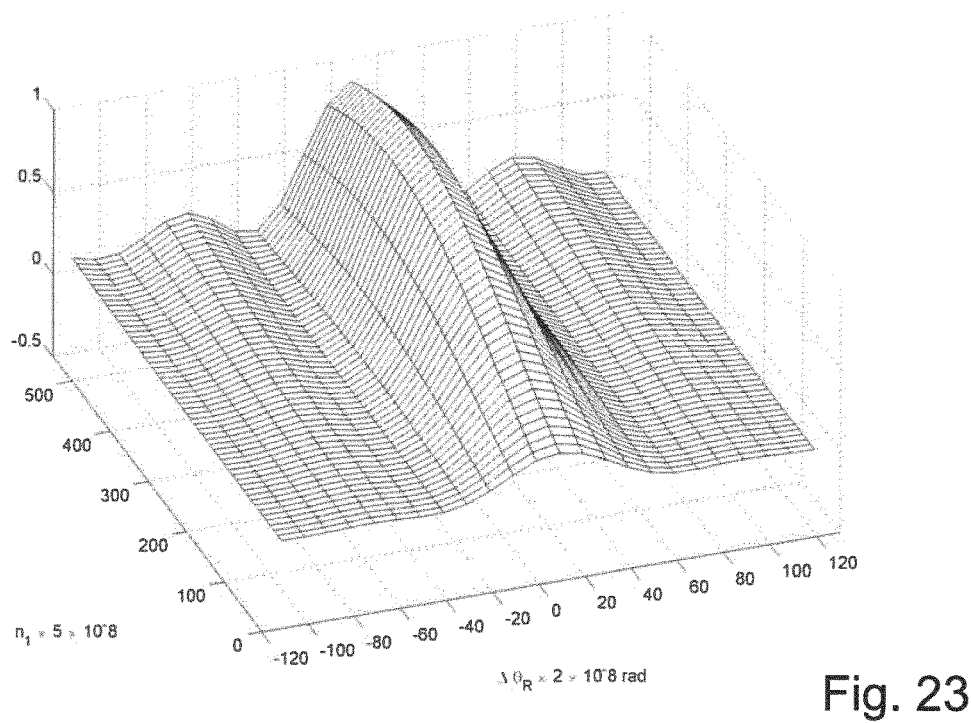
FIG. 23 shows in a diagram the diffraction efficiency in dependence on the offset of the reconstruction angle to the designed one and the modulation n1 of the refractive index.

Angular Selectivity of Large Effective Grating Thickness:

FIG. 23 shows the diffraction efficiency $\eta$ in dependence on the offset to the design reconstruction angle $\theta_R$ and the modulation of the refractive index n1. The design diffraction angle is 88.091° deg. The assumed volume grating thickness is $d_{HOE}=5$ mm. The design geometry gives a stretching factor of 30. Thus, the effective propagation length within the volume grating is up to 5 mm×30=150 mm. The CWT of Kogelnik was used for the simulation, which assumes monochromatic waves and thus $z_c \gg d_{HOE}$.

The length of the wavelets used has to be small enough to enable a practical angular selectivity, which is e.g. ≥ 1/60° deg. Even in the case of holographic displays a coherence length of e.g. 1 mm can be sufficient. Thus, practical values of the angular selectivity can be realized.

Angular Dispersion:

Another aspect is the angular dispersion of diffractive or even refractive components used. The grating equation $\sin(\theta_S)=m\lambda/(n\Lambda_x)+\sin(\theta_R)$ can be used to calculate the spectral range, which can be used in order to realize an acceptable angular dispersion. A wave length of $\lambda=532$ nm, m=1, n=1.5, $\theta_R=90°$ deg, $\Lambda_x=354.67$ gives $\theta_S=0°$ deg. An offset of $\Delta\theta_S=\pm 0.5°$ deg is obtained for a spectral offset of $\Delta\lambda=\pm 4.64$ nm. An angular offset of 0.5° deg can be acceptable for ASD embodiments. In other words, the spectral range of light sources used within an ASD can be limited approximately to e.g. $\Delta\lambda=\pm 5$ nm. The spectral range used can differ between the red, green and blue primary colour. This can be implemented e.g. in order to realize equivalent angular dispersion for all wavelengths. This also can be implemented in order to realize equivalent angular selectivity for the colour related volume grating, which can be multiplexed within a plane parallel plate. Triple notch filter can be used in order to provide the spectral distribution required.

Choice of SLM:

Several SLM types or several modes of LC based SLM can provide reasonable contrast ratios if illuminated at different angles. Other SLM can not work properly if illuminated e.g. at 5° deg and 20° deg. These types can work for a small angular range only. Other SLM types can give reasonable contrast if the local illumination angle is taken into account. This means that e.g. a slight change of the pixel signal can be introduced, which depends on the local illumination angle. Phase values, optical path lengths or optical path differences (OPD) can be slightly changed in dependence of the local illumination angle. Please note that this can result in an adapted refresh rate of the SLM used. This means that the refresh rate of the SLM can be increased.

Illumination Unit AMP:

The implementation of the angular multiplexing (AMP) within the illumination device has several advantages. A very fast response time is one of them. Thus, an illumination device can provide e.g. two, four or eight exit wave fields for each primary colour, which is e.g. Red Green and Blue.

The main AMP directions, which can be e.g. 2, 4 or 8, can have slight differences between the colours used. This can be done e.g. to maximize the tracking range or in order to minimize aberrations. The angular distribution not necessarily has to be equivalent to a field lens or tilted field lens. The distribution can differ from these in order to minimize the local angular load, which has to be provided by the fine tracking unit, which can be e.g. an active type polarization LC grating (PLCG), which uses periodic LC in plane rotation and thus differs from the saw tooth phase grating.

Primary Colors $R_iG_jB_k$ with Spectral Spacing:

The use of primary colors $R_iG_jB_k$ with spectral spacing gives the opportunity to use one layer for the generation of several angular distributions of the light emitted. A spectral spacing of e.g. 5 nm to 10 nm can be sufficient for a set of a sub primary colour of an ASD. Thus, e.g. $\lambda_{B1}=460$ nm, $\lambda_{B2}=470$ nm, $\lambda_{G1}=530$ nm, $\lambda_{G2}=540$ nm, $\lambda_{R1}=630$ nm and $\lambda_{R2}=640$ nm can be used in order to implement a 2-fold AMP of an illumination device by using spectral MP or spectral addressing of the AMP.

Scanning BLU:

An array of reasonable collimated light sources can be used to illuminate the functional layers. These optical channels can be individual controlled in order to provide a scanning illumination device. Also anamorphic beam expansion, which e.g. uses volume grating, can be modified in a way to provide scanning illumination. These scanning approaches easily can be adapted along the direction, which is perpendicular to the plane. But it is also possible to implement further z functionality in order to provide a scanning of the illumination. In dependence on the SLM driving scheme e.g. three to four scanning segments can be sufficient.

Flat Illumination Device with Zero Mode Light Propagation:

The problem is to provide a thin illumination device which can be used for holographic displays as e.g. mobile holographic 3D displays (hPad) or even larger holographic or auto-stereoscopic displays.

An additional embodiment is given in the following. FIG. 6 shows the providing of a flat volume grating based two directional illumination device. Two functional planes are illuminated by using two collimation devices, which can be switched ON or OFF time sequentially. The illumination devices 1 and 2 are placed at the left hand side of the illumination device. Refractive lens arrays can be used to collimate a set of secondary light sources.

The use of off axis parabolic mirrors OAPM array illumination, which was described already, provides an embodiment, which is even more compact.

More field lenses can be implemented by using more of the stacked planes, which are shown in FIG. 6.

Different embodiments can look quite similar. Thus, FIG. 6 can be used to depict a generic layout of an ASD-MD-illumination device layout, which can use low coherence illumination and a reconstruction, which is close to 90° deg/0° deg. In the case of low coherence, the light can propagate within the weak volume grating, which means within a plane parallel plate, which contains a very weak modulation of the refractive index n1. The required modulation n1 can be e.g. 0.0004/mm, which means $4\times10^{-7}$ for a path length of 1 m. This is a factor of 100000 compared to the modulation n1, which is provided by time being photopolymers as e.g. HX 103 from Bayer Material Science. This also means to be able to use complete different materials, which not can be used for standard volume grating applications.

FIG. 6 also can be used to depict a generic layout of a holographic MD-illumination device, which can use reasonable coherent illumination and the gracing incidence approach. The grazing incidence approach provides an off Bragg situation if used in counter propagation mode. This means that a single functional layer can be used to provide two field lenses. In this case the field lenses can be multiplexed within a single volume grating layer. This is due to the fact that the volume grating layer will see an ASPW, which e.g. propagates at −75° deg and +75° deg. Two layers, which are both illuminated from two sides, can provide four different field lenses.

A tablet related modification of the flat volume grating based illumination device is described in the following:

A tablet can have an aspect ratio, which is e.g. 16:9 and thus equivalent to the one of large TV displays. Large ASD TV displays can use e.g. P-LCG tracking and 2 to 3 1D field lenses, which are provided by the MD-illumination device.

A tablet can use e.g. P-LCG tracking and two 1D field lenses, which are provided by the bi-directional-illumination device. In contrast to a large TV display, which is used in landscape orientation only, a tablet can be used in landscape and in portrait orientation. This means that a second 1D field lens or two additional 1D field lenses are required in order to provide ASD operation in portrait orientation. In addition to this a second P-LCG is required to provide fine tracking of the two eye boxes.

A first tablet related embodiment can provide ASD in landscape only in order to reduce the complexity, the costs and the thickness. An enhanced embodiment can provide additional ASD in portrait operation. If a second crossed P-LCG is implemented, than the eye box can be modified, which means to use a reduced vertical extension of the striped eye box, which can be used within the "ASD in landscape only" device. This means that the striped eye box, which is depicted in FIG. 6, can be reduced along the vertical direction. Sensors, which can be implemented in time being tablets already, can be used to detect the rotation of the device. The eye tracking camera system can be used to detect the relative rotation of the user, which can be present without rotating the device. This means to provide the ASD orientation, which is required.

Due to the fact that a stack approach can be used, which requires optical isolation between adjacent layers, a high index composition can be used for the light guiding layer. High index means in relation to boundary layers. This e.g. means, that the core can have n=1.7 if the boundary layers have n=1.5 or that the core can have n=1.5 if the boundary layers have n=1.45.

InSitu exposure of the volume grating can be used. Reconstruction geometries, which are plane wave to plane wave, can be exposed at wave lengths, which differ from the one, which are used later on within the device. This means, that it also can be possible to use UV light sources, which are e.g. already used to expose photo thermo refractive glass.

If thick volume grating field lenses should be exposed, than it is preferred to use a reasonable coherent light source for the exposure, which has the same wave length, which is used later on within the device.

Some applications also can work with a stitched exposure, which can be equivalent to e step and flash process. To expose a field lens, a reasonable collimated wave field can be used as an exposure beam, which enters the volume grating plate e.g. from the right hand side. A pinhole, a slit or a special formed small aperture can be illuminated with a laser beam and thus generate a divergent wave field, which enters the volume grating plate from the front surface. This divergent wave field is used as second exposure beam. The reconstruction is done by illuminating the volume grating plane with reasonable collimated light, which enters the volume grating plate from the opposite site, which is e.g. the right hand side. The exact flip of the direction of the propagation causes a counter propagation of the signal beam, which means that a focussing lens function is generated.

Master gratings also can be used. For a 90° deg plane wave to 0° deg plane wave configuration it is preferred to use a master, which generates the interference pattern required by using a wave length, which is shorter than the one, which is used later on within the product. VIS products can use master gratings, which are exposed to UV light.

A 1D field lens, which provides a reasonable, e.g. horizontal extension of the eye box can also be exposed by using an approach, which uses a reflective scattering stripe as light source plane, which is illuminated by a laser an than reflected in order to generate a divergent wave field, which interferes with the collimated exposure wave, which propagates along the volume grating plate. There will be a superposition of a very high number of interfering waves here. Each point of the scattering stripe acts as point source, which generates a divergent spherical wave. Several exposures can be made close to each other and the striped scatter segment can be slightly shifted between the exposures. It is also possible to use only one point light source at once and to perform several exposures with different point sources, which means that the point sources can have different coordinates in space and different times to be used for the exposure.

The use of CHG can provide a high flexibility of the beam shaping, which can be implemented in the exposure of volume gratings.

Segmented wedge type embodiments can be used in order to generate a flat illumination device.

Figure 31:
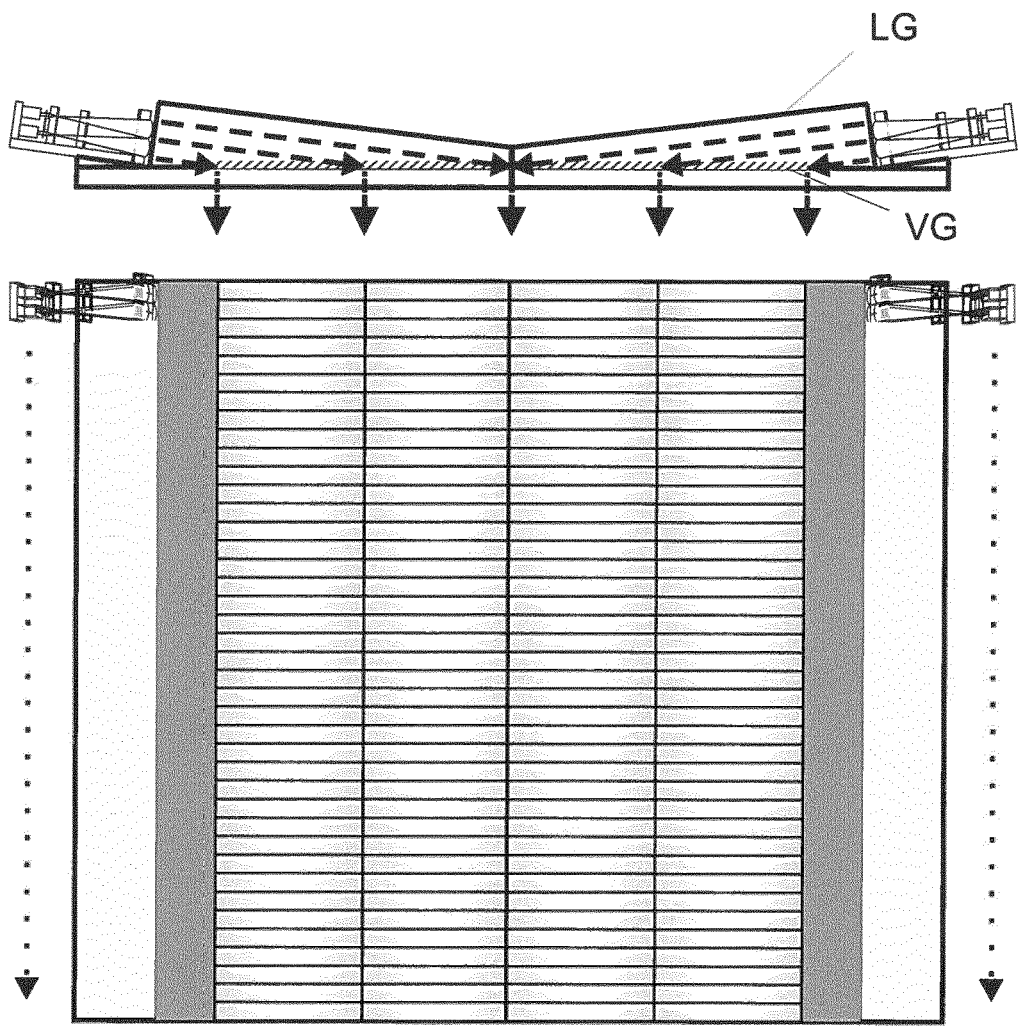
FIG. 31 shows a generic layout of a segmented wedge type illumination device, which uses of transmission type volume grating.
Figure 32:
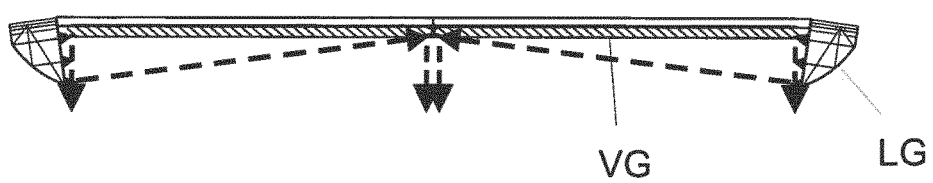
FIG. 32 shows a generic layout of a segmented wedge type illumination device, which uses of reflection type volume grating.

FIG. 31 shows a generic layout, which uses two transmission type volume grating wedge tiles. FIG. 32 shows a generic layout, which uses two reflection type volume grating wedge tiles. These tiles are stand alone tiles, which means that they are not dependent on each other.

Figure 33:
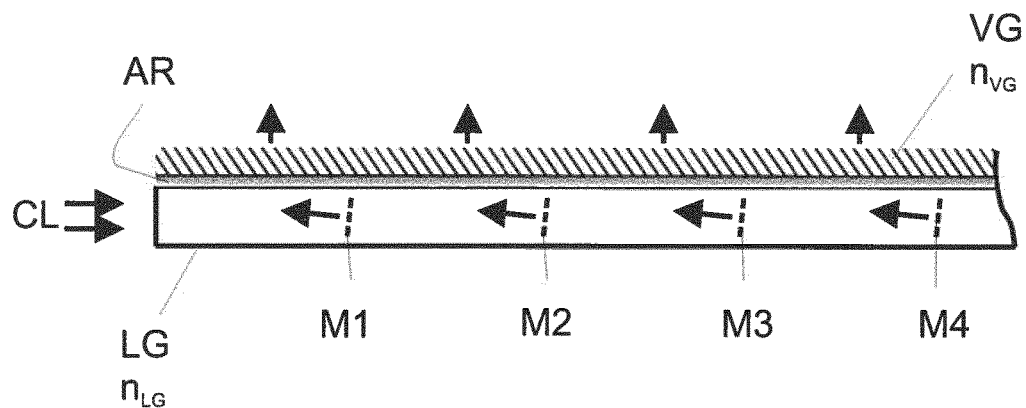
FIG. 33 shows a segmented illumination of a non-segmented light decoupling element.

A generic layout of a segmented wedge type illumination device is illustrated within FIG. 33. Collimated light CL enters the light guiding plate, LG from the left hand side. The light hits a first slightly tilted mirror M1, which reflects a small portion of the light only. The mirror can carry an apodized distribution of the reflectivity r(x_M1, y_M1). The values x_M1 and y_M1 are local coordinates of the mirror plane of M1. The refractive index of the light guiding plane is significant lower than the one of the layer, which comprises the diffraction grating.

Between these two layers an antireflection coating, AR is placed. The index profile used can show an exponential distribution of n(z), which has the minimum value $n_{min}=n_{LG}$ and the maximum value of $n_{max}=n_{volume\ grating}$. Multi-layer step profiles also can be used.

FIG. 33 shows a segmented illumination of a non-segmented decoupling element, which e.g. can be a multiplexed volume grating plane, which works at a large entrance angle (CL: reasonable collimated light, LG: light guiding element, nLG: effective refractive index of the light guiding optical element, Mi: planes, which provide the functionality of a semi transparent mirror plane, AR: anti reflection layer, which also can be a graded index layer). The refractive index of the light guiding structure nLG is lower than the one of the decoupling volume grating, which is nvolume grating.

The light, which is collimated, enters the illumination device from the left hand side. Segments, which provide segmented depletion of the intensity of the collimated beam, are arranged along the beam path.

Figure 34:
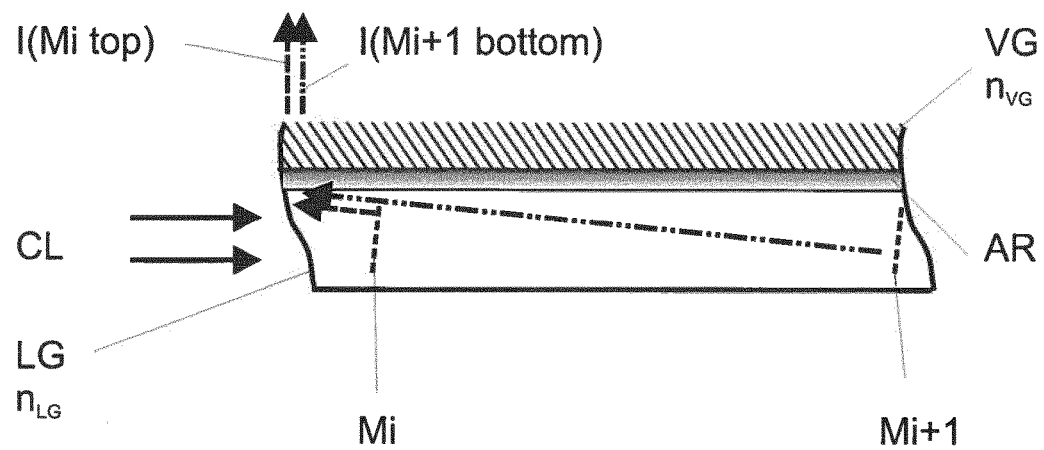
FIG. 34 shows a single part of the embodiment, which is illustrated in FIG. 33.

FIG. 34 shows a single tile of the embodiment, which is shown in FIG. 33. The apodized reflectivity of the mirror like planes Mi and Mi+1 respectively has to be optimized in a way to realize homogeneous intensity distribution of the transition zone of mutual overlap.

One approach is to us a grating, which provides a "partial ON-Bragg situation" for a defined, which also means limited, spectral range only. Several sets of these types of volume grating stripes can be nested within each other. The layout, which is shown in the FIG. 27, can use this approach. Thus, it can be possible to use e.g. a 4 element subset for each primary colour, which e.g. means 33 µm for green_1#4, 100 µm distance to green_2#4, 100 µm distance to green_3#4, 100 µm distance to green_4#4, 100 µm distance to green_1#4 and so on. A set of spectral filters is used to tailor the spectral bandwidth of the LED used. Two volume grating grating segments, which are ON-Bragg for the same light source, are separated by 400 µm. Arrangements as e.g. notch filters or dielectric stacks can be used to cut out different spectral segments, which can be used for the illumination at the same time. This also means that e.g. small spectral segments, which have a width of a few nm only, can be lost.

The striped, spectral sensitive decoupling segments can have a spatial definition, which is sufficient to eliminate the classic colour filter stripes. With or without the presence of the classic colour filter stripes, a spectral subset of the illumination requires an allocated colour correction of the colour space, which is presented to the eyes of the user. R_i#4, G_j#4 and B_k#4 will span one colour space for i=j=k. The different colour sets, here e.g. 4, have to be merged in a way to present the same colour space. In other words, adjacent green SLM pixels have to have—or at least can have (depends on the spectral position of the allocated red and blue pixels)—different brightness in order to generate a white scene point.

One approach is the grating, which provides a "partial ON-Bragg situation" for a defined, which also means limited, angular range only. A wide range of variations of this approach can be implemented. Collimated light can propagate e.g. at 40° deg, 45° deg and 50° deg. Collimated light will slightly diverging along e.g. 200 mm, which also means that we can add e.g. an angular spectrum of plane waves of ±1° deg. In addition to that surface waviness will add additional ASPW, which can be e.g. ±1° deg. That is the reason why the step width of angular separation should be reasonable large, which means e.g. Δθ=5° deg. The decoupling volume grating segments, which are used to couple out the light and e.g. to form a field lens, can show alternating acceptance angles. Thus, the distance between the volume grating segments, which are present for one of the e.g. three different propagation angles, are increased by a factor of three.

One approach is to use a grating, which provides a "partial ON-Bragg situation" for a defined polarization stage only. Thus, e.g. non polarized LED light can be used in combination with alternating volume grating based polarisation beam splitter, PBS geometries. If a defined polarization state behind the illumination unit is required, as it is e.g. the case for several types of SLM and for in polarisation type LC gratings, than alternating retarder segments or alternating polarisation filter segments can be placed at the exit plane of the illumination device in order to provide the defined exit polarisation. It also can be possible to rotate the polarization e.g. between adjacent volume grating segments, which are e.g. designed for TE and TM. But this requires birefringent materials and additional effort, which can be to expensive for an ASD mass product. This means that only cost efficient embodiments can have a chance to be produced in high numbers.

A local rotation can also be used e.g. for TM polarised light, which travels along a TE 90° deg to 0° deg decoupling grating. The materials, which provide the rotation of the polarisation, can be arranged in small planes, which are separated from the volume grating segments, or they can also be embedded within the decoupling gratings.

The polarisation state has to be rotated back, e.g. to TM polarized light, in order to provide a reasonable short volume grating segments only. In other words, the distance between two rotation segments, which is filled out with a volume grating segment, is e.g. 100 µm only. The space, which is placed between these two polarisation segments, carries a volume grating segment. This volume grating segment can contain several multiplexed volume grating. The MP can be done within the same volume or even in several adjacent segments, which e.g. can be related to different colours or to different geometries of reconstruction. This also means, that e.g. three volume grating stripes, which are RGB-volume grating stripes are placed between two adjacent polarisation rotation planes. Please note that this arrangement can be aligned to a colour filter pattern, which is used for the SLM plane.

The local rotation of the polarisation can be introduced within a short segment, which has a width of e.g. 3 µm, or that the rotation can be introduced along a longer segment, which can have a width of e.g. 100 µm.

Non polarised light sources can be transformed to polarised light sources by e.g. using birefringent plates, which also called Savart plates, which have a segmented retardation plate at the exit surface. The local segmented retardation can be chosen to e.g. ±λ/4, which is equivalent to a rotation of the polarisation of 45° deg and −45° deg, in order to minimize the chromatic aberration of the retardation.

Alternatively several polarisation beam splitter, PBS arrangements can be implemented in order to split the initial beam into two beams, which have different exit locations. The exit locations carry different retardation elements. 2D reflection setups also can be used to rotate the polarisation and thus to generate two equivalent exit polarisations, which are finally present. Volume grating based PBS geometries also can be used in order to provide a defined polarisation state and high efficiency at the same time. The basic principle is a PBS, which carries segmented retardation elements.

We can have e.g. to different LED sets here, which are orthogonally polarised. This means that light, which has a different polarisation state, is emitted from different electrons, which means that the light belongs to different propagating wave packages, which are independent and incoherent to each other.

A rotation can be introduced along a thin plane, which acts as λ/2 retardation plane. The retardation planes can be arranged between adjacent RGB pixels, which have an extension of e.g. 100 µm. The RGB zones can contain RGB volume grating stripes, which have an extension of e.g. 33 µm each. The geometry of reconstruction can be chosen close to a known volume grating-PBS geometry.

Light, which is emitted from a light source, hits ON-Bragg volume grating segments, which have a width of e.g. 33 µm at relative distances of 0.2 mm. This distance is much smaller than 20 mm but can be sufficient. This embodiment can be extended by using several spectral subsets. If e.g. three spectral subsets are used than the distance to ON-Bragg volume grating segments is increased to 0.6 mm.

The length of propagating wave segments $z_w$ also has to be taken into account if dielectric or semi-transparent mirror planes are used instead of volume grating.

To avoid a significant loss of optical power, the light of the LED used has to be tailored in a way to provide a single polarisation sate only.

A special aspect, which has to be addressed for mobile application is the bending of the display, which can be present. A bending will cause a change of the intensity, which is transmitted to the SLM plane.

The SLM or even another plane can carry sensor elements, which detects the intensity distribution of the illumination. Hundred points can be sufficient, which e.g. work at 30 Hz. These types of sensor grids are already known in state of the art IP but the sensors detect the light, which comes from the user space. This can be flipped in order to look to the illumination unit or it just can be used by applying a filter operation, which detects the frequency of the illumination unit. Dynamic changes, which are due to changing forces can be detected a compensated by using an offset value, which is given to the SLM.

Diffractive wedge type embodiments can provide reasonable flat illumination devices. A large incidence angle is chosen in order to enable a large beam stretching factor. An angle of 84.26° deg, which means 84.26° deg incidence angle to 0° deg exit angle and which is present between the normal of the diffraction plane and the incidence beam, generates a beam stretching factor of $1/\cos(84.26° \text{ deg})=10$. An angle of 86.18° deg generates a 15× and an angle of 87.13° deg generates a 20× stretching factor. The grazing incidence illumination can be seen as the limit and as a relative of the wedge type illumination. Please note that the diffraction angle is significant smaller than the angle, which is present between the incident and the exit angle if the refractive index of the volume grating layer is larger than the one of the medium, which defines the entrance space. If a light guiding layer, which is used within a grazing incidence embodiment and which is made of fused silica, is combined with a Photopolymer, which can be e.g. BayFol HX, than a diffraction angel of e.g. 77° deg can be present.

Dielectric planes can be used as beam splitters, which show defined reflectivity. The planes have to be arranged in a 45° deg geometry in order to provide a redirection of the light of about 90° deg. A gradient in the reflectivity of a set of reflective planes can be used to provide a reasonable homogeneous intensity of the light, which is coupled out into the direction of the SLM which has to be illuminated.

In order to avoid intensity variations, which can be noticeable by the user, an apodisation profile can be implemented into the partially reflective planes. Regardless of the beam divergence, the reflective distributions of the different mirror planes can be used in order to obtain a homogeneous exit intensity distribution.

The distance between the upper edges of the mirror planes and the volume grating plane can be e.g. 100 µm to 200 µm instead of 10 µm in order to reduce visible intensity steps between adjacent segments. Small angular scattering can also be used to reduce the visibility of lines, which can be present between adjacent segments.

This embodiment of the segmented wedge type illumination device also can be combined with spectral subsets, which means to use e.g. two or three different RGB sets. Thus field lens MP can be implemented within the volume grating planes. Spectral and/or angular selectivity of the partially reflecting mirror planes are optional.

Two polarisation subsets also can be used in order to provide field lens MP. Please note that the separation of spectral, angular or polarisation subsets can be introduced e.g. within the volume grating, within the mirror planes or in both types of elements. Several mirror subsets also can be used in order to implement e.g. field lens MP. Left hand side and right hand side illumination can be used to address two different mirror sets. On set can e.g. optimized for 2.87° deg incidence and a reflection angle of 5.74° deg. The second set can be e.g. optimized for −3.59° deg incidence angle and a reflection angle of −7.18° deg. The volume grating plane carries a first RGB-volume grating, which accepts the beam, which enters the plane at 84.26° deg and a second RGB-volume grating, which accepts the beam, which enters the volume grating plane at 82.82° deg. Due to the fact that—for this exemplary setup—one stretching factor is 10 and the other one is 8 only, the number of mirror planes used is different.

Dielectric mirror planes can be designed in away to show reasonable small spectral, angular or polarisation selectivity. This can be used if a classic 2D illumination unit is placed at the back surface of the segmented wedge type illumination device. A classic 2D illumination device (BLD) also can be placed behind a wedge type volume grating-BLD. Time being BLD use polarisation recycling in order to provide polarised light, which is send to the SLM plane, which requires a defined input polarisation.

The selectivity of a volume grating can be narrowed much easier than the selectivity of the dielectric mirrors, which are—indeed—also Bragg planes. In other words, a volume grating with narrow selectivity is cheaper than a dielectric mirror with the same narrow selectivity.

For holographic displays, which use 1D encoding, segmentations are preferred, which are orientated along the incoherent direction of the light.

The size and the position of the illumination segments should be chosen in a way to provide a minimum visibility of edges. Thus, transition zones should be matched with the black mask geometry of the SLM. In other words, electrode structures of the SLM can be used to cover transition zones, which can be present between adjacent illumination segments. Calibration and a LUT can be used for the fine tuning of the homogeneity.

Although a 1D segmented approach should be sufficient for most applications, a two dimensional segmented approach also can be used. This approach can e.g. use segments, which are equivalent to a two wedge BLD, which provides two 10× stretches in two orthogonal directions.

The mirrors, which are shown in FIG. 33, can be formed by using metallic coatings. Dielectric layers enable less absorption loss. This has especially to be taken into account if e.g. more than 10 reflective planes are used.

The reflectivity of the mirror planes increase along the optical path in order to provide a homogeneous exit intensity distribution. A practical embodiment can use a set of increasing reflectivity, which goes from $1/N$, $1/(N-1)$, $1/(N-2)$, ... to 1. The first of the N mirrors has the lowest reflectivity, which is $1/N$. The last of the N mirrors has the highest reflectivity, which is close to 1. This is an approximation, which has to be refined by using the beam profile, which is present at the reflective plane. The beam profile changes along the propagation distance. This means that the set of the values of the reflectivity, which is e.g. 1/N, 1/(N−1), 1/(N−2), . . . to 1, describes integral values of the mirror planes. The discrete profiles of the apodized reflectivity are dependent on the position of the mirror plane M.

The decoupling volume grating can be used with a constant diffraction efficiency DE, η(x)=constant, which is e.g. η=0.99. This type of volume grating layout reduces alignment issues. A volume grating, which carries a structured DE can be used to compensate for intensity fluctuations, which can be present in front of the volume grating. This type of laterally structured volume grating has to be aligned laterally with an uncertainty of less than 50 μm. A constant DE makes the alignment more comfortable.

FIG. 14 shows a simulated intensity distribution of a collimated wave field, which propagates within fused silica. The ASPW of 1/60° deg is superimposed incoherently. As it can be seen, the intensity distribution spreads out along z and the peak intensity is reduced. In other words, the intensity profile, which is present locally, changes along the propagation distance. Simulated data can be used in order to optimize the apodized reflectivity of each single mirror plane. Thus, it is possible to keep the intensity, which is reflected to the decoupling volume grating, at a constant value. Furthermore, equivalent intensity distributions $I(x,y)_{Mi}$ can be realized for all wave segments, which are directed to the decoupling volume grating. It is preferred to use coherence lengths, which are significant smaller than the relative distance of adjacent mirrors. The apodisation profile of adjacent mirror planes $M_i$ and $M_{i+1}$ can be chosen in a way to avoid intensity step profiles, which can be visible at the intersection. This is shown in FIG. 37.

The intensities, which are overlapped within the transition zone have to realize a sum, which is equivalent to the mean value of the intensity, which is realized within the exit plane of the decoupling volume grating. In other words, the local value of r(x,y)Mi, which is present at the top region of Mi depends on the local value of r(x,y)Mi+1, which is present at the bottom region of Mi+1. Reasonable low coherence avoid phase dependent intensity modulations, which can be present at the overlap area of adjacent wedge type segments. For a 55" holographic TV a coherence of $z_c \leq 10$ mm can be practical. Technologies, which can provide apodized metallic or dielectric profiles, are established since a decade already.

The apodized profiles also can be provide by using reflective or transmissive type volume grating, which are adapted to the individual segment, which has the index i. This means that the use of volume grating in the segmentation planes is equivalent to the use of metallic or dielectric mirror planes.

The segmented layout of the illumination device according to the invention described above is précised in the following:

Segmentation enables step wise exposure with low cost equipment. Segmentation can be used for direct decoupling or in combination with refractive, reflective or diffractive lens arrays, which is shown in the FIGS. 29, 30 and 16.

1) Main Aspect—Segment Wise Decoupling—

A spectrum of collimated plane waves is used, which propagates at 90° deg. The collimation, which is done at the display rim, provides a reasonable low divergence, which is present during the propagation of the wave field from one side of the illumination device to the opposite one.

A minimal divergence of the collimated wave field is preferred in order to enable a small form factor.

Example

If single Gauss modes are used than the beam waist can be placed at the centre of the illumination plate. This means that the collimation unit slightly focus the light along one direction.

The collimated light, which propagates within a e.g. PMMA or PC plate, is coupled out segment wise in order to illuminate the complex valued type SLM, which can be termed as C-SLM or P+A-SLM. The P+A-SLM has to be illuminated in a way to avoid functional and thus recognizable gaps. If the SLM uses colour allocated stripes or columns than the decoupling and redirecting of the light can be done stripe wise. The decoupling stripes are related to optional colour filter. Please note that colour filters are not a must here. Patterned RGB decoupling can manage spatial allocated RGB operation of the SLM.

A segment type embodiment can be realized by using a step and repeat process, which can be established with reasonable low capital expenditure (CAPEX). That is why step and repeat or scanning processes are potentials for large scale manufacturing.

2) The Second Aspect—Homogeneous Decoupling—

The second aspect is that the segments, which decouple the light out of the transparent substrate, have to realize a homogeneous intensity distribution within a display size exit plane of the illumination device. The intensity variations should be less than 10% in order to minimize the consumption of the Bit-Depth, which is required by the SLM to compensate for these local variations.

This aspect can be subdivided into three sub-aspects, which can be termed as the "global adapted diffraction efficiency" aspect, the "divergence during propagation" aspect and the "local overlap aspect".

Sub-Aspect: "global adapted diffraction efficiency" The global adapted diffraction efficiency aspect means to successively increase the diffraction efficiency η of the volume grating segments as the light propagates along the along the optical path.

A function η(z) is shown in FIG. 10. Close to the exit plane of the collimation device the highest intensity I(z=0) is present, which requires the lowest diffraction efficiency η(z=0). Here the decoupled intensity is $I_{decoupled}(z=0)=I(z=0) \times \eta(z=0)$. This value should be independent on the local position. Thus, the step wise depletion of the light, which is present within the transparent substrate, makes a diffraction efficiency mandatory that is increased step wise.

Sub-Aspect: "Divergence During Propagation"

To limit the diameter of a collimated wave means to increase the divergence. A smaller the diameter is equivalent to a larger the divergence. In addition a larger wave length at the same diameter is also equivalent to a larger the divergence. This means that the local beam profile, which has to be re-directed and coupled out, varies along the optical path. A beam profile, which slightly increases along z can be combined with segments, which slightly increase the distance Δz to the neighboured decoupling segment. To conclude, the divergence has to be taken into account and the local decoupling hast to be tailored in order to address this problem.

Sub-Aspect: "Local Overlap Aspect"

The segments have to be placed in order avoid visible gaps. But instead of stitching segments together, which all have an individual but constant diffraction efficiency, as an edge to edge arrangement, a slightly overlap of segments can be used.

The diffraction efficiency of the single segments is slightly apodized now. The sum of the diffraction efficiency of two adjacent decoupling segments is reasonable close to a constant value.

Thus small angular drifts of the collimated light or bending of the substrate is compensated in a way, which avoids the visibility of sharp intensity variations, which can be present between adjacent segments otherwise.

3) The Third Aspect—ASPW—

The third aspect is the narrowed angular spectrum of plane waves (ASPW), which is a must for holographic 3D displays.

Two options in regards of the $\frac{1}{60}°$ deg type ASPW can be implemented.

1) One option is that the collimation device provides a reasonable collimated and tailored wave field, which has the ASPW, which is required. This is the preferred embodiment. In this case the thickness of volume grating segments can be e.g. 10 µm.

2) The second option is that an initial ASPW, which is present within the illumination device, can be much too large. In this case the decoupling volume grating (volume grating) segment has to be made reasonable thick in order to cut out the ASPW required only. In this case the thickness of volume grating segments, which is $d_{HOE}$, has to be e.g. ≥200 µm.

This can be done but it will cause a loss of optical energy. It can be practical as long as lost is reasonable small as e.g. 50% only.

Further Aspects:

Coherence length: One aspect is the implementation of coherence properties, which avoid coherent cross talk between light, which is decoupled from adjacent segments. The optical path difference (OPD), which is present between neighboured volume grating segments, has to be large enough to provide incoherent overlap only. This means that the distance between the volume grating segments has to be large enough. And this defines the entire thickness of an arrangement, which uses e.g. 45° deg slanted volume grating decoupling segments. A practical OPD is a few mm to a cm.

Separation of 0° deg to and 0° deg back from SLM front light illumination devices Polarisation:

Polarisation selective diffraction can be used to separate 0° deg to SLM and 0° deg back from SLM front light illumination devices. This can be realized e.g. by using a 90° deg PBS geometry.

Angle: Angular selectivity of volume grating based diffraction can be used to separate the light, which illuminated the SLM from the front side, and which comes back from SLM as modulated complex valued wave field. This can be e.g. realized by using a 5° deg to the SLM and −5° deg back from the SLM arrangement. The separation angle is 10° deg, which is sufficient.

Finally, it must be said that the embodiments described above, the grazing incidence embodiments and the embodiments belonged to the segmented light decoupling element (segmented volume grating) shall solely be understood to illustrate the claimed teaching, but that the claimed teaching is not limited to these embodiments.

The invention claimed is:

1. An illumination device for illuminating at least one spatial light modulator device being used preferably for displaying two-dimensional and/or three-dimensional images comprising:
   at least one light source device with at least one light source illuminating the at least one spatial light modulator device;
   light guiding element comprising at least one light conducting core, where the at least one light source device is arranged on a side of the light guiding element and where the light emanating from at least one light source of the at least one light source device propagates areally through the light guiding element;
   at least one light decoupling element arranged on top of the light guiding element, the at least one light decoupling element is provided for decoupling of a wave field of the light which propagates in the light guiding element into the direction of the at least one spatial light modulator device;
   the light guiding element has a refractive index lower than or at least equal to the refractive index of the at least one light decoupling element, where the entrance angle of the wave field entering the at least one light decoupling element is determined by the difference between the said refractive indices in such a way that an angular spectrum of plane waves decoupled from the at least one light decoupling element has a predefined value which depends on the required use of the illumination device; and
   a cladding layer is provided between the light guiding element and the at least one light decoupling element, where the cladding layer is formed as an antireflection coating.

2. The illumination device according to claim 1, wherein for holographic applications the illumination device is designed such that the angular spectrum of plane waves decoupling from the at least one light decoupling element is not greater than $\frac{1}{60}°$ deg in at least one lateral direction.

3. The illumination device according to claim 1, wherein the at least one light decoupling element is arranged parallel to the propagation direction of the light in the light guiding element, where the light within the light guiding element propagates at an angle close to 90° deg to the surface normal of the light decoupling element.

4. The illumination device according to claim 1, wherein the cladding layer is formed as an antireflection coating for providing a gradientlike transition of the refractive index of the light guiding element to the at least one light decoupling element, or wherein the antireflection coating comprises a stack of dielectric layers.

5. The illumination device according to claim 1, wherein an absorber layer is provided which is arranged on the light guiding element on the opposite side of the cladding layer.

6. The illumination device according to claim 1, wherein a collimation device is provided for collimating the light emanating from at least one light source of the at least one light source device.

7. The illumination device according to claim 1, wherein the light-conducting core of the light guiding element is made in the form of a holographic volume grating.

8. The illumination device according to claim 1, wherein the light guiding element comprises inside a light decoupling element comprising a plurality of light decoupling segment elements for reshaping the wave field which has to be coupled out and to implement a plurality of optical path differences which are present between parts of the wave field.

9. The illumination device according to claim 1, wherein the divergence of the wave field propagating in the light guiding element is used for coupling out the light of the light decoupling element or of light decoupling segment elements.

10. The illumination device according to claim 1, wherein the diameter of the light propagating in the light guiding element has a value in the range of millimeters in one direction, where in the direction perpendicular to this direction the value of the diameter can be greater.

11. The illumination device according to claim 1, wherein the at least one light source device has a static complex valued amplitude distribution and comprises in case of using a substantially coherent light source device additionally a dynamic scatter plate.

12. The illumination device according to claim 1, wherein the at least one light source device comprises an amplitude mask, which is spatially structured, to achieve a fixed amplitude distribution within an exit plane of the light source device.

13. The illumination device according to claim 1, wherein the at least one light source device comprises a continuous phase function mask or a surface relief grating or a computer-generated hologram to provide a phase distribution to modify the light source plane.

14. The illumination device according to claim 1, wherein the at least one light source device comprises light sources for the primary colours red, green and blue, which are optimized separately regarding the intensity distribution of an exit plane of the light source device, where the optimized light paths of the single light sources are combined before entering in the light guiding element.

15. The illumination device according to claim 1, wherein a refractive spatial sampled prism matrix is provided at an exit plane of the light guiding and light decoupling structure.

16. The illumination device according to claim 1, wherein the light emanating from the light source device is at least partially coherent in one direction, or incoherent in either direction.

17. The illumination device according to claim 1, wherein the light decoupling element is a volume grating or other types of gratings.

18. The illumination device according to claim 1, wherein the light propagates in the light guiding element in a collimated manner in at least one direction.

19. The illumination device according to claim 1, wherein a reflective or light-transmissive spatial light modulator device is arranged downstream of the output coupling side of the illumination device in the direction of light propagation.

20. The illumination device according to claim 1, further comprising a photo detector array for measuring varying intensity distributions provided by the illumination device and/or an incidence angle of light onto a light decoupling element inside the illumination device.

21. A spatial light modulator device, which is illuminated by an illumination device according to claim 1.

22. A display device comprising an illumination device according claim 1, where a spatial light modulator device is arranged downstream of the illumination device seen in the direction of light propagation.

23. The illumination device according to claim 2, wherein the illumination device is designed such that the angular spectrum of plane waves is not greater than $1/60°$ deg in the direction of a holographic encoding and has a value of approximately $0.5°$ deg to $3°$ deg in a direction perpendicular to the direction of the holographic encoding.

24. The illumination device according to claim 4, wherein an apodization profile is implemented into the reflective planes of the dielectric layers.

25. The illumination device according to claim 6, wherein the collimation device is designed in such a way that a reasonable collimated and tailored wave field which has the required angular spectrum of plane waves of not greater than $1/60°$ deg is available.

26. The illumination device according to claim 6, wherein the collimation device comprises an aperture for limiting the initial diameter of the light path, where the aperture comprises an amplitude apodization profile and/or a phase apodization profile.

27. The illumination device according to claim 8, wherein the light decoupling segment elements are exposed into the light guiding element and have lateral extensions which are much smaller than the thickness of the light guiding element.

28. The illumination device according to claim 14, wherein colour filters or colour film-like amplitude distribution profiles are provided to optimize the amplitude distributions for the primary colours separately.

29. The spatial light modulator device according to claim 21, comprising a photo detector array for measuring varying intensity distributions provided by the illumination device and/or an incidence angle of light onto a light decoupling element inside the illumination device.

30. The illumination device according to claim 28, wherein the optimized amplitude distributions of the filters for the primary colours are exposed into a fine grain red-green-blue-type microfiche material.

31. The spatial light modulator device according to claim 29, wherein the photo detector array is formed as a grid and is arranged onto an absorptive area of the spatial light modulator device.

32. A method for measuring and compensating local and/or temporal intensity distribution variations of light existing at an entrance plane of a spatial light modulator device and provided by an illumination device by:
  measuring of varying intensity distributions by means of a detector device as a part of the spatial light modulator device or of the illumination device, or arranged near the spatial light modulator device or the illumination device, whereby measured values for compensating of the varying intensity distributions are received;
  compensating of the varying intensity distributions by modifying the local transmission, which is the amplitude value, of the spatial light modulator device; and
  writing compensated transparency values into the spatial light modulator device.

33. The method according to claim 32, wherein intensity distribution variations are measured indirectly by using the light which is not decoupled from the illumination device into the direction to the spatial light modulator.

34. The method according to claim 32, wherein additionally the angular distribution of the incident light is measured at the same time with the intensity distribution by using four quadrant photo detectors and arranging a grid of microlenses in front of the photo detectors.

35. A detector device for measuring local and/or temporal intensity distribution variations of light existing at an entrance plane of a spatial light modulator device and providing by an illumination device for applying the method according to claim 32.

36. The detector device according to claim 35, comprising a detector grid which is arranged onto absorptive areas of the spatial light modulator device or onto an exit plane of the illumination device.

37. The detector device according to claim 36, wherein the detector grid comprises semi-transparent or highly transparent photo detectors.

38. The detector device according to claim 36, wherein the detector grid comprises a light guiding grid or light guiding lines with defined couple-in points.

* * * * *